(12) United States Patent
Schiele et al.

(10) Patent No.: US 10,539,227 B2
(45) Date of Patent: Jan. 21, 2020

(54) METHOD FOR OPERATING A VEHICLE DRIVE TRAIN WITH A DRIVE MOTOR, AN OUTPUT AND A TRANSMISSION WHICH IS ARRANGED BETWEEN THE DRIVE MOTOR AND THE OUTPUT

(71) Applicant: ZF Friedrichshafen AG, Friedrichshafen (DE)

(72) Inventors: Peter Schiele, Kressbronn (DE); Johannes Brockmann, Lindau (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 270 days.

(21) Appl. No.: 15/598,436

(22) Filed: May 18, 2017

(65) Prior Publication Data

US 2017/0335926 A1     Nov. 23, 2017

(30) Foreign Application Priority Data

May 20, 2016 (DE) .......................... 10 2016 208 753

(51) Int. Cl.
*F16H 61/02*     (2006.01)
*F16H 61/06*     (2006.01)
(Continued)

(52) U.S. Cl.
CPC ....... *F16H 61/0204* (2013.01); *F16H 61/061* (2013.01); *B60Y 2300/18016* (2013.01);
(Continued)

(58) Field of Classification Search
CPC .......... B60Y 2300/18016; B60Y 2300/18083; F16H 3/083; F16H 61/061;
(Continued)

(56) References Cited

U.S. PATENT DOCUMENTS 8,398,522 B2   3/2013   Bauknecht et al.
8,652,004 B2   2/2014   Herbeth et al.
(Continued)

FOREIGN PATENT DOCUMENTS

DE   102008000429 A1   9/2009
DE   102010000857 A1   7/2011
(Continued)

OTHER PUBLICATIONS

German Search Report DE102016208753.3, dated Feb. 23, 2017. (7 pages).

*Primary Examiner* — Jacob S. Scott
*Assistant Examiner* — Lori Wu
(74) *Attorney, Agent, or Firm* — Dority & Manning, P.A.

(57) ABSTRACT

A method for operating a vehicle drivetrain (1) includes proceeding, in the presence of the demand for activation of the engine start-stop function of the vehicle drivetrain (1) and a simultaneously shut-down drive machine (2), from an operating state of the vehicle drivetrain (1) during which a sailing operating function of the vehicle drivetrain (1) is active, during which the drive machine (2) is decoupled from the drive output (3), during which the positively engaging shift element (F) is open and during which a rotational speed (n_ab) of the drive output (3) is higher than a defined rotational speed at which a rotational speed difference between shift element halves of the positively engaging shift element (F) lies within a rotational speed range within which the positively engaging shift element (F) is transferrable into the closed operating state, and actuating the positively engaging shift element (F) in a closing direction no later than when the defined rotational speed is reached.

14 Claims, 17 Drawing Sheets

(51) Int. Cl.
*F16H 3/44* (2006.01)
*F16H 3/66* (2006.01)
*F16H 61/04* (2006.01)

(52) U.S. Cl.
CPC ....... *B60Y 2300/18083* (2013.01); *F16H 3/66* (2013.01); *F16H 2003/442* (2013.01); *F16H 2003/445* (2013.01); *F16H 2061/0474* (2013.01); *F16H 2200/0065* (2013.01); *F16H 2200/2012* (2013.01); *F16H 2200/2046* (2013.01); *F16H 2200/2064* (2013.01); *F16H 2200/2079* (2013.01); *F16H 2200/2094* (2013.01); *F16H 2306/00* (2013.01); *F16H 2312/14* (2013.01)

(58) Field of Classification Search
CPC ................. F16H 61/0204; F16H 61/04; F16H 2061/0474; F16H 2061/047; F16H 2312/14; F16H 3/66; F16H 2200/2064; F16H 2200/2046; F16H 2200/2094; F16H 2200/2012; F16H 2200/0065; F16H 2200/2079; B60W 10/02; B60W 10/06; B60W 10/11; B60W 10/115; B60W 30/19; B60W 30/18072; B60W 2510/104; B60W 2030/1809
See application file for complete search history.

(56) References Cited

U.S. PATENT DOCUMENTS

| | | | |
|---|---|---|---|
| 8,840,517 | B2 | 9/2014 | Herbeth et al. |
| 9,925,982 | B2* | 3/2018 | Schiele ................. B60W 10/06 |
| 2012/0071289 | A1* | 3/2012 | Wittkopp .................. F16H 3/66 |
| | | | 475/275 |
| 2015/0166064 | A1 | 6/2015 | Mitsuyasu et al. |
| 2016/0258529 | A1* | 9/2016 | Kuwahara ........... F16H 61/0204 |
| 2017/0334421 | A1* | 11/2017 | Schiele ................. B60W 10/02 |
| 2017/0335954 | A1* | 11/2017 | Schiele ............... F16H 61/0403 |

FOREIGN PATENT DOCUMENTS

| | | |
|---|---|---|
| DE | 102011004756 A1 | 8/2012 |
| DE | 102011005284 A1 | 9/2012 |
| EP | 2524156 B1 | 11/2012 |

* cited by examiner

| | C | D | B | E | A | F | | |
|---|---|---|---|---|---|---|---|---|
| "1" | | △◉○ | | | △□○ | ◉□○ | 4,70 | 1,65 |
| "2" | △◉○ | | | | △□○ | ◉□○ | 2,84 | 1,49 |
| "3" | | | △◉○ | | △□○ | ◉□○ | 1,90 | 1,38 |
| "4" | | | | △◉○ | △□○ | ◉□○ | 1,38 | 1,38 |
| "5" | | | ◉△□○ | ○◉○ | ○△□○ | | 1,00 | 1,24 |
| "6" | ◉△□○ | ◉△□○ | | ○◉○ | ○△□○ | | 0,80 | 1,16 |
| "7" | □○ | △□○ | | ○◉○ | ○△ | | 0,70 | 1,21 |
| "8" | | △□○ | □○ | ○◉○ | ○△ | | 0,58 | 1,21 |
| "9" | | △□○ | | ○◉○ | | | 0,48 | |
| "R" | | ○ | ○ | | | ○ | −3,80 | Total 9,81 |

Fig. 2

METHOD FOR OPERATING A VEHICLE DRIVE TRAIN WITH A DRIVE MOTOR, AN OUTPUT AND A TRANSMISSION WHICH IS ARRANGED BETWEEN THE DRIVE MOTOR AND THE OUTPUT

FIELD OF THE INVENTION

The invention relates generally to a method for operating a vehicle drivetrain having a drive machine, a drive output and a gearbox which is arranged in the power flow between the drive machine and the drive output.

BACKGROUND

A multi-stage gearbox having nine forward gears and having one reverse gear is known from DE 10 2008 000 429 A1. The multi-stage gearbox includes four planetary sets, eight rotatable shafts and six shift elements. The first and the second planetary set form a shiftable upstream gear set, whereas the third and the fourth planetary sets constitute a so-called main gear set. The carrier plates or webs of the first and second planetary sets are coupled to one another by one of the rotatable shafts, which is connected to an element of the main gear set. The ring gear of the first planetary set is coupled to the sun gear of the second planetary set with a further shaft of the rotatable shafts, which is detachably connectable to a drive shaft with a clutch.

The sun gear of the first planetary set is couplable via a further shaft of the rotatable shafts to a housing of the multi-stage gearbox through a brake and is connectable to the drive shaft with a clutch. The ring gear of the second planetary set is couplable via a shaft to the housing through a brake. In turn, a further shaft of the rotatable shafts is connected at least to one element of the main gear set and is couplable through the brake to the housing. A further shaft of the rotatable shafts is connected to a further element of the main gear set and is connectable to the drive shaft through a shift element in the form of a clutch, whereas a drive output shaft is connected to at least one further element of the main gear set. At least two of the shift elements of the multi-stage gearbox are in the form of positively engaging shift elements, which are deactivated only during upshifts.

To save fuel, vehicles are equipped with so-called engine start-stop functions. In vehicle ranges close to standstill, these functions and certain actuation logic allow for a drive machine to be transferred into a shut-down operating state. Here, through engine start-stop functions, it is sought for the power flow between the drive machine and the drive output of the vehicle to be produced within short operating times in the region of a gearbox upon starting of the engine.

SUMMARY OF THE INVENTION

Example aspects of the present invention provide a method for operating a vehicle drivetrain having a drive machine, a drive output and a gearbox which is arranged in the power flow between the drive machine and the drive output and is configured with at least one positively engaging shift element and with a plurality of frictionally engaging shift elements through which method sailing operation of a vehicle equipped with the vehicle drivetrain can be deactivated with at least high spontaneity.

In the method according to example aspects of the invention for operating a vehicle drivetrain having a drive machine, a drive output and a gearbox which is arranged in the power flow between the drive machine and the drive output, wherein the gearbox is configured with at least one positively engaging shift element and with a plurality of frictionally engaging shift elements, through which a plurality of toothed gear pairings of a gear set of the gearbox can be engaged and disengaged in order to realize different transmission ratios of the gearbox, only some of the transmission ratios being realizable using the positively engaging shift element, it is provided that, in the presence of a demand for activation of an engine start-stop function of the vehicle drivetrain, the drive machine is decoupled from the drive output and is shut down, and the positively engaging shift element is transferred into or left in the closed operating state of the positively engaging shift element.

According to examples aspects of the invention, in the presence of a demand for activation of the engine start-stop function of the vehicle drivetrain, it is provided that, in the case of a simultaneously shut-down drive machine, proceeding from an operating state of the vehicle drivetrain during which a coasting operating function of the vehicle drivetrain is active, during which the shut-down drive machine is decoupled from the drive output and the positively engaging shift element is open, and during which a rotational speed of the drive output is higher than a defined rotational speed at which a rotational speed difference between shift element halves of the open positively engaging shift element lies within a rotational speed range within which the positively engaging shift element can be transferred into a closed operating state, the positively engaging shift element is actuated in a closing direction at or before the time when the defined rotational speed is reached.

Using the above-described approach according to example aspects of the invention, the sailing operating state of the vehicle drivetrain can be deactivated in a simple manner with high spontaneity, and the engine start-stop function of the vehicle drivetrain can be activated within short operating times, because the positively engaging shift element to be activated which is present in the open operating state is, during a coasting process of a vehicle equipped with the vehicle drivetrain during which the positively engaging shift element to be activated at least intermittently attains an at least approximately synchronized operating state, transferable into the closed operating state as desired without additional measures.

To avoid undesirably high loads in the region of the positively engaging shift element to be activated, the actuation of the positively engaging shift element in a closing direction is, in an easily implementable variant of the method according to the invention, ended when the open operating state of the positively engaging shift element is detected when the vehicle is at a standstill.

In a further advantageous variant of the method according to the invention, the sailing operating function can be deactivated with desired high spontaneity if, in the presence of an active sailing operating function, the present operating state of the vehicle drivetrain and the transmission ratio that has to be engaged in the gearbox during a restart of the shut-down drive machine as a result of activation of the engine start-stop function are identified, in each case at least those shift elements which have to be activated in order to realize the transmission ratio that has to be engaged in the gearbox in the event of a departure from the sailing operating function being held in an operating state prepared for an activation.

In a further advantageous variant of the method according to the invention, drag torques, which impair an efficiency of the vehicle drivetrain, in the region of the gearbox and of the drive machine are avoided if, in the presence of an active sailing operating function, the gear set of the gearbox is transferred, by actuation of a plurality of frictionally engaging shift elements, into an at least partially blocked operating state in which the gearbox input shaft is held rotationally fixed and the gearbox output shaft connected to the drive output is rotatable.

Using a further variant of the method according to the invention, an increase in spontaneity upon departure from the sailing operating state is achieved, in that, in the case of a power flow between the drive machine and the drive output being interrupted in the region of the gearbox, all of those frictionally engaging shift elements which in a closed operating state permit a rotation of the gearbox output shaft are transferred into the closed operating state. Through such an approach, in the case of a correspondingly designed gearbox, which has for example a structural design similar to the multi-stage gearbox described in the introduction and known from the prior art, a multiplicity of the shift elements is transferred into the closed operating state. Then, upon departure from the sailing operating state, a demanded operating state can be realized in the gearbox predominantly as desired within desired short operating times as there are fewer shift elements that have to be transferred from their open operating state into their closed operating state than there are shift elements that are already present in the closed operating state and have to be deactivated or opened. This is advantageous because closed frictionally engaging shift elements can be transferred into their open operating state more quickly than open frictionally engaging shift elements can be transferred into their closed operating state.

If the sequence of the shift elements that have to be successively actuated for the partial blocking of the gear set is selected in each case in a manner dependent on the present operating state profile of the vehicle drivetrain, the sailing operating state can be activated with high spontaneity in the event of a corresponding demand, and the vehicle drivetrain can be transferred within short operating times, and thus with high spontaneity, into the operating state that has to be produced as a result of the demand for the deactivation of the sailing operating state.

The gearbox can be operated with further improved spontaneity during a departure from the sailing operating state if, in the presence of an active sailing operating state of the vehicle drivetrain, actuation forces of the frictionally engaging shift elements are in each case lowered to a level at which the frictionally engaging shift elements are in each case still in a slippage-free operating state and proceeding from which the shift elements can be entirely activated or deactivated within short operating times. In the case of a departure from the sailing operating state, the shift elements that are charged with reduced pressure can be deactivated or evacuated within short operating times proceeding from the lower actuation pressure level, and can thus be opened more quickly. At the same time, the shift elements that have to be activated to the full extent in order to realize the operating state that has to be produced after the deactivation of the sailing operating state can be transferred from the reduced pressure level into the fully activated operating state more quickly than fully open shift elements.

Actuation forces of the shift elements that have to be held in or transferred into the closed operating state in order to realize the after the departure from the sailing operating function of the vehicle drivetrain and as a result of the activation of the engine start-stop function, are raised to the level corresponding thereto while the further frictionally engaging shift elements are opened. Thus, in turn, the demanded operating state of the gearbox can be realized to the demanded or desired extent within short operating times.

In a further advantageous variant of the method according to the invention, in order to generate a rotational speed difference required for the closure of the positively engaging shift element between shift element halves of the positively engaging shift element which is present in the open operating state, the torque transfer capacity of at least one of the shift elements that are actuated for the at least partial blocking of the gear set is varied. With this measure, it is for example possible for so-called tooth-on-tooth positions in the region of the positively engaging shift element to be activated to be easily eliminated with little outlay in the presence of a rotational speed of the drive machine greater than zero.

In a further advantageous variant of the method according to the invention, in the presence of a demand for activation of the engine start-stop function and an associated demand for realizing, in the gearbox, a transmission ratio which can be engaged in the gearbox by activation of the positively engaging shift element and in the event of identification of the open operating state of the positively engaging shift element, it is provided that a synchronization transmission ratio is engaged in the gearbox first for the realization of which the positively engaging shift element is present in the open operating state. To implement a subsequent transmission ratio change proceeding from the synchronization transmission ratio in the direction of the demanded transmission ratio, a frictionally engaging shift element has to be deactivated and the positively engaging shift element has to be closed. Thus, the positively engaging shift element is in each case capable of being transferred, proceeding from defined operating states of the gearbox, from an open operating state into a closed operating state within short operating times and with little outlay in terms of open-loop and closed-loop control.

If the demand for activation of the sailing operating function is, in the presence of a simultaneously activated engine start-stop function, triggered in the event of an exceedance of a defined threshold value of the rotational speed of the drive output, an undesirably large increase in transmission-internal drag torques is limited in a simple manner.

Alternatively or in addition to this, in advantageous variants of the method according to the invention, the demand for activation of the sailing operating function is, in the presence of a simultaneously activated engine start-stop function, triggered in the event of an exceedance of the defined threshold value of the rotational speed of the drive output for longer than a predefined time period or after a driving distance longer than a defined driving distance has been traveled, whereby excessively high rotational speeds in the gearbox, and for example dry running of bearing units of the gearbox, are permanently avoided with little outlay.

The positively engaging shift element is transferred into an at least approximately load-free operating state through at least a partial engagement, in the gearbox, of that transmission ratio for the realization of which the positively engaging shift element has to be transferred into the open operating state and at least the torque transfer capacity of one of the frictionally engaging shift elements has to be varied, and said positively engaging shift element is opened when the at least approximately load-free operating state is attained, in order that, in the presence of high gearbox drag torques, proceeding from an operating state of the vehicle drivetrain in which the engine start-stop function is active and the positively engaging shift element is closed, the sailing operating state is activated with desired high spontaneity and the positively engaging shift element is transferred into its open operating state within short operating times.

If the torque transfer capacity of that frictionally engaging shift element which has to be actuated in order to engage the transmission ratio which relieves the positively engaging shift element of load is, when the sailing operating function is active, raised from a value of zero to a level which relieves the positively engaging shift element of load, the positively engaging shift element can be transferred into an at least approximately load-free operating state with little open-loop and closed-loop control outlay without causing any discontinuities in the profile of a torque acting in the region of the drive output of the vehicle drivetrain.

In a further variant of the method according to the invention, when the open operating state of the positively engaging shift element is identified, the frictionally engaging shift element is transferred into its open operating state, and in this way, the power flow between the drive machine and the drive output is interrupted in the region of the gearbox in a simple manner, and the sailing operation of the vehicle drivetrain is activated with high spontaneity.

In the presence of a demand for realizing a sailing operating state of the vehicle drivetrain during which the drive machine is active and the power flow between the drive output is interrupted in the region of the gearbox, it is provided in a further variant of the method according to the invention that the active drive machine is disconnected from the drive output by opening of one of the shift elements that are held in a closed operating state in order to realize the operating state present before the demand for decoupling of the active drive machine. Following this, the shift elements are actuated, in a manner dependent on the present operating state profile of the vehicle drivetrain and with active drive machine decoupled, such that the shift elements that have to be activated in order to realize the transmission ratio to be engaged in the gearbox in the presence of a demand for coupling of the active drive machine to the drive output are, at the time of the demand, partially already in the activated operating state, and the active drive machine is connected to the drive output by closure of a further shift element of the further shift elements, and the transmission ratio demanded in a manner dependent on the present operating state of the vehicle drivetrain is engaged in the gearbox.

A sailing operating state, which reduces the fuel consumption of a vehicle, can be realized with little outlay, and an operating state, demanded as a result of a demand for deactivation of or departure from the sailing operating state, of the vehicle drivetrain, in particular in the region of the gearbox, can be implemented or achieved with high spontaneity because, while the sailing operating state is active, it is the case according to the invention that so-called gear-speed tracking is performed in a manner dependent on the operating state profile of the vehicle drivetrain, through which, upon a departure from the sailing operating state, the transmission ratio that has to be realized in each case in a manner dependent on the presently prevailing operating state of the vehicle drivetrain can be engaged in the gearbox within short operating times.

In this variant, the drive machine is in the active operating state before the activation of the sailing operating state, while the sailing operating state is active and after the deactivation of the sailing operating state. In this way, the gearbox can, in a manner which is expedient with regard to structural space and costs, be supplied with hydraulic fluid over the entire operating range of the vehicle drivetrain using a gearbox main pump which is driven by the gearbox input shaft, without the need to provide an electrically operated auxiliary pump for this purpose, which requires additional structural space and increases production costs of the gearbox.

In an advantageous variant of the method according to the invention, in the presence of a demand for realizing the sailing operating state proceeding from an operating state of the gearbox for the realization of which the positively engaging shift element is closed, the closed positively engaging shift element is transferred into an open operating state. Through this approach, it is achieved that, in the presence of a decoupled drive machine, drag torques in the gearbox resulting from the closed operating state of the positively engaging shift element that adversely affect the gain in efficiency resulting from activation of the sailing operating state and the rotational speeds which place an undesired burden on the components of the gearbox and which are lower in the open operating state of the positively engaging shift element are to be avoided.

To be able to implement a demand for deactivation of the sailing operating state with the greatest possible spontaneity, in the presence of a demand for realizing the sailing operating state proceeding from an operating state of the gearbox for the realization of which the further positively engaging shift element is open, a further positively engaging shift element is transferred into its closed operating state if an operating state profile of the vehicle drivetrain is identified during which a subsequent demand for coupling-on of the active drive machine or for deactivation of the sailing operating state triggers, in the gearbox, an engagement of a transmission ratio for the realization of which the further positively engaging shift element has to be activated. Thus, it is possible in a simple manner to avoid a situation in which, in the event of a departure from sailing triggered by a load demand from a driver, a downshift in the gearbox is demanded, during which a claw-type shift element has to be activated. This is made possible with little outlay by transferring the further positively engaging shift element into its closed operating state already during the sailing operating state of the vehicle drivetrain.

If the further positively engaging shift element is closed when the rotational speed of the drive output is lower than a threshold value, the actuation of the further positively engaging shift element is based on a speed-dependent strategy, which can be implemented with little outlay, for claw conditioning. For example, upon transition into sailing proceeding from an operating state of the vehicle drivetrain in which a high gear with a low transmission ratio is engaged in the gearbox in the lower speed range of the vehicle, the open positively engaging shift element is advantageously transferred into its closed operating state, because a downshift in the direction of a lower gear with higher transmission ratio is triggered in the gearbox in any case upon a deactivation of the sailing operating state. By contrast to this, the latter approach may be disturbing and disadvantageous in higher speed ranges of a vehicle, because the further positively engaging shift element then does not, upon a departure from sailing or upon a deactivation of the sailing operating state, have to be held in the closed operating state in order to realize the then demanded operating state of the gearbox or of the vehicle drivetrain.

In general, through the speed-dependent selection of whether the further positively engaging shift element is activated or left in the open operating state upon a transition into the sailing operating state, a high level of dynamics is achieved both during a transition into sailing and during a departure from sailing. This is because, while the sailing operating state is active, the further positively engaging shift element is transferred into its closed operating state only if it is detected that the further positively engaging shift element has to be transferred into its closed operating state upon a deactivation of the sailing operating state in order to realize the demanded operating state of the vehicle drivetrain.

If, during the activation process of the further shift element, a clutch which is arranged in the power flow of the vehicle drivetrain between the drive machine and the gearbox is opened and the rotational speed of a gearbox input shaft is adjusted in the direction of zero by actuation of at least one of the frictionally engaging shift elements in order to generate, between shift element halves of the further positively engaging shift element which is in the open operating state, a rotational speed difference within a defined rotational speed difference range such as is required for the closure of the further positively engaging shift element, stalling of the drive machine is prevented with little outlay if, for the synchronization of the further positively engaging shift element, the rotational speed of the gearbox input of the gearbox has to be adjusted substantially in the direction of zero. Thus, the stalling can be prevented, if the rotational speed of the gearbox input is adjusted substantially in the direction of zero.

This approach is particularly advantageous if the clutch is a converter lock-up clutch which is assigned to a hydrodynamic torque converter.

To generate an at least approximately load-free operating state of the further positively engaging shift element, such as is required for the closure of the further positively engaging shift element, it is provided in a further advantageous variant of the method according to the invention that the torque transfer capacity of at least one frictionally engaging shift element is varied. With this measure, it is for example the case that so-called tooth-on-tooth positions in the region of the further positively engaging shift element to be activated can be easily eliminated with little outlay in the presence of a rotational speed of the drive machine greater than zero.

In addition to the variation of the torque transfer capacity of the frictionally engaging shift element, it is also possible for the rotational speed of the drive machine to be varied in order to eliminate a tooth-on-tooth position in the region of the further positively engaging shift element to be activated. In addition or alternatively to this, it may in turn also be provided that the torque transfer capacity of the clutch between the drive machine and the gearbox is varied in order to impart a disturbance torque to the gearbox and eliminate the blocking in the region of the further positively engaging shift element to be activated.

Furthermore, it may also be provided that, during the activation process of the further positively engaging shift element to be activated, positive locking between the shift element halves that have to be placed in engagement with one another has already been set in the region of the further positively engaging shift element, but the further positively engaging shift element has not yet reached its fully closed operating state, and the closing process cannot be performed as desired despite a corresponding actuation in a closing direction. In this case, it is in turn the case that the torques that impede the completion of the activation process of the further positively engaging shift element and which act on the further positively engaging shift element can be reduced by variation of the torque transfer capacity of at least one frictionally engaging shift element, and the complete sliding-in movement in the region of the further positively engaging shift element can be implemented as desired. Such torques which impede the closing process of a positively engaging shift element result for example from drag torques or other influences, which can be reduced as desired using the above-described approaches in order to be able to operate a vehicle drivetrain with high dynamics and ensure availability in the case of jamming claw-type shift elements.

The vehicle drivetrain and the gearbox can be operated with high spontaneity if, in the presence of a demand for realizing a neutral operating state of the gearbox, for which the power flow has to be interrupted in the region of the gearbox through corresponding actuation of the shift elements and for which the further positively engaging shift element has to be opened, the gearbox, in sailing operation of the vehicle drivetrain, is prepared for the engagement of a transmission ratio by virtue of the further positively engaging shift element being held in its closed operating state and an actuation logic of the shift elements being selected allowing a neutral operating state of the gearbox to be realized in which the further positively engaging shift element is present in its closed operating state.

Aside from the improvement of the actuation spontaneity, it is achieved with the latter variant of the method according to the invention that a demanded neutral operating state of the gearbox is implemented with already-known actuation sequences, whereby there is no need for development and implementation of further actuation routines which require additional hardware resources. Furthermore, with this variant of the method according to the invention, a gearspeed disengagement sequence which can be performed within short operating times is realized, during which gearspeed disengagement sequence the power flow is initially fully depleted before the further positively engaging shift element is disengaged in order to realize the neutral gearspeed demanded as a result of the demand for the neutral operating state of the gearbox.

The sailing operating state can be easily deactivated with high spontaneity if, when the sailing operating state is active and the active drive machine is decoupled, and in the presence of an operating state of the vehicle drivetrain in which the further positively engaging shift element is closed and proceeding from which, in the event of a demand for the coupling of the drive machine to the gearbox, a transmission ratio has to be engaged for the realization of which both the further positively engaging shift element and the positively engaging shift element have to be closed, the positively engaging shift element is closed when an at least approximately synchronized operating state is attained.

In a variant of the method according to the invention that can be implemented with little outlay in terms of open-loop and closed-loop control, it is provided that, during an operating state profile of the vehicle drivetrain during which the rotational speed of the drive output and/or the rotational speed of the gearbox input approaches a rotational speed which corresponds to the synchronous rotational speed which is set, in the event of a demand for deactivation of the sailing operating state and a resulting demand for coupling of the active drive machine to the gearbox, by closure of the positively engaging shift element in the case of a simultaneously closed further positively engaging shift element, the positively engaging shift element is closed when a rotational speed difference between the shift element halves of the positively engaging shift element which is present in the open operating state lies within a defined rotational speed difference window.

In a further advantageous variant of the method according to the invention, during an operating state profile of the vehicle drivetrain during which the active drive machine is operated at the level of the idle rotational speed and the synchronous rotational speed of the gearbox input, which is set in the case of a transmission ratio engaged in the gearbox through the closed further positively engaging shift element and through additional closure of the positively engaging shift element, is higher than the idle rotational speed of the drive machine, the rotational speed of the gearbox input is, through a positive engine torque intervention, raised from the idle rotational speed in the direction of the synchronous rotational speed, whereby the vehicle drivetrain can be operated with high spontaneity in the event of a corresponding demand.

In an advantageous variant of the method according to the invention, to be able to determine the synchronization point of the open positively engaging shift element to the required extent within short operating times, the torque transfer capacity of a shift element between the drive machine and the gearbox is, during the determination of the synchronization point of the open positively engaging shift element, adjusted to a defined level at which the rotational speed of the drive machine and the rotational speed of the gearbox input at least approximately correspond to one another.

In a further advantageous variant, the shift element between the drive machine and the gearbox is, during the closure of the positively engaging shift element, at least partially opened in order, with little outlay, to avoid stress being placed on the drive machine during adverse operating state profiles of the vehicle drivetrain.

In a further variant of the method according to the invention, for highly spontaneous operation of the vehicle drivetrain, it is provided that, during operating state profiles of the vehicle drivetrain during which events which vary the rotational speed of the drive output, such as actuation of a service brake of the vehicle, occur and change the synchronization process of the positively engaging shift element to be activated and trigger a demand for coupling of the active drive machine, a transmission ratio is engaged in the gearbox first, for the realization of which the positively engaging shift element is opened. Following this, in the gearbox, a transmission ratio is engaged for the realization of which a closed frictionally engaging shift element has to be deactivated and the positively engaging shift element has to be closed.

Thus, it is achieved in a simple manner that, during operating state profiles during which the adjustment of the positively engaging shift element to a synchronized state during the gearspeed tracking is influenced by external effects such as a braking action, a load demand or other measures which vary the drive output rotational speed, the gearspeed tracking is not imperatively performed or is terminated back in the direction of the current gear, and the non-positive engagement between the drive machine and the gearbox is established. The operating state of the vehicle drivetrain, and in particular of the gearbox, that is demanded here is initially implemented by engagement of a so-called supporting or synchronizing gearspeed in the gearbox and a subsequent downshift under power while the positively engaging shift element is engaged.

If, during operating state profiles of the vehicle drivetrain during which events which vary the rotational speed of the drive output occur and vary the synchronization process of the positively engaging shift element to be engaged, it is provided that, in the gearbox, in preparatory fashion, such transmission ratios are engaged in each case that the synchronization point of the positively engaging shift element to be activated can be attained on the basis of the presently prevailing rotational speeds of the drive output, of the gearbox input and of the drive machine and the present gradients of the profiles of said rotational speeds, and the positively engaging shift element is transferred into its closed operating state in an at least approximately synchronized operating state, the positively engaging shift element can be transferred into its closed operating state with high spontaneity within short operating times without further measures. Using this situation-based adaptation of the respectively prepared synchronization gearspeed in the gearbox, it is the case in particular during a freewheeling process of a vehicle that multiple rotational speed windows can be selected within which the positively engaging shift element to be activated has its respective synchronization point.

If the vehicle drivetrain is configured, in the region between the drive machine and the gearbox, with a hydrodynamic torque converter and a converter lock-up clutch assigned to the torque converter, the converter lock-up clutch has to be actuated, and the torque transfer capacity thereof possibly varied, in a manner dependent on the respectively present operating state of the vehicle drivetrain and also in a manner dependent on the respectively demanded operating state of the vehicle drivetrain in order to be able to perform changes in operating state of the vehicle drivetrain with high spontaneity without impairing driving comfort in the process.

For example, it is particularly advantageous if, before an activation process of the positively engaging shift element or of the further positively engaging shift element, the torque transfer capacity of the converter lock-up clutch is set to a level at which only little slippage occurs in the region of the converter lock-up clutch or the converter clutch is operated without slippage, in order to minimize discontinuities in the profile of a rotational speed difference between shift element halves of the positively engaging shift elements. If rotational irregularities in the region of the drive machine falsify the rotational speed signal of the positively engaging shift elements, the torque transfer capacity of the converter lock-up clutch is reduced to such an extent that the rotational speed of the drive machine and the rotational speed of the gearbox input substantially correspond to one another, but rotational speed oscillations of the drive machine are not fully imparted to the gearbox input, and are introduced merely in dampened fashion into the gearbox during slippage operation of the converter lock-up clutch.

This approach is based on the realization that rotational speed oscillations and varying rotational speed differences between the rotational speed of the drive machine and the rotational speed of the gearbox input give rise to undesired oscillations in the profile of the rotational speed difference of the positively engaging shift elements, which prevent comfortable and load-free engagement of a positively engaging shift element.

During the closing process of the positively engaging shift element or of the further positively engaging shift element, it is possible, owing to adverse operating state profiles of the vehicle drivetrain, for a situation to arise in which a torque which impairs the engagement or closing process of the positively engaging shift elements prevails at the positively engaging shift elements in each case when the converter lock-up clutch is in a closed operating state or close to its closed operating state.

To be able to perform the closing process as desired within short operating times with simultaneously high driving comfort, it is possible for the torque transfer capacity of the converter lock-up clutch to be adjusted during the activation process of one of the positively engaging shift element such that the converter lock-up clutch is operated in slipping fashion and the torque that acts in each case at the positively engaging shift element to be closed prevails at the positively engaging shift element with a magnitude which promotes the closure of the positively engaging shift element. This approach makes it possible in a simple manner for the torque which, after the activation of the claw clutch, acts on the positively engaging shift element to be closed to be at least partially reduced by virtue of the converter lock-up clutch being opened. By contrast to this, closure of the converter lock-up clutch rather causes the torque that prevails in the region of the positively engaging shift element or of the further positively engaging shift element to be increased, whereas an opening of the converter lock-up clutch reduces the respectively prevailing torque. With corresponding actuation of the converter lock-up clutch, the likelihood of so-called claw jamming is thus reduced. In this way, greater availability of the gearbox when a sailing operating state is active is ensured.

If, as a result of a demand for the deactivation of the sailing operating state of the vehicle drivetrain, an operating state of the vehicle drivetrain is demanded in which the positively engaging shift element is closed, it is provided that, in a first phase of the adjustment of the positively engaging shift element to be closed to a target rotational speed, the converter lock-up clutch is held in its closed operating state. It is thus ensured that the rotational speed of the gearbox input substantially corresponds to the rotational speed of the drive machine. Shortly before the synchronous rotational speed of the positively engaging shift element to be closed is reached, it is necessary for the converter lock-up clutch to be transferred into its open operating state in order for the torque prevailing at the positively engaging shift element to be closed to be reduced as desired as a function of the rotational speed difference in the region of a hydrodynamic torque converter, and/or for the torque that prevails at the positively engaging shift element be closed during the engagement process to be dampened to an extent that promotes the activation process of the positively engaging shift element, whereby, in turn, less claw jamming occurs, and an availability of the gearbox during the sailing operating state is increased.

In an advantageous variant of the method according to the invention, in the presence of a demand for activation of a sailing operating function of the vehicle drivetrain in the presence of a simultaneously activated engine start-stop function, the positively engaging shift element is opened, while the drive machine is left in both its decoupled and shut-down operating state. Using this approach, a closed positively engaging shift element is transferred into its open operating state when the sailing operating function is active, whereby only low losses and loads arise in the gearbox during sailing operation.

If the sequence of the shift elements that have to be actuated in succession for the partial blocking of the gear set is selected in each case in a manner dependent on the present operating state profile of the vehicle drivetrain, it is possible, in the event of a corresponding demand, for the sailing operating state to be deactivated with high spontaneity and for the vehicle drivetrain to be transferred within short operating times, and thus with high spontaneity, into the operating state that has to be produced as a result of the demand for deactivation of the sailing operating state.

In a further variant of the method according to the invention, a demand for activation of the engine start-stop function proceeding from an operating state of the vehicle drivetrain during which the gearbox is presently being transferred, on the basis of a previous demand for activation of the sailing operating function, in the direction of an operating state demanded for the realization of the sailing operating function is implemented with high spontaneity by virtue of the fact that the closed positively engaging shift element is left in its closed operating state, and shift elements actuated as a result of the demand for activation of the sailing operating function are actuated to an extent required for realizing the operating state of the gearbox that has to be realized as a result of the demand for activation of the engine start-stop function.

By contrast to this, in a further advantageous variant, a demand for activation of the engine start-stop function proceeding from an operating state of the vehicle drivetrain during which the gearbox is presently being transferred, on the basis of a previous demand for activation of the sailing operating function, towards realizing or displaying an operating state demanded by the sailing operating function, the already open positively engaging shift element is transferred into its closed operating state, and shift elements actuated as a result of the demand for activation of the sailing operating function are actuated to an extent required for realizing the operating state of the gearbox that has to be realized as a result of the demand for activation of the engine start-stop function, in order to implement the demand with high spontaneity.

In the presence of a demand for activation of the sailing operating function proceeding from an operating state of the gearbox for the realization of which the positively engaging shift element is closed, the closed positively engaging shift element is, in an advantageous variant of the method according to the invention, transferred into an open operating state, whereby undesirably high drag losses in the region of the gearbox are avoided in a simple manner.

In an advantageous variant of the method according to the invention, drag torques and component loads arising in the region of the gearbox, which in turn arise inter alia from rotational speed differences in the region of bearing points of the gearbox, are reduced as desired by virtue of the gearbox being transferred into the operating state in which the power flow between the drive machine and the drive output is interrupted by opening of a frictionally engaging shift element and a gearbox output shaft operatively connected to the drive output is rotatable.

In the presence of a demand for realizing a sailing operating state of the vehicle drivetrain, during which the drive machine is shut down and the power flow between the drive machine and the drive output is interrupted in the region of the gearbox, proceeding from an operating state of the vehicle drivetrain in which the drive machine is active and is connected via the gearbox to the drive output and a rotational speed of a gearbox output is higher than a threshold and in the presence of an operating state of the gearbox in which the further positively engaging shift element is open, the power flow between the drive machine and the drive output is, in a further advantageous variant of the method according to the invention, disconnected in the region of the gearbox by virtue of at least one frictionally engaging shift element being opened. It is furthermore provided that the further positively engaging shift element is closed at or before the timein the presence of a demand for departure from the sailing operating state and for realizing a demanded operating state of the vehicle drivetrain in which the drive machine is active and the power flow between the drive machine and the drive output is produced by virtue of a transmission ratio being engaged in the region of the gearbox, for the realization of which transmission ratio the further positively engaging shift element has to be transferred into the closed operating state.

Using this variant of the approach according to the invention, a sailing operating state, which reduces a fuel consumption of a vehicle, can be realized with little outlay, and an operating state, demanded as a result of a demand for deactivation of or departure from the sailing operating state, of the vehicle drivetrain, in particular in the region of the gearbox, can be implemented or achieved with high spontaneity, because, while the sailing operating state is active, it is the case that so-called gearspeed tracking is performed in a manner dependent on the operating state profile of the vehicle drivetrain, through which, upon a departure from the sailing operating state, the transmission ratio that has to be realized in each case in a manner dependent on the presently prevailing operating state of the vehicle drivetrain is engaged in the gearbox within short operating times. Here, in the presence of a demand for departure from the sailing operating state, it is additionally checked whether an operating state of the vehicle drivetrain is demanded, for the realization of which the further positively engaging shift element has to be transferred into or held in a closed operating state. In the case of a positive result of the check, the further positively engaging shift element, which is present in the open operating state, is closed at or before the timein the presence of such a demand, in order to increase the actuation spontaneity of the gearbox and thus of a vehicle equipped therewith.

If, in the presence of a demand for realizing a sailing operating state, the further positively engaging shift element is closed before the drive machine is shut down, it is possible in a simple manner to realize a hydraulic supply to the gearbox using a gearbox main pump driven by the drive machine, and for an electrically driveable auxiliary pump that may be provided to be designed with a relatively low power capacity. In this way, it is in turn possible to reduce production costs of the gearbox and a structural space requirement and also a load on an onboard electrical system. Furthermore, upon a departure from the sailing operating state in the direction of an operating state of the vehicle drivetrain or of the gearbox for which the further positively engaging shift element has to be transferred into the closed operating state, the further positively engaging shift element is already present in the closed operating state, whereby the gearbox can be operated with high spontaneity and a demanded operating state of the vehicle drivetrain can be realized within short operating times.

As an alternative to this, it may also be provided that, in the presence of a demand for realizing a sailing operating state, the further positively engaging shift element is closed after the shut-down of the drive machine, wherein then, upon transition into the sailing operating state, the vehicle drivetrain can likewise be operated with high spontaneity, because the so-called engine-stop enable signal can be triggered immediately upon transition into the sailing operating state. Furthermore, the vehicle drivetrain and the gearbox can also, upon a departure from the sailing operating state, be operated with high spontaneity if, upon the departure from the sailing operating state, the vehicle drivetrain and the gearbox are to be transferred into an operating state in which the further positively engaging shift element has to be transferred into or held in an open operating state.

In an advantageous variant of the method according to the invention, the gear set of the gearbox is held in the at least partially blocked operating state at least until a rotational speed of the drive machine is lower than a threshold value. Thus, with little outlay, a fast engine rundown is realized and a resonance rotational speed range, which impairs driving comfort, is run through within short operating times during the engine rundown. Furthermore, an undesired increase of the rotational speed of the gearbox input or of the gearbox input shaft as a result of an excessively early elimination of the blocking operating state of the gear set of the gearbox during the shutdown of the drive machine, which under some circumstances gives rise to a load reversal in the vehicle drivetrain as a result of crossing of the profiles of the rotational speed of the drive machine and of the gearbox input, is avoided.

If a converter lock-up clutch provided between the gearbox and the drive machine for the purposes of locking up a hydrodynamic torque converter is transferred into a closed operating state in the presence of an active sailing operating state and when the drive machine is in a shut-down state, a synchronous rotational speed of the gearbox input rotational speed, which synchronous rotational speed corresponds to the operating state of the vehicle drivetrain that is to be realized, can be set in a defined manner through possible rotational speed adjustment of the rotational speed of the drive machine. Furthermore, so-called converter slippage that occurs in the region of a hydrodynamic torque converter when the converter lock-up clutch is open does not have to be taken into consideration in the presetting of the target rotational speed of the drive machine, whereby actuation outlay of the vehicle drivetrain is low.

The vehicle drivetrain and the gearbox can be operated with high spontaneity if, in the presence of a demand for deactivation of the sailing operating state, the further positively engaging shift element is transferred into or left in its open operating state, and if the operating state of the gearbox that has to be realized in a manner dependent on a present operating state profile of the vehicle drivetrain in the case of a deactivated sailing operating state can be produced only when the further positively engaging shift element is in an open state.

An increase in spontaneity upon departure from the sailing operating state is achieved, using a further variant of the method according to the invention, in that, in the case of a power flow between the drive machine and the drive output being interrupted in the region of the gearbox, all of those frictionally engaging shift elements which in a closed operating state permit a rotation of the gearbox output shaft are transferred into the closed operating state. Using such an approach, in the case of a correspondingly designed gearbox, which has for example a structural design similar to the multi-stage gearbox described in the introduction and known from the prior art, a multiplicity of the shift elements is transferred into the closed operating state. Then, upon departure from the sailing operating state, a demanded operating state can be realized in the gearbox predominantly as desired within desired short operating times as there are fewer shift elements that have to be transferred from their open operating state into their closed operating state than there are shift elements that are already present in the closed operating state and have to be deactivated or opened. This is advantageous because closed frictionally engaging shift elements can be transferred into their open operating state more quickly than open frictionally engaging shift elements can be transferred into their closed operating state.

In a further variant of the method according to the invention that can be implemented with little outlay in terms of actuation, an interruption of the power flow between the drive machine and the drive output in the region of the gearbox is detected if a deviation between the rotational speed of the gearbox input shaft and the product of the rotational speed of the gearbox output shaft and the transmission ratio engaged in the gearbox at the present operating point of the vehicle drivetrain is greater than a threshold value.

In a further advantageous variant of the method according to the invention, the present operating state of the vehicle drivetrain and the transmission ratio that has to be engaged in the gearbox upon a departure from the sailing operating state are determined while the sailing operating state is active, provided that in each case at least those shift elements which have to be activated in order to realize the transmission ratio to be engaged in the gearbox upon a departure from the sailing operating state are held in an operating state prepared for an activation of the shift elements. Using this approach, which characterizes a so-called gearspeed tracking routine when the sailing operating state is active, it is achieved with little outlay that a gearbox can, upon a departure from the sailing operating state, be transferred within short operating times into the operating state thereby demanded, and can thus be operated with high spontaneity.

In an advantageous variant of the method according to the invention, discontinuities in the profile of a drive output rotational speed are avoided in that that frictionally engaging shift element which has to be opened for the separation of the power flow between the drive machine and the drive output in the region of the gearbox is, in the presence of a demand for departure from the sailing operating state, activated only when a blocking state of the gear set of the gearbox has been eliminated.

To further improve the actuation spontaneity of the gearbox, it may be provided that, in the presence of a demand for deactivation of the sailing operating state, it is checked whether a transmission ratio that has to be engaged in the gearbox while the sailing operating state is active in a manner dependent on the present operating state of the vehicle drivetrain corresponds to a transmission ratio that has to be engaged in the gearbox in a manner dependent on the event that demands the deactivation of the sailing operating state. In the event of a deviation being determined, the transmission ratio demanded by the event is engaged in the gearbox. Thus, with little outlay, a situation is prevented in which, immediately after the departure from the sailing operating state, the operating state demanded and produced by the deactivation of the sailing operating state is immediately departed from again during the course of a further transmission ratio change, and the ultimately demanded operating state is produced in the gearbox immediately upon the departure from the sailing operating state.

In a further advantageous variant of the method according to the invention, a restart of the drive machine is performed upon departure from the sailing operating state taking into consideration a gearbox-side rotational speed setpoint. The power flow between the drive machine and the drive output is produced in the region of the gearbox only when the rotational speed of the drive machine exceeds the synchronous rotational speed of the gearbox input shaft, which synchronous rotational speed corresponds to the rotational speed of the gearbox output shaft. Synchronous rotational speed is set when the demanded transmission ratio is engaged in the gearbox. Thus, an undesired crossing of rotational speeds between the rotational speed of the drive machine and the rotational speed of the gearbox output shaft, and an associated load reversal in the vehicle drivetrain, which impairs driving comfort to an undesired extent, are avoided.

Both the features specified in the patent claims and the features specified in the following exemplary embodiments of the subject matter according to the invention are suitable for refining the subject matter of the invention in each case individually or in any desired combination with one another.

Further advantages and advantageous embodiments of the subject matter according to the invention emerge from the patent claims and from the following exemplary embodiments described in principle below with reference to the drawing, wherein, for the sake of clarity, the same reference designations have been used for structurally and functionally identical components.

BRIEF DESCRIPTION OF THE DRAWINGS

In the following, the invention is more specifically illustrated as an example on the basis of the attached figures. The following is shown:

FIG. 2 shows a shift table of the automatic gearbox as per FIG. 1;

DETAILED DESCRIPTION

Figure 1:
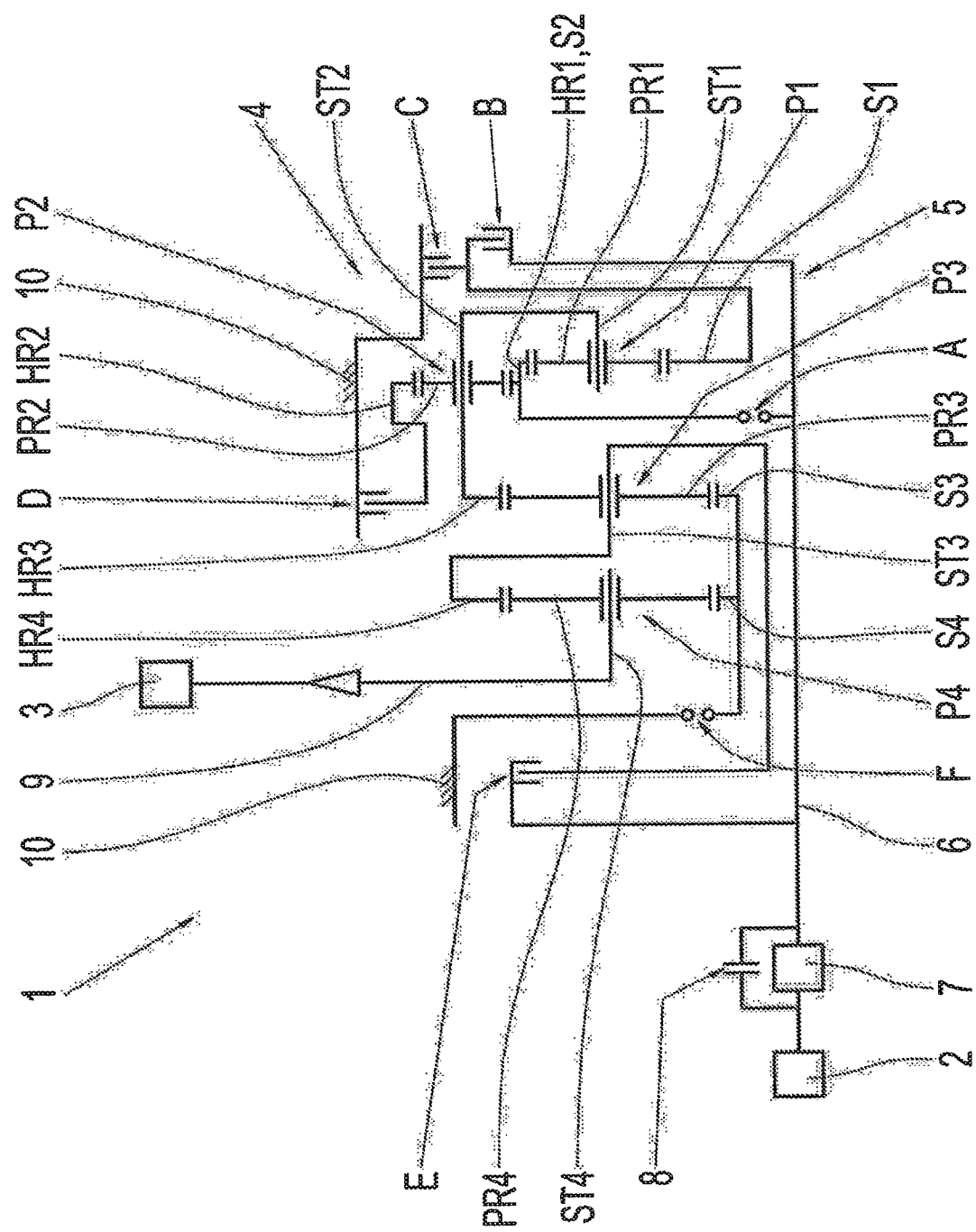
FIG. 1 is a schematic illustration of a vehicle drivetrain having an automatic gearbox in the form of a 9-speed gearbox.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 is a highly schematic illustration of a vehicle drivetrain 1 having a drive machine 2, a drive output 3 and a gearbox 4 arranged in the power flow between the drive machine 2 and the drive output 3. The gearbox 4 includes six shift elements A to F, wherein the shift elements B, C, D and E are in the present case in the form of frictionally engaging shift elements, whereas the shift elements A and F are positively engaging shift elements. Here, the shift elements C, D and F constitute so-called brakes, whereas the shift elements B, E and A are in the form of clutches. In general, using the shift elements A to F, multiple toothed gear pairings of a gear set 5 of the gearbox 4 can be activated and deactivated in order to realize, as listed in FIG. 2, different transmission ratios "1" to "9" for forward travel and one transmission ratio "R" for reverse travel, wherein only some of the transmission ratios "1" to "7" for forward travel can be realized using the positively engaging shift element A in conjunction with the further shift elements B to E.

FIG. 2 shows a shift table of the gearbox 4, wherein, in the shift table, in each case those shift elements A to F which are denoted by a circle have to be held in or transferred into a closed operating state in order to realize one of the transmission ratios "1" to "R", whereas the respective further shift elements A to F have to be transferred into or held in their open operating state. Furthermore, the penultimate column of the shift table specifies in each case the transmission ratio value corresponding to the transmission ratio "1" to "R" engaged in the gearbox 4, while the ratio step present between in each case two mutually adjacent transmission ratios is specified in the final column of the shift table. Here, the first transmission ratio "1" for forward travel has the transmission ratio value 4.70, whereas the second transmission ratio "2" for forward travel that can be engaged in the gearbox 4 has a transmission ratio value of 2.84. Between the first transmission ratio "1" for forward travel and the second transmission ratio "2" for forward travel, the gearbox has a ratio step of 1.65. Altogether, the gearbox 4 has, owing to the configuration, an overall spread of 9.81.

Furthermore, those shift elements A to F which, in the presence of an active sailing operating state of the vehicle drivetrain 1, have to be held in the closed operating state in a manner dependent on the respectively present operating state of the vehicle drivetrain 1 are denoted by a square, whereas a so-called sailing clutch, which is held in the open operating state during the sailing operating state and which is transferred into its closed operating state upon a departure from the sailing operating state in order to couple the drive machine 2 to the drive output 3 as demanded in the region of the gearbox 4, is denoted by a square arranged within a circle. Here, the shift logic characterized by the squares and by the squares arranged within the circles constitutes a so-called standard logic in the active sailing operating state of the vehicle drivetrain 1. For example, in the presence of an active sailing operating state using the standard shift logic, during an operating state of the vehicle drivetrain 1 in which the second transmission ratio "2" for forward travel has to be engaged in the gearbox 4 upon a departure from the sailing operating state, the frictionally engaging shift element C is the sailing clutch, whereas the positively engaging shift elements A and F are present in the closed operating state.

As an alternative to this, in the presence of an active sailing operating state, the gearbox 4 may also be actuated in accordance with a first variant of the shift logic, wherein the shift elements A to F which then have to be held in the closed operating state in each case are denoted by a triangle, whereas the sailing clutch is in each case the shift element F or E, which is denoted in each case by a triangle arranged within a circle.

Furthermore, it is also possible, in the presence of an active sailing operating state, for the gearbox 4 to be actuated in accordance with a second variant of the shift logic, wherein the shift elements that have to be held in the closed operating state are denoted in each case by a hexagon, and the shift element E, D, C, B which constitutes the sailing clutch in each case is denoted by a hexagon arranged within a circle.

That transmission ratio range of the gearbox 4 which includes the transmission ratios "1" to "9" for forward travel may basically be divided functionally into three transmission ratio sub-ranges. Here, a first transmission ratio sub-range includes the transmission ratios "1" to "4", for the realization of which in each case both the positively engaging shift element A and the positively engaging shift element F have to be held in or transferred into the closed operating state, and in each case one of the frictionally engaging shift elements D, C, B or E additionally have to be closed. The adjoining second transmission ratio sub-range includes the transmission ratios "5" to "7", for the realization of which in each case only the positively engaging shift element A, in addition to two further frictionally engaging shift elements B and E, or C and E, or D and E, respectively, have to be held in the closed operating state. The third transmission ratio sub-range which in turn adjoins the second transmission ratio sub-range includes the transmission ratios "8" and "9" for forward travel, which are engaged by simultaneous closure of the three frictionally engaging shift elements C, D and E, or D, B and E, in the gearbox 4.

In the event of changes in transmission ratio in the gearbox 4 within a transmission ratio sub-range, in each case only one frictionally engaging shift element D, C, B or E, or B, C, D or C, B, respectively, has to be deactivated, and one other frictionally engaging shift element E, B, C, D, or D, C, B, or B, C, respectively, has to be activated. By contrast to this, in the event of a transmission ratio change in the gearbox 4 in the case of which a transmission ratio of one of the transmission ratio sub-ranges has to be disengaged and a transmission ratio of a further transmission ratio sub-range has to be engaged in the gearbox 4, it is necessary in each case to perform an activation or deactivation of at least one of the positively engaging shift elements A and F, which is realized using conventional shift routines during normal driving operation of the vehicle drivetrain 1.

However, if the vehicle drivetrain 1 is in its sailing operating state and if, as described in more detail further below, the gearbox 4 is actuated, in a manner dependent on the respectively presently prevailing operating state of the vehicle drivetrain, such that, upon a departure from sailing, the demanded operating state of the vehicle drivetrain 1 can be realized within short operating times and thus with high spontaneity by activation of only one of the shift elements A to F, the approaches described in more detail below have to be performed in a manner dependent on the operating state.

At the gearbox input side, the gearbox 4 is operatively connected by a hydrodynamic torque converter 7 to the drive machine 2. In the present case, the hydrodynamic torque converter 7 is assigned a so-called converter lock-up clutch 8, the torque transfer capacity of which is varied, in a manner known per se, in a manner dependent on the operating state in order to minimize losses in the region of the hydrodynamic torque converter 7. At the gearbox output side, the gearbox 4 is operatively connected by a gearbox output shaft 9 to the drive output 3.

In the present case, the gearbox 4 includes four planetary gear sets P1 to P4, wherein the first and the second planetary gear set P1 and P2, which are preferably in the form of minus planetary gear sets, form a shiftable upstream gear set, whereas the third planetary gear set and the fourth planetary gear set P3 and P4 form a so-called main gear set. A sun gear S3 of the third planetary gear set P3 is in the present case in fixed rotational connection with a sun gear S4 of the fourth planetary gear set P4. When the positively engaging shift element F is in a closed operating state, the two sun gears S3 and S4 are in fixed rotational connection with a component 10 that is fixed with respect to a housing, and said sun gears rotate freely when the positively engaging shift element F is in an open operating state. The sun gear S3 meshes with planet gears PR3 which are arranged rotatably on a planetary carrier ST3 of the third planetary gear set P3. Furthermore, the planet gears PR3 are in engagement with a ring gear HR3 of the third planetary gear set P3. The sun gear S4 of the fourth planetary gear set P4 in turn meshes with planet gears PR4, wherein the planet gears PR4 are arranged rotatably on a planetary carrier ST4 and the planetary carrier ST4 is in fixed rotational connection with the gearbox output shaft 9. Furthermore, the planet gears PR4 are in engagement with a ring gear HR4 of the fourth planetary gear set P4, which in turn is in fixed rotational connection with the planetary carrier ST3 of the third planetary gear set P3.

The planetary carrier ST3 of the third planetary gear set P3 can be placed in operative connection with the gearbox input shaft 6 through the shift element E. The ring gear HR3 of the third planetary gear set P3 is in fixed rotational connection with a planetary carrier ST2 of the second planetary gear set P2, which in turn is operatively in fixed rotational connection with a planetary carrier ST1 of the first planetary gear set P1. Planet gears PR2 mounted rotatably on the planetary carrier ST2 mesh both with a ring gear HR2 and with a sun gear S2 of the second planetary gear set P2, wherein the ring gear HR2 may be in fixed rotational connection with the component 10 that is fixed with respect to a housing through the frictionally engaging shift element D. The sun gear S2 of the second planetary gear set P2 is in turn in fixed rotational connection with a ring gear HR1 of the first planetary gear set P1, which meshes with planet gears PR1, which in turn are in engagement with a sun gear S1 of the first planetary gear set P1. The sun gear S1 may be in fixed rotational connection with the component 10 that is fixed with respect to the housing through the frictionally engaging shift element C and can be placed in operative connection with the gearbox input shaft 6 through the frictionally engaging shift element B. Furthermore, when the shift element B is in a closed operating state, the sun gear S1 may be in fixed rotational connection with the ring gear HR1 of the first planetary gear set P1 through the positively engaging shift element A.

To be able to operate the vehicle drivetrain 1 with the least possible fuel consumption of the drive machine 2 with simultaneously high spontaneity, the vehicle drivetrain 1 is, in a manner dependent on the operating state, operated in the manner described in more detail below on the basis of the illustrations as per FIG. 3 to FIG. 17.

Figure 3:
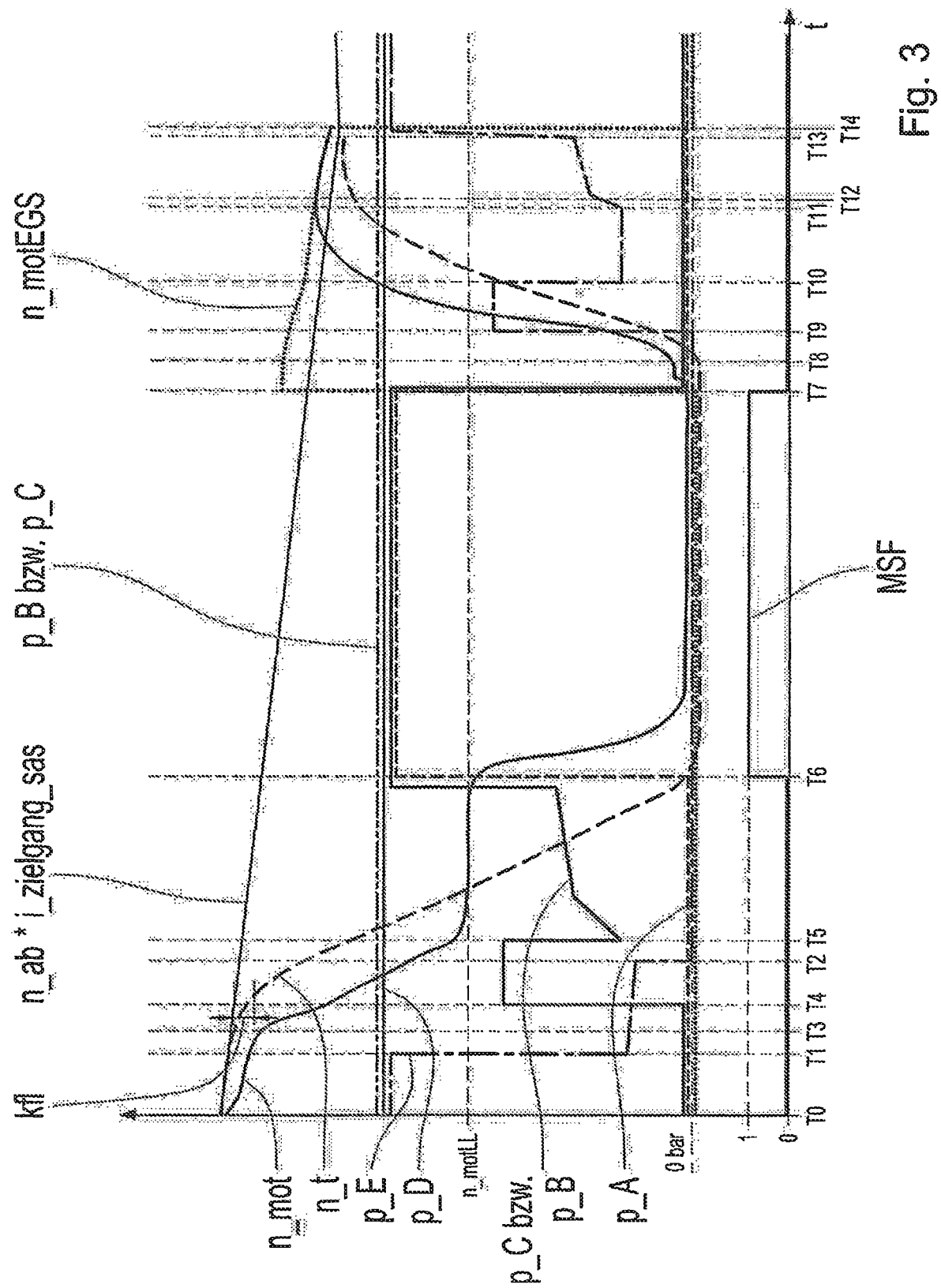
FIG. 3 shows several profiles, versus the time t, of different operating variables of a vehicle drivetrain, which has the automatic gearbox as per FIG. 1, which, in accordance with a demand, is transferred into a sailing operating state which is in turn deactivated at a later time point.

FIG. 3 to FIG. 6 show multiple profiles, versus the time t, of different operating variables of the vehicle drivetrain 1, wherein the vehicle drivetrain 1 is, at a time point T0 indicated in more detail in FIG. 3, in an operating state in which the eighth transmission ratio "8" or the ninth transmission ratio "9" for forward travel is engaged in the gearbox 4 and a rotational speed n_mot of the drive machine 2 is higher than an idle rotational speed n_motLL of the drive machine 2. At the time point T0, a demand is triggered for realizing a sailing operating state of the vehicle drivetrain 1 during which the drive machine 2 is shut down and the power flow between the drive machine 2 and the drive output 3 is interrupted in the region of the gearbox 4. Here, the demand for the activation of the sailing operating state is triggered proceeding from an operating state of the vehicle drivetrain 1 in which the drive machine 2 is active and is connected by the gearbox 4 to the drive output 3. Furthermore, a rotational speed n_ab of the drive output 3 is higher than a threshold value, which is greater than zero. With the eighth or ninth transmission ratio "8" or "9" for forward travel engaged, the positively engaging shift element A is open.

For the activation of the sailing operating state, proceeding from the time point T1, the frictionally engaging shift element E is, by corresponding lowering of an actuation pressure p_E in the manner illustrated in FIG. 3, transferred into its open operating state over a period until a time point T2, and thus the power flow between the drive machine 2 and the drive output 3 is disconnected in the region of the gearbox 4.

Furthermore, proceeding from the time point T0, the rotational speed n_mot of the drive machine 2 is progressively adjusted to the illustrated extent in the direction of the idle rotational speed n_motLL. The lowering of the torque transfer capacity of the frictionally engaging shift element E has the effect that, proceeding from a time point T3 which lies between the time points T1 and T2, the rotational speed n_t of the gearbox input shaft 6, hereinafter also referred to as turbine rotational speed, deviates from the product of the rotational speed n_ab of the drive output 3 and the transmission ratio i_zielgang_sas presently engaged in the gearbox at the time point T0. If the deviation between the turbine rotational speed n_t and the transmission ratio i_zielgang_sas exceeds a threshold value kfl, then in the present case, the disconnected power flow between the drive machine 2 and the drive output 3 in the region of the gearbox 4 is detected. In the present case, this is the situation at a time point T4 which lies between the time points T3 and T2.

At the time point T4, with the ninth transmission ratio "9" for forward travel engaged in the gearbox 4, an actuation pressure p_C of the frictionally engaging shift element C is raised in abrupt fashion, in the manner illustrated in idealized form in FIG. 3, to the level of a fast-charging pressure, and is maintained at said level until a time point T5. Subsequently, the actuation pressure p_C is lowered at the time point T5 to an intermediate pressure level, and is raised in ramped fashion through two successive pressure ramps over a period until a time point T6, at which the frictionally engaging shift element C is in a slippage-free operating state. At the time point T6, the actuation pressure P_C is raised to a level at which the frictionally engaging shift element C is fully closed.

If, at the time point T0, the eighth transmission ratio "8" for forward travel is engaged in the gearbox 4, it is the case that, between the time points T4 and T6, instead of the actuation pressure p_C, an actuation pressure p_B of the frictionally engaging shift element B is adjusted in the last-described manner in order to transfer the frictionally engaging shift element B into the closed operating state in addition to the frictionally engaging shift elements C and D.

In the closed operating state of the frictionally engaging shift elements C, D and B, the gear set 5 of the gearbox 4 is in a partially blocked operating state in which the gearbox input shaft 6 is held rotationally fixed and the gearbox output shaft 9 connected to the drive output 3 is rotatable. In the present case, in this operating state of the gearbox 4, an increase of an actuation pressure p_A of the positively engaging shift element A occurs, whereby the positively engaging shift element A is transferred into its closed operating state. At the same time, the drive machine 2 is shut down, whereby the rotational speed n_mot of the drive machine 2 falls in the direction of zero. The demand that corresponds to this emerges from a profile MSF which, at the time point T6, jumps from the value 0 to 1 and thus activates the engine-stop enable signal. Thus, at the time point T6, the sailing operating state demanded at the time point T0 is activated as desired.

In the present case, the sailing operating state is demanded by a demand from a driver, for example by a release of an accelerator pedal and an actuation, preferably by the driver, of the service brake. In addition or as an alternative to this, it is also possible for the sailing operating state to be demanded by a superordinate driving strategy if no demand for power is made by the driver and it is additionally determined that a driving route, determined for example through the use of a navigation system, can be traveled at least in sections in sailing operation with low fuel consumption.

In the present case, in the manner shown in FIG. 3, the vehicle drivetrain 1 remains in the sailing operating state up until a time point T7. At the time point T7, it is for example the case that the driver actuates the accelerator pedal again and demands a corresponding level of power from the drive machine 2. This demand for power from the driver has the effect that the profile MSF drops from the value one to the value zero, and the engine-stop enable signal is deactivated. This in turn has the effect that the drive machine 2 is activated, and the rotational speed n_mot of the drive machine 2 increases proceeding from the time point T7. To prevent an uncontrolled increase of the engine rotational speed n_mot, a gearbox-side engine target rotational speed setpoint is triggered, which is implemented in accordance with the profile n_motEGS. As a result of the activation of the engine target rotational speed setpoint, the engine rotational speed n_mot is, at the time point T7, raised to a level which lies above the rotational speed of the gearbox input shaft 6, which emerges from the product of the drive output rotational speed n_ab and the transmission ratio i_zielgang_sas to be engaged in the gearbox 4 at the time point T7.

At the time point T7, since the vehicle drivetrain 1 is in a deactivated sailing operating state, the transmission ratio engaged in the gearbox 4 at the time point T0 has been established as desired. At time point T7, the ninth transmission ratio "9" or the eighth transmission ratio "8" for forward travel has to be engaged in the gearbox 4, the actuation pressure p_A of the positively engaging shift element A is lowered, and the positively engaging shift element A is transferred into its open operating state. At the same time, the actuation pressure p_C or the actuation pressure p_B of the frictionally engaging shift element C or B respectively is lowered to zero in order to eliminate the blocking state of the gear set 5 that was held between the time points T4 and T6.

With increasing rotational speed n_mot of the drive machine 2 and an elimination of the blocking state of the gear set 5, the turbine rotational speed n_t increases proceeding from a time point T8 which follows the time point T7, and said turbine rotational speed n_t follows the profile of the rotational speed n_mot of the drive machine 2. Proceeding from a time point T9 which follows the time point T8, the actuation pressure p_E of the frictionally engaging shift element E is, in the manner shown in FIG. 3, prepared for the closing thereof during a fast-charging phase, which lasts until a time point T10, and a following charging compensation phase, which lasts until a time point T11. From the time point T9 onwards, the drive machine 2 is in the closed-loop rotational speed control mode.

At the time point T11, the frictionally engaging shift element E is in an operating state in which the torque transfer capacity of the frictionally engaging shift element E is substantially equal to zero and a further increase of the actuation pressure p_E results in an immediate increase of the torque transfer capacity of the frictionally engaging shift element E. Proceeding from the time point T11, the actuation pressure p_E is increased by a pressure ramp which lasts until a time point T12. The actuation pressure p_E of the frictionally engaging shift element E is in the present case increased, at the time point T11, by the first pressure ramp which follows the charging compensation phase if, for the traction operation of the vehicle drivetrain 1 under consideration here, the profile of the rotational speed n_mot of the drive machine 2 has reached or even exceeded the profile n_ab*i_zielgang_sas, and a rotational speed difference Nd_Syn between the shift element halves of the shift element E to be activated is close to the synchronous rotational speed or less than or equal to a threshold value.

By contrast to this, proceeding from the time point T11, the actuation pressure p_E of the shift element E to be activated is, in coasting operation of the vehicle drivetrain 1 in a manner not illustrated in any more detail, increased by the first pressure ramp which follows the charging compensation phase if the profile of the rotational speed n_mot of the drive machine 2 lies below or corresponds to the profile n_ab*i_zielgang_sas, and a rotational speed difference Nd_Syn between the shift element halves of the shift element E to be activated is close to the synchronous rotational speed or less than or equal to a threshold value.

Following this, the actuation pressure p_E of the frictionally engaging shift element E is increased further by a further pressure ramp, the gradient of which is smaller than that of the pressure ramp present between the time points T11 and T12. At the end of the further pressure ramp, in the present case at the time point T13, the frictionally engaging shift element E is present in a slippage-free operating state, and the turbine rotational speed n_t corresponds to the product of the drive output rotational speed n_ab and the transmission ratio i_zielgang_sas demanded at the time point T7 and to be engaged in the gearbox 4, which transmission ratio in the present case corresponds either to the ninth transmission ratio "9" or the eighth transmission ratio "8".

The engine rotational speed n_mot is adjusted to a level above the profile n_ab*i_zielgang_sas through the gearbox-side engine target rotational speed setpoint in order to avoid an undesired crossing of rotational speeds between the rotational speed n_mot of the drive machine 2 and the turbine rotational speed n_t during the establishment of the power flow between the drive machine 2 and the drive output 3 in the region of the gearbox 4, the turbine rotational speed n_t being determined from the transmission ratio i_zielgang_sas to be engaged in the gearbox 4 and the drive output rotational speed n_ab. A crossing of rotational speeds between the engine rotational speed n_mot and the profile n_ab*i_zielgang_sas gives rise to an undesired load reversal in the vehicle drivetrain 1, which impairs driving comfort to an undesired extent.

At the time point T14, the actuation pressure p_E of the frictionally engaging shift element E is at the closing pressure level, and the operating state of the vehicle drivetrain 1 demanded at the time point T7 has been established as desired at the time point T14. After the time point T14, proceeding from which the sailing operating state of the vehicle drivetrain 1 has been ended, any demanded subsequent shifts can be performed as desired in the gearbox 4.

Figure 4:
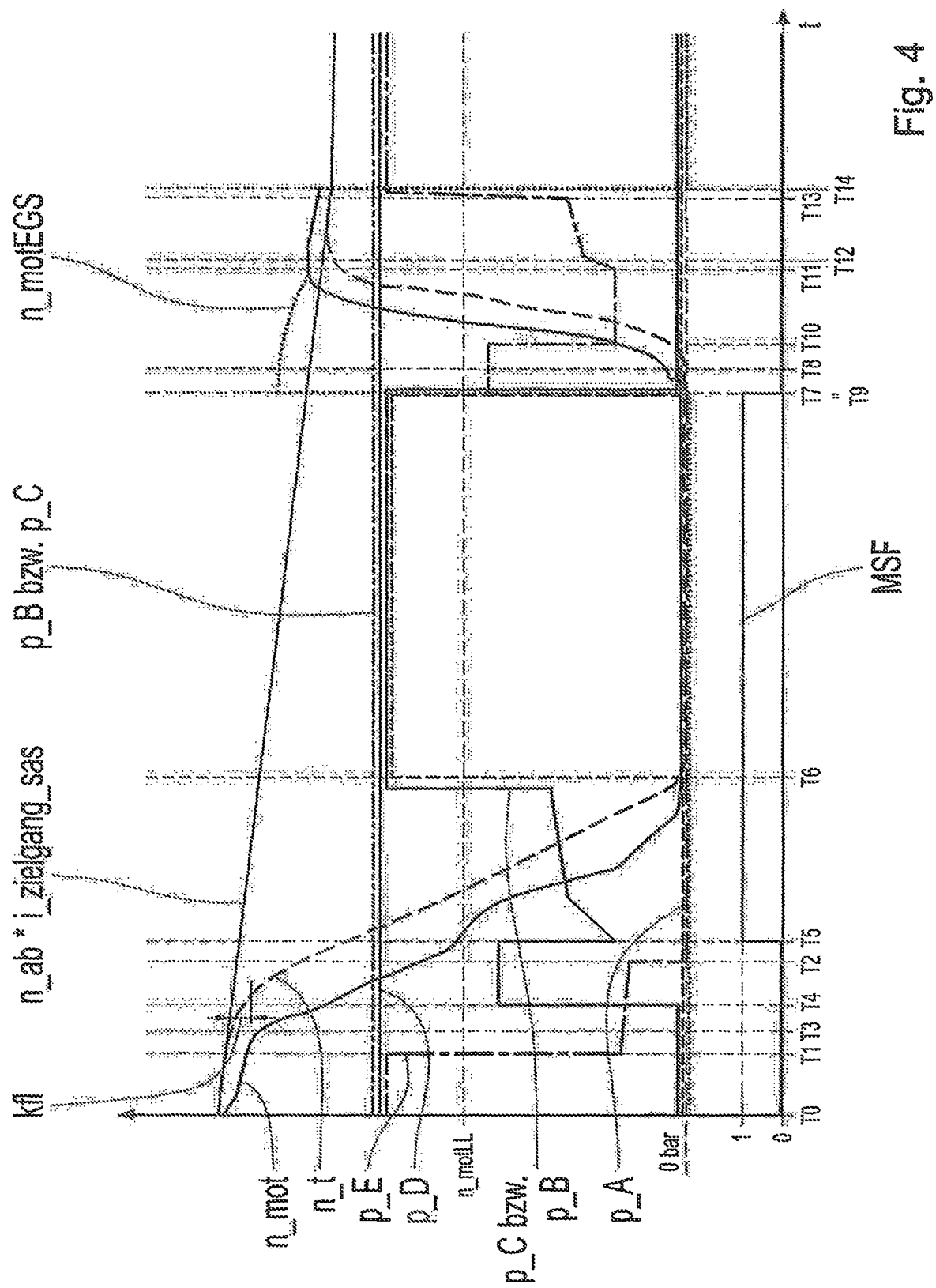
FIG. 4 is an illustration, corresponding to FIG. 3, of the profiles of the operating variables during an operating state profile which substantially corresponds to an operating state profile based on the profiles as per FIG. 3, wherein a shut-down process of a drive machine of the vehicle drivetrain is started already at a time point from which the demand for activation of the sailing operating state is present.

The operating state profile of the vehicle drivetrain 1 forming the basis of the profiles illustrated in FIG. 4 differs from the operating state profile of the vehicle drivetrain 1 forming the basis of the profiles of the various operating variables of the vehicle drivetrain 1 shown in FIG. 3 in that, during the operating state profile as per FIG. 4, the rotational speed n_mot of the drive machine 2 is lowered in the direction of zero already at the time point T5, that is to say in the present case at the end of the fast-charging phase of the shift element C or B, respectively. By contrast to this, during the operating state profile as per FIG. 3, the engine rotational speed n_mot of the drive machine 2 is lowered in the direction of zero only at the time point T6, at which the actuation pressure p_C or p_B, respectively, is raised to the closing pressure level.

The approach as per FIG. 3 offers the possibility of enabling a hydraulic supply to the gearbox 4 using a gearbox main pump (not illustrated in any more detail in the drawing) which is driven by the drive machine 2 via the gearbox input shaft 6, and the possibility for an electrically operated auxiliary pump of the gearbox 4 to be designed with a lower power capacity. By contrast to this, during the operating state profile of the vehicle drivetrain 1 in FIG. 4, proceeding from the time point T5, the hydraulic supply to the gearbox 4 must no longer be performed entirely by the gearbox main pump but must be performed increasingly by the electrical auxiliary pump of the gearbox 4, for which reason said auxiliary pump must be dimensioned correspondingly in order to implement the approach as per FIG. 4.

Furthermore, during the operating state profile of the vehicle drivetrain 1 based on FIG. 4, the positively engaging shift element A is not transferred into its closed operating state at the time point T6. Since, owing to the demand for deactivation of the coasting operating state present at the time point T7, an operating state of the vehicle drivetrain 1, it is necessary in the gearbox 4 to engage the eighth transmission ratio "8" or the ninth transmission ratio "9" for forward travel, for the realization of which the positively engaging shift element A has to be transferred into or held in the open operating state, the positively engaging shift element A is left in its open operating state at the time point T7 and, by contrast to the operating state profile of the vehicle drivetrain 1 as per FIG. 3, said positively engaging shift element does not have to be transferred into its open operating state for the first time at the time point T7.

Thus, the approach described with regard to FIG. 4 has an advantage in relation to the approach discussed with regard to FIG. 3. This advantage is that, in the gearbox 4 at the time point T6, it is not necessary for any present tooth-on-tooth positions in the region of the positively engaging shift element A. This advantage occurs because (1) the torque transfer capacity of one of the three simultaneously closed shift elements C, D or B is varied, removing the gear set 5 from its partially blocked operating state and (2) a rotational speed difference expedient for the engagement of shift element A is established between shift element halves of the positively engaging shift element A. Furthermore, any present bracing states in the region of the positively engaging shift element A at the time point T7, at which the positively engaging shift element A is transferred into its open operating state during the operating state profile according to FIG. 3, do not have to be eliminated by corresponding actuation of the torque transfer capacity of the shift element C or B which then additionally has to be deactivated, before the positively engaging shift element A can be transferred into its open operating state in order to realize the ninth transmission ratio "9" or the eighth transmission ratio "8" for forward travel.

Furthermore, the actuation of the frictionally engaging shift element E, which has to be transferred into its closed operating state in order to establish the power flow between the drive machine 2 and the drive output 3, can, from as early as the time point T7, at which the demand for deactivation of the sailing operating state of the vehicle drivetrain 1 is triggered, be transferred into its closed state with greater spontaneity than is possible during the operating state profile of the vehicle drivetrain 1 based on FIG. 3.

By contrast to this, the approach described with regard to FIG. 3, specifically the transfer of the positively engaging shift element A into its closed operating state as early as at the time point T6, has advantages in relation to the approach discussed with regard to FIG. 4 with regard to the spontaneity of the vehicle drivetrain 1 if a demand for deactivation of the sailing operating state of the vehicle drivetrain 1 demands an operating state of the vehicle drivetrain 1 for which, in the region of the gearbox 4, it is necessary to engage one of the transmission ratios "7" to "1" for forward travel, for the realization of which the positively engaging shift element A has to be transferred into or held in its closed operating state, because said shift element is then already present in its closed operating state at the time point T7.

Figure 5:
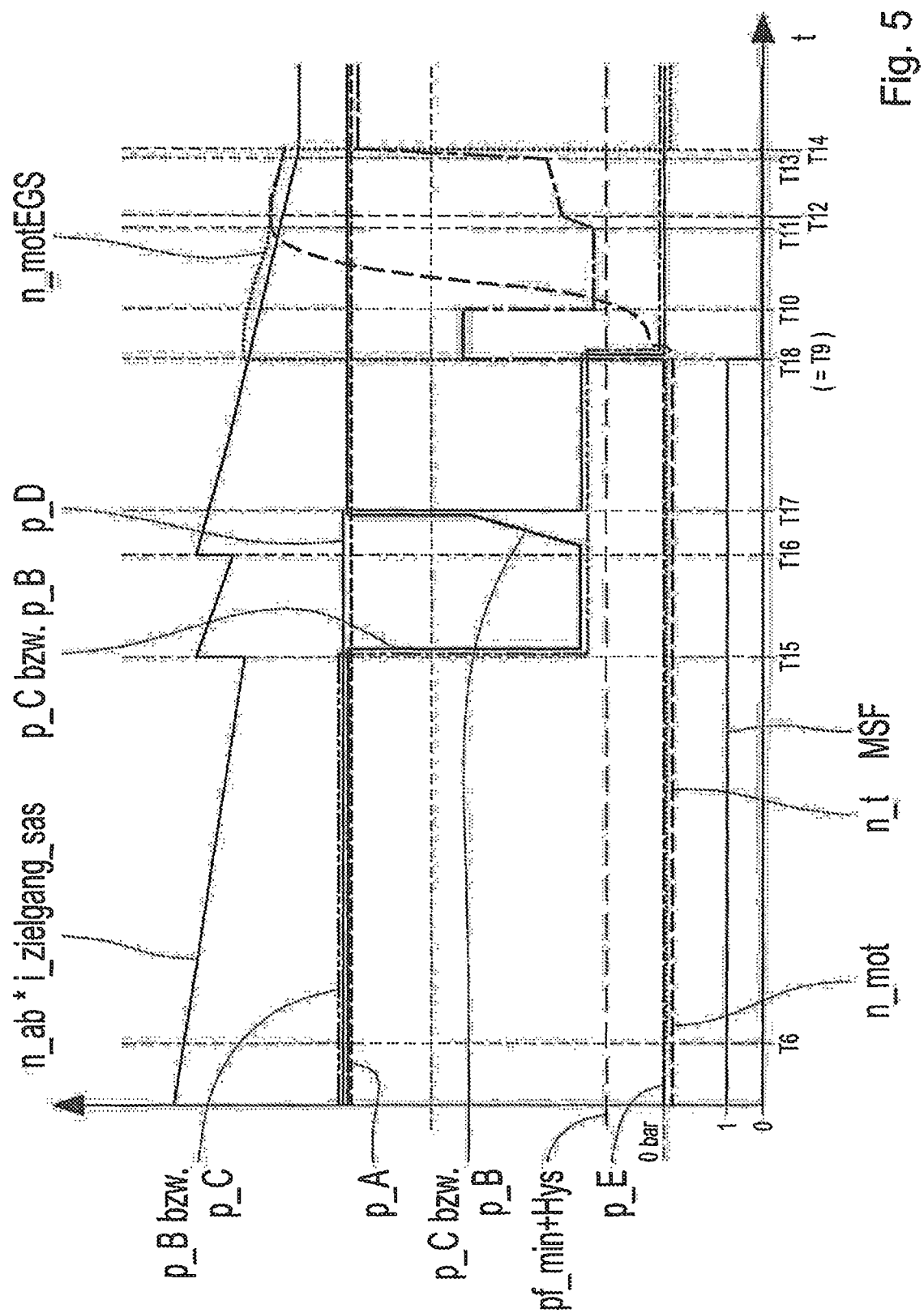
FIG. 5 shows the profiles of the operating variables in the presence of an active sailing operating state and a departure from the sailing operating state in the direction of an operating state of the vehicle drivetrain in which a positively engaging shift element has to be transferred into or held in a closed operating state.

FIG. 5 shows the profiles of the operating variables of the vehicle drivetrain 1 as per FIG. 3 and FIG. 4 during an operating state profile of the vehicle drivetrain 1 after the time point T6, at which the vehicle drivetrain 1 is already in the sailing operating state. Up to a time point T15, a superordinate driving strategy identifies that, in the event of a possible departure from the sailing operating state of the vehicle drivetrain 1, the eighth transmission ratio "8" or the ninth transmission ratio "9" for forward travel has to be engaged in the gearbox 4. At the time point T15, the driving strategy determines, in the case of an active sailing operating state of the vehicle drivetrain 1, that, in the event of a departure from the sailing operating state, the seventh transmission ratio "7" for forward travel has to be engaged in the gearbox 4. The positively engaging shift element A has already been transferred into its closed operating state at the time point T6, in the manner described with regard to FIG. 3.

Owing to the fact that the driving strategy has identified that the seventh transmission ratio "7" for forward travel has to be engaged in the gearbox 4 proceeding from the time point T15, either the actuation pressure p_B of the frictionally engaging shift element B or the actuation pressure p_C of the frictionally engaging shift element C is lowered at the time point T15 in order to increase the spontaneity of the gearbox 4, whereas the actuation pressure p_D of the frictionally engaging shift element D is maintained at the closing pressure level of the shift element D. The actuation pressure p_B or the actuation pressure p_C of the frictionally engaging shift element B or C is in this case higher, by an offset value, than a pressure value pf_min+Hys plus an offset value dependent on a hysteresis, which represents an actuation threshold above which the frictionally engaging shift elements B, C and D are in a slippage-free operating state in the presence of an active sailing operating state.

The pressure value pf_min+Hys plus a corresponding offset value corresponds to a pressure level above a transmission pressure level of the frictionally engaging shift elements B, C and D. It is thereby ensured that, in the presence of the active sailing operating state, the frictionally engaging shift elements B, C and D continue to be present in the closed operating state as a result of the charging with such a pressure level of the respective actuation pressure p_B, p_C or p_D, but with a significantly lower torque transfer capacity. This offers the advantage that, in the event of a failure, the risk of overdeterminacy of the gear set 5 of the gearbox 4 is reduced because, in the presence of a corresponding torque, the shift elements B, C, D are transferred by the latter into a slipping operation as desired, and thus a braking torque prevailing in the region of the gearbox output shaft 9 can be limited in a simple manner.

The spontaneity of the vehicle drivetrain 1 is increased, in particular in the region of the gearbox 4, by virtue of the fact that, in the presence of a corresponding demand for deactivation of the sailing operating state of the vehicle drivetrain 1 after the time point T15, only the frictionally engaging shift element E has to be closed, and the vehicle drivetrain 1 can be made available, within short operating times t, with the operating state demanded by the demand for deactivation of the sailing operating state.

In the present case, the vehicle drivetrain 1 remains in the sailing operating state even after the time point T15. At a subsequent time point T16, the driving strategy identifies that the profile n_ab*i_zielgang_sas has reached a value at which a potential demand for deactivation of the sailing operating state in turn demands an operating state of the vehicle drivetrain 1 for the establishment of which the sixth transmission ratio "6" or the fifth transmission ratio "5" has to be engaged in the region of the gearbox 4. For this reason, at the time point T16, the actuation pressure p_C or the actuation pressure p_B of the frictionally engaging shift element C or of the frictionally engaging shift element B, respectively, is increased as illustrated from the pressure level above the threshold value pf_min+Hys plus an offset value which allows for a hysteresis in the direction of the closing pressure level in the manner presented in FIG. 5, whereas the actuation pressure p_D of the frictionally engaging shift element D, at the time point T17 at which the actuation pressure p_C or p_B, respectively, reaches the closing pressure level, lowered to a pressure level above the threshold value pf_min+Hys plus offset.

In the present case, at a time point T18, a demand for deactivation of the sailing operating state of the vehicle drivetrain 1 is triggered, wherein the departure from the sailing operating state of the vehicle drivetrain 1 is performed towards an operating state of the vehicle drivetrain 1 for which either the sixth transmission ratio "6" or the fifth transmission ratio "5" for forward travel has to be engaged in the gearbox 4. At the time point T18, the shift elements A to D are already prepared for realizing such a demanded operating state of the vehicle drivetrain 1 and in particular of the gearbox 4. Therefore, proceeding from the time point T18, it is merely necessary for the frictionally engaging shift element E to be transferred as demanded into its closed operating state in the manner presented in FIG. 5.

The profile of the actuation pressure p_E of the frictionally engaging shift element E, the profile n_motEGS of the EGS engine target rotational speed setpoint and the profile of the rotational speed n_mot of the drive machine 2 substantially correspond, from the time point T18 onwards, to those sections of said profiles which are shown in FIG. 3 from the time point T9 onwards. Therefore, with regard to the actuation of the shift element E and the actuation of the drive machine 2 proceeding from the time point T18, reference is made here, for the sake of clarity, to the above description relating to FIG. 3 and to the approach discussed there regarding the actuation of the shift element E and of the drive machine 2 proceeding from the time point T9. In general, from the time point T9 onwards or from the time point T18 onwards, the departure from the sailing operating state takes place with a simultaneous restart of the drive machine 2 and with rotational-speed control, which is in turn likewise performed simultaneously, in the region of the drive machine 2.

Figure 6:
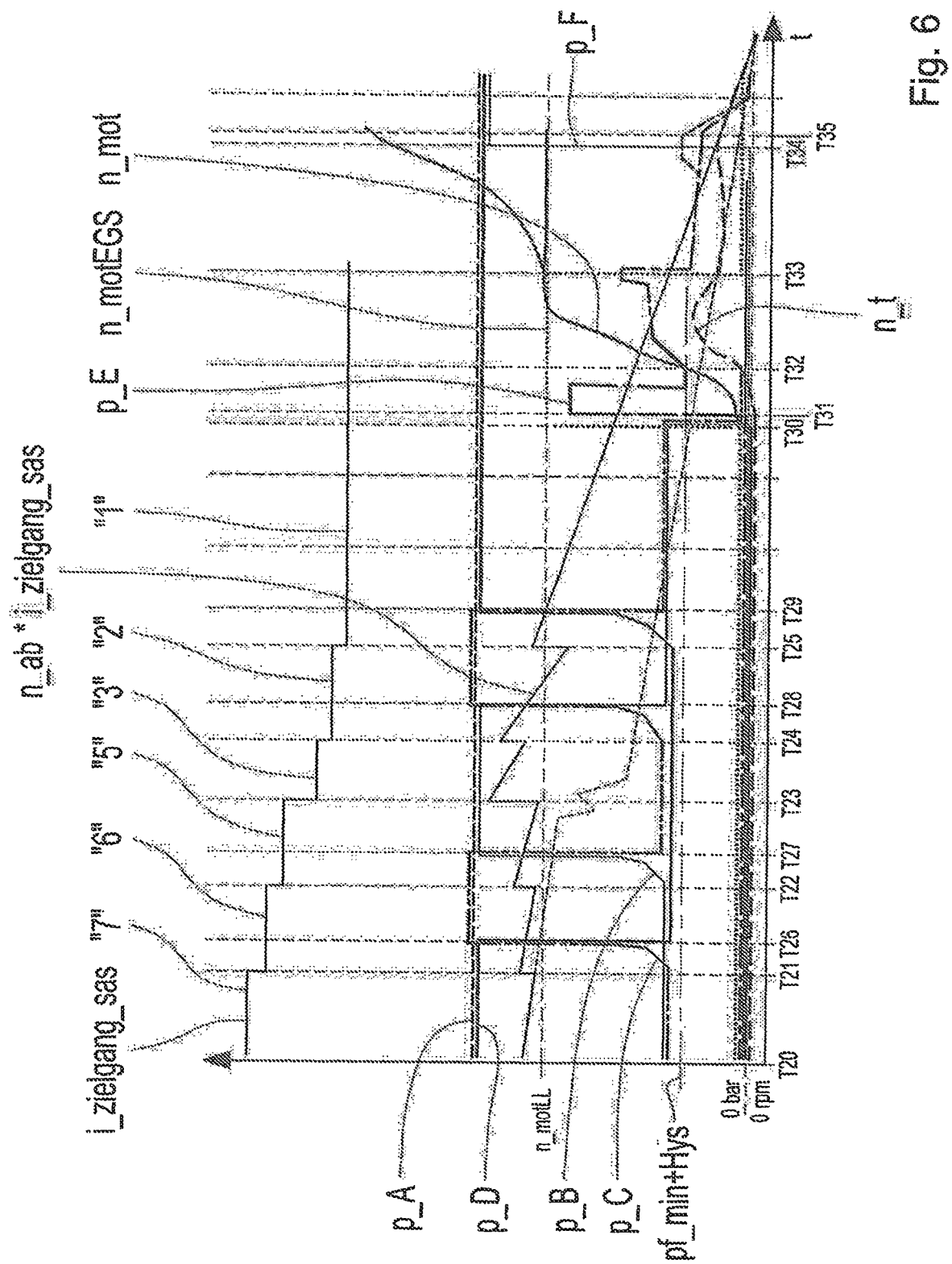
FIG. 6 shows the profiles of the operating variables of the vehicle drivetrain in the presence of an active sailing operating state which is deactivated only shortly before the vehicle comes to a standstill.

FIG. 6 shows the various profiles of the operating variables of the vehicle drivetrain 1 proceeding from a time point T20, which lies between the time points T15 and T16 as per FIG. 5 and at which the sailing operating state of the vehicle drivetrain 1 is activated. If a demand for deactivation of the sailing operating state is triggered at the time point T20, the seventh transmission ratio "7" for forward travel has to be engaged in the region of the gearbox 4. The positively engaging shift element A is closed owing to the prevailing actuation pressure p_A. At the same time, the frictionally engaging shift element D is also present in the closed operating state, said shift element being charged with an actuation pressure p_D which is at the closing pressure level, whereas the frictionally engaging shift element C is charged with an actuation pressure p_C which is higher, by an offset value, than the pressure value pf_min plus the offset value.

With progressive operating time t, in the continued presence of an active sailing operating state of the vehicle drivetrain 1 and in each case at the time points T21, T22, T23, T24 and T25, the so-called sailing clutch logic determines through a gearspeed tracking function, which increases the spontaneity upon departure from the sailing operating state of the vehicle drivetrain 1, that respectively the sixth transmission ratio "6", the fifth transmission ratio "5", the third transmission ratio "3", the second transmission ratio "2" or the first transmission ratio "1" has to be engaged in the gearbox 4. Therefore, at the time point T26, the actuation pressure p_D is lowered to the level above the pressure threshold pf_min+Hys plus offset value, whereas the actuation pressure p_C is raised to the closing pressure level. In the same way, at a time point T27, which is after the time point T22, the actuation pressure p_B of the frictionally engaging shift element B is adjusted to the closing pressure level, whereas the actuation pressure p_C of the frictionally engaging shift element C is lowered to the pressure level above the pressure threshold pf_min+Hys plus the offset value. At the time point T23, it is the case here that no clutch logic change occurs, whereas, at a time point T28, which follows the time point T24, the actuation pressure p_C is raised to the closing pressure level and the actuation pressure p_B of the frictionally engaging shift element B is lowered to the pressure level above the pressure threshold pf_min+Hys plus the offset value, whereby the gearbox 4 is prepared for the engagement of the second transmission ratio "2" for forward travel.

Proceeding from a time point T29, which follows the time point T25, the gearbox 4 is prepared for the engagement of the first transmission ratio "1" for forward travel by raising the actuation pressure p_D of the shift element D to the closing pressure level, whereas the actuation pressure P_C of the frictionally engaging shift element C is lowered to the pressure level above the pressure threshold pf_min+Hys plus the offset value.

The latter approach results from the fact that, in the operating state profile of the vehicle drivetrain 1 under consideration, the vehicle speed progressively decreases in the presence of an active sailing operating state and it is detected through the sailing clutch logic that, with progressive operating time t, the gearspeed that has to be engaged in the gearbox in each case upon a departure from the sailing operating state changes and a respectively lower gear or a respectively lower transmission ratio has to be engaged. Since, for the engagement of the transmission ratios "4" to "1" for forward travel, it is necessary in each case for the further positively engaging shift element F to be transferred into the closed operating state, it is necessary before engagement of the transmission ratios "3" to "1" for synchronization gears, or the synchronization transmission ratios "5", "6" or "7", which correspond in each case to the transmission ratios "3" to "1", to be engaged in the region of the gearbox 4.

This means that, in the presence of a demand for deactivation of the sailing operating state and for an operating state of the vehicle drivetrain to be established for this purpose, in which the third transmission ratio "3" for forward travel has to be engaged in the gearbox 4, the fifth transmission ratio "5" is engaged in the gearbox 4 first, and subsequently, a downshift is performed from the fifth transmission ratio "5" towards the third transmission ratio "3", during which the further positively engaging shift element F can then likewise, with the positively engaging shift element A already closed, be transferred into its closed operating state accordingly with little effort.

In the event that the second transmission ratio "2" for forward travel has to be engaged in the gearbox 4 as a result of a demand for deactivation of the sailing operating state, first the sixth transmission ratio "6" for forward travel is engaged in the gearbox 4, and subsequently the downshift is performed from the sixth transmission ratio "6" in the direction of the second transmission ratio "2", during which the further positively engaging shift element F is engaged in addition to the already-closed shift element A. It is furthermore provided that the seventh transmission ratio "7" is engaged first in the gearbox 4, and subsequently the downshift is performed from the seventh transmission ratio "7" in the direction of the first transmission ratio "1", if the first transmission ratio stage "1" has to be engaged in the region of the gearbox 4 as a result of a demand for deactivation of the sailing operating state of the vehicle drivetrain 1. Then, the further positively engaging shift element F can be transferred into its closed operating state as desired in addition to the already-closed positively engaging shift element A.

In the present case, at a time point T30, the demand for deactivation of the sailing operating state in the region of the gearbox 4 occurs, for which the first transmission ratio "1" for forward travel has to be engaged in the gearbox 4. In order for the further positively engaging shift element F to be transferred into its closed operating state as desired, the frictionally engaging shift element D and the positively engaging shift element A are correspondingly charged, proceeding from the time point T29, with their actuation pressures p_D and p_A, which are at the closing pressure level. At the time point T30, the actuation pressures p_C and p_B are reduced to zero, and the frictionally engaging shift elements C and B are transferred into their open operating state. Furthermore, the drive machine 2 is activated, whereby the profile of the rotational speed n_mot of the drive machine 2 increases, proceeding from the time point T30, in the direction of the idle rotational speed n_motLL in a manner controlled in closed-loop fashion as a function of the EGS engine target rotational speed setpoint.

At a time point T31, which follows the time point T30, the frictionally engaging shift element E is charged with a fast-charging pulse during a fast-charging phase and is subsequently charged with a charging compensation pressure during a charging compensation phase, wherein the charging compensation phase ends in the present case at a time point T32. Subsequently, the actuation pressure p_E is increased according to a first pressure ramp proceeding from the time point T32, whereby the synchronization transmission ratio which corresponds to the first transmission ratio "1", or the seventh transmission ratio "7", is engaged in the gearbox 4. With further increasing actuation pressure p_E of the frictionally engaging shift element E, the turbine rotational speed n_t increases in the direction of the profile n_ab*i_zielgang_sas, and corresponds to this profile at the time point T33, at which the shift element E exhibits its full torque transfer capacity. At the time point T33, the actuation pressure p_E of the frictionally engaging shift element E is in turn lowered to the level of the pressure threshold pf_min+Hys plus the offset value in order to transfer the further positively engaging shift element F as desired into an operating state expedient for the activation thereof. Here, a rotational speed difference between the shift element halves of the further positively engaging shift element F is transferred into a rotational speed difference window expedient for the activation of the further positively engaging shift element F, and the further positively engaging shift element F is, at a time point T34, charged with the actuation pressure p_F required for the activation and transferred into its closed operating state.

At a time point T35 following shortly thereafter T34, it is detected that the further positively engaging shift element F is present in the closed operating state, because, at the time point T35, the profile of the turbine rotational speed n_t corresponds to the profile n_ab*i_zielgang_sas, which in a known manner arises in the case of the first transmission ratio "1" being engaged in a gearbox 4. For this reason, at the time T35, the actuation pressure p_E of the shift element E is reduced to zero in the illustrated manner, and the frictionally engaging shift element E is fully opened, whereby the sailing operation is deactivated and the vehicle drivetrain 1 is in the demanded operating state.

The approach according to the invention is particularly suitable for gear set concepts in conjunction with correspondingly designed shift elements arranged in the gear set, in the case of which, as a result of the opening of a frictionally engaging shift element, the drive output of a vehicle drivetrain can rotate independently of the gear set of the gearbox. This is, in the exemplary embodiment of the automatic gearbox 4 being considered here, the shift element E. Through the further shift elements (more specifically the brakes D and C), one shift element half of the positively engaging shift element A (more specifically the rotational speed thereof) can be set to zero. Furthermore, the rotational speed of the further shift element half of the shift element A and of the gearbox input shaft 6 can be set to zero by closing shift element B in the presence of an active sailing operating state of the vehicle drivetrain 1. Through this active blocking of the gear set 5, pressure level changes of the actuation pressures of the shift elements can be performed dynamically during the above-described gearspeed tracking, and can be set as in the case of conventionally implemented overlapping shifts.

If the shift elements B, C or D are charged with a pressure level above the charging pressure, such as is required for the blocking of the gear set 5, the blocking of the gear set 5 is maintained, and the turbine rotational speed n_t is equal to zero. Thus, over the entire operating range of the gearbox 4, fast gearspeed tracking can be implemented, and charging of the shift elements B, C or D using an electrically driveable auxiliary pump of the gearbox 4 is not necessary. If a restart of the drive machine 2 is demanded by a corresponding demand for deactivation of the sailing operating state, those shift elements of the gearbox 4 which are respectively not required for realizing the demanded operating state of the vehicle drivetrain can be easily deactivated by reducing the respective actuation pressure.

The gearspeed tracking, described in particular with regard to FIGS. 5 and 6, in the presence of the active sailing operating state of the vehicle drivetrain 1 in the region of the gearbox 4 can also be implemented in the opposite direction in the case of increasing vehicle speed and increasing drive output speed n_ab. Such an increase in the drive output rotational speed occurs for example when a vehicle equipped with a vehicle drivetrain that can be operated in accordance with the invention is traveling downhill. Furthermore, it is also possible for the vehicle speed to be increased using a further drive of a vehicle which is independent of the drive machine, such as for example an electric vehicle axle or the like.

Regardless of the event that increases the drive output speed, in the event of a transition into the sailing operating state of the vehicle drivetrain 1 in the case of lower transmission ratios "1" to "8" for forward travel engaged in the gearbox 4, that the gear set 5 is firstly transferred as described above into the partially blocked operating state by closure of the shift elements B, C and D. Subsequently, it is monitored in each case whether a higher transmission ratio has to be engaged in the gearbox 4 than at the time point at which the sailing operating state of the vehicle drivetrain 1 was activated in order to realize the operating state of the vehicle drivetrain 1 required for a departure from the sailing operating state at the present operating point of the vehicle drivetrain 1. If this is the case, the gearbox 4 is respectively actuated through corresponding actuation of the shift elements A to F as required for the purpose, and preparation is made for the transmission ratio to be engaged in the region of the gearbox 4 in a manner dependent on the respectively present operating point of the vehicle drivetrain, in such a way that, in the event of a departure from the sailing operating state, the demanded operating state of the vehicle drivetrain can be realized within short operating times.

Figure 7:
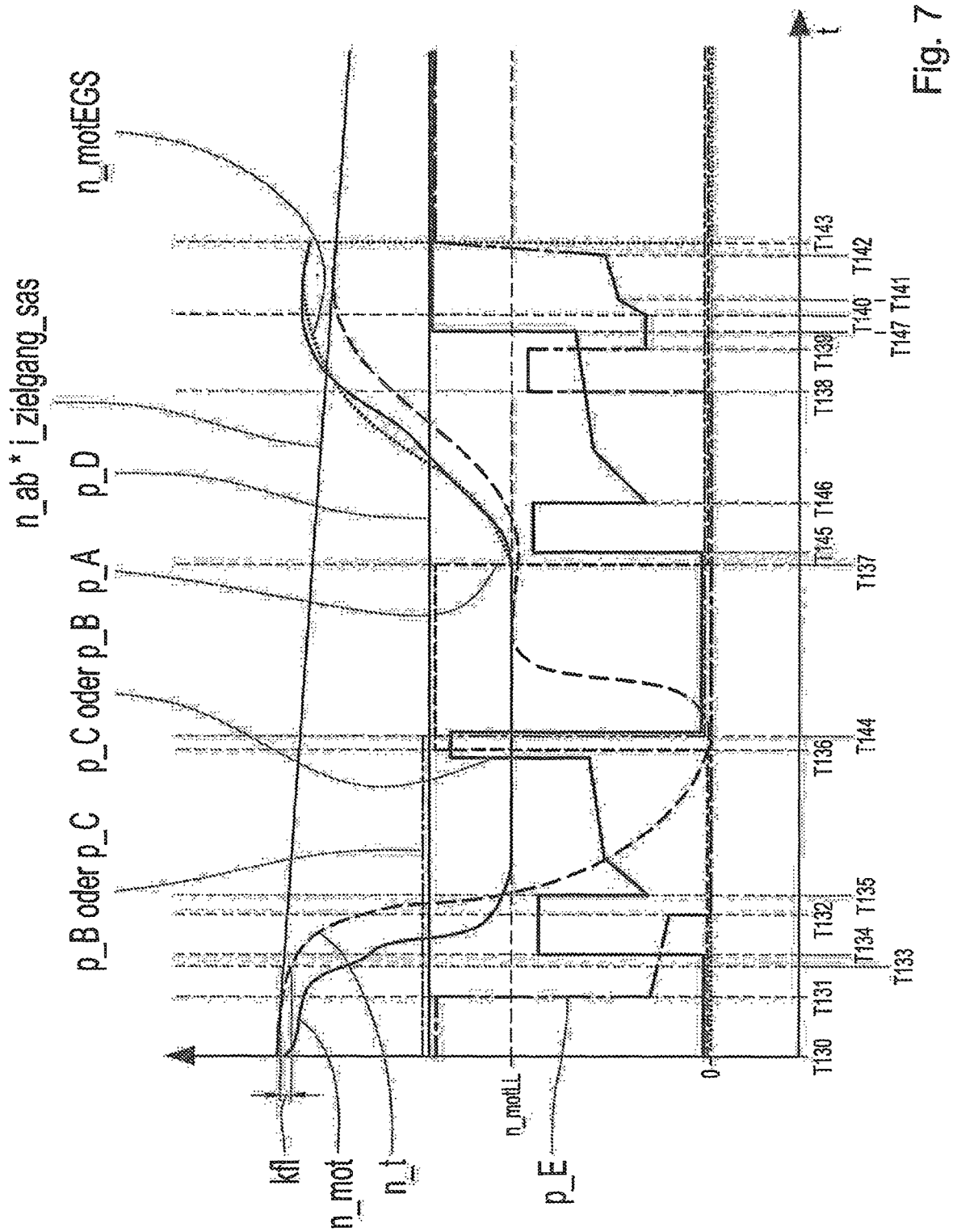
FIG. 7 shows multiple profiles, versus the time t, of different operating variables of the vehicle drivetrain as per FIG. 1 which, in accordance with a demand, is transferred into a sailing operating state which is in turn deactivated at a later time point.

FIG. 7 to FIG. 11 show in each case several profiles of different operating variables of the vehicle drivetrain 1 versus the time t, wherein, at a time point T130 denoted in more detail in FIG. 7, the vehicle drivetrain 1 is in turn in a driving operating state in which the eighth transmission ratio "8" or the ninth transmission ratio "9" for forward travel is engaged in the gearbox 4 and a rotational speed n_mot of the drive machine 2 is higher than an idle rotational speed n_motLL of the drive machine 2. At the time point T130, a demand is made for realizing a sailing operating state of the vehicle drivetrain 1 during which the drive machine 2 is active and the power flow between the drive machine 2 and the drive output 3 is interrupted in the region of the gearbox 4. Proceeding from the time T130, the rotational speed n_mot of the drive machine 2 is adjusted increasingly towards the idle rotational speed n_motLL as illustrated. For activation of the sailing operating state of the vehicle drivetrain 1, proceeding from the time point T131, the frictionally engaging shift element E is, by corresponding lowering of the actuation pressure p_E, transferred into its open operating state in the manner illustrated in FIG. 7 until the time point T132, and the power flow between the drive machine 2 and the drive output 3 is thereby disconnected in the region to gearbox 4.

The lowering of the torque transfer capacity of the frictionally engaging shift element E has the effect that, proceeding from a time point T133 which lies between the time points T131 and T132, the rotational speed n_t of the gearbox input shaft 6 deviates from the product of the rotational speed n_ab of the drive output 3 and the transmission ratio i_zielgang_sas presently engaged in the gearbox at the time point T130. If the deviation between the turbine rotational speed n_t and the product of the rotational speed n_ab multiplied by the transmission ratio i_zielgang_sas exceeds a threshold value kfl, then in the present case the disconnected power flow between the drive machine 2 and the drive output 3 in the region of the gearbox 4 is detected. This occurs in the present case at a time point T134, which lies between the time points T133 and T132.

At the time T134, in the case of the ninth transmission ratio "9" for forward travel engaged in the gearbox 4, the actuation pressure p_C of the frictionally engaging shift element C is raised in abrupt fashion, in the manner illustrated in idealized fashion in FIG. 7, to the level of the fast-charging pressure and is maintained at said level until a time point T135. Subsequently, the actuation pressure p_C is lowered, at the time point T135, to an intermediate pressure level and is raised in ramped fashion through two successive pressure ramps until a time point T138, at which the frictionally engaging shift element C is in a slippage-free operating state. At the time point T136, the actuation pressure p_C is raised to a level at which the frictionally engaging shift element C is fully closed.

If, at the time point T130, the eighth transmission ratio "8" for forward travel is engaged in the gearbox 4, it is the case that, between the time points T134 and T136, instead of the actuation pressure p_C, the actuation pressure p_B of the frictionally engaging shift element B is adjusted in the last-described manner in order to transfer the frictionally engaging shift element B into the closed operating state in addition to the frictionally engaging shift elements C and D.

In the closed operating state of the frictionally engaging shift elements C, D and B, the gear set 5 of the gearbox 4 is in a partially blocked operating state in which the gearbox input shaft 6 is held rotationally fixed and the gearbox output shaft 9 connected to the drive output 3 is rotatable. In this operating state of the gearbox 4, an increase of the actuation pressure p_A of the positively engaging shift element A occurs, whereby the positively engaging shift element A is transferred into its closed operating state. At the same time, the drive machine 2 is operated at the idle rotational speed n_motLL.

At a time point T144, the closed operating state of the shift element A is detected, as a result of which both the actuation pressure p_B of the frictionally engaging shift element B and also the actuation pressure p_C of the frictionally engaging shift element C are lowered in the manner illustrated to zero at the time point T144, whereby, at the time T144, the sailing operating state of the vehicle drivetrain 1 demanded at the time point T130 is activated as desired.

In the present case, the sailing operating state is demanded by a demand from a driver, for example by a release of an accelerator pedal and an actuation, preferably by the driver, of the service brake. In addition or as an alternative to this, it is also possible for the sailing operating state to be demanded by a superordinate driving strategy if no demand for power is made by the driver and it is additionally determined that a driving route, determined for example using a navigation system, can be traveled at least in sections in sailing operation with low fuel consumption.

In the present case, in the manner shown in FIG. 7, the vehicle drivetrain 1 remains in the sailing operating state up until a time point T137. At the time point T137, it is for example the case that the driver actuates the accelerator pedal again and demands a corresponding level of power from the drive machine 2. This demand for power from the driver has the effect that the rotational speed n_mot of the drive machine 2 increases proceeding from the time point T137. To prevent an uncontrolled increase of the engine rotational speed n_mot, the drive machine 2 is operated in the closed-loop rotational speed control mode proceeding from the time point T137, and a gearbox-side engine target rotational speed setpoint which corresponds to the profile n_motEGS is implemented. As a result of the activation of the engine target rotational speed setpoint, the engine rotational speed n_mot is, proceeding from the time point T137, raised to a level which lies above the rotational speed n_t of the gearbox input shaft 6, which emerges from the product of the drive output rotational speed n_ab and the transmission ratio i_zielgang_sas to be engaged in the gearbox 4 at the time point T137.

Since, at the time point T137, the vehicle drivetrain 1 is in an operating state in which, in the presence of a deactivated sailing operating state, the transmission ratio engaged in the gearbox 4 at the time point T130 has to be engaged in the gearbox 4, that is to say the ninth transmission ratio "9" or the eighth transmission ratio "8" for forward travel, the actuation pressure p_A of the positively engaging shift element A is lowered at the time point T137, and the positively engaging shift element A is transferred, at the time point T137, into its open operating state. At a time point T145 which follows the time point T137, the open operating state of the positively engaging shift element A is detected, and the frictionally engaging shift element C or B is precharged by a fast-charging pulse which lasts until a time point T146. At the time point T146, the actuation pressure p_C or p_B is adjusted to an intermediate pressure level, and is raised to a further intermediate pressure level in ramped fashion through two successive pressure ramps until a time point T147, at which the frictionally engaging shift element C or B is in a slippage-free operating state. At the time point T147, the actuation pressure p_C or p_B is raised to the closing pressure level, at which the frictionally engaging shift element C or B is fully closed.

With increasing rotational speed n_mot of the drive machine 2, the turbine rotational speed n_t also increases and follows the profile of the rotational speed n_mot of the drive machine 2. Proceeding from a time point T138, the actuation pressure p_E of the frictionally engaging shift element E is prepared for the activation of the shift element E, in the manner shown in FIG. 7, during a fast-charging phase which lasts until a time point T139 and a charging compensation phase which follows said fast-charging phase and which lasts until a time point T140.

At the time point T140, the frictionally engaging shift element E is in an operating state in which the torque transfer capacity of the frictionally engaging shift element E is substantially equal to zero and a further increase in the actuation pressure p_E results in an immediate increase of the torque transfer capacity of the frictionally engaging shift element E. Proceeding from the time point T140, the actuation pressure p_E is raised through a pressure ramp which lasts until a time point T141. At the time point T140, the actuation pressure p_E of the frictionally engaging shift element E is in the present case increased by the first pressure ramp which follows the charging compensation phase if, for the traction operation of the vehicle drivetrain 1 under consideration here, the value of the rotational speed n_mot of the drive machine 2 has reached or even exceeded the profile n_ab*i_zielgang_sas, and a rotational speed difference Nd_Syn between the shift element halves of the shift element E to be activated is close to the synchronous rotational speed or less than or equal to a threshold value.

By contrast to this, proceeding from the time point T140, the actuation pressure p_E of the shift element E to be activated is, in coasting operation of the vehicle drivetrain 1 in a manner not illustrated in any more detail, increased by the first pressure ramp which follows the charging compensation phase if: 1) the value of the rotational speed n_mot of the drive machine 2 lies below or corresponds to the profile n_ab*i_zielgang_sas and 2) a rotational speed difference Nd_Syn between the shift element halves of the shift element E to be activated is close to the synchronous rotational speed or less than or equal to a threshold value.

Subsequently the actuation pressure p_E of the frictionally engaging shift element E is increased further by a further pressure ramp, the gradient of which is smaller than that of the pressure ramp present between the time points T140 and T141. At the end of the second pressure ramp, that is to say in the present case at the time point T142, the frictionally engaging shift element E is present in a slippage-free operating state and the turbine rotational speed n_t corresponds to the product of the drive output rotational speed n_ab and the transmission ratio i_zielgang_sas to be engaged in the gearbox 4 demanded at the time point T137, which transmission ratio in the present case corresponds either to the ninth transmission ratio "9" or the eighth transmission ratio "8".

In this case, too, the engine rotational speed n_mot is adjusted by adjusting the gearbox-side engine target rotational speed setpoint to a level above a current value of the profile of the product n_ab*i_zielgang_sas in order to avoid, during the establishment of the power flow between the drive machine 2 and the drive output 3 in the region of the gearbox 4, an undesired crossing of rotational speeds between the rotational speed n_mot of the drive machine 2 and the turbine rotational speed n_t, which is determined from the transmission ratio i_zielgang to be engaged in the gearbox 4 and the drive output rotational speed n_ab.

At the time point T143, the actuation pressure p_E of the frictionally engaging shift element E is at the closing pressure level, and the operating state of the vehicle drivetrain 1 demanded at the time point T137 has been established as desired at the time point T143. After the time point T143, proceeding from which the sailing operating state of the vehicle drivetrain 1 has been ended, any demanded subsequent shifts can be performed as desired in the gearbox 4.

The approach described with regard to FIG. 7, specifically the transfer of the positively engaging shift element A into its closed operating state already at the time point T136, offers advantages with regard to the spontaneity of the vehicle drivetrain 1 if a demand for deactivation of the sailing operating state of the vehicle drivetrain 1 demands an operating state of the vehicle drivetrain 1 for which, in the region of the gearbox 4, it is necessary to engage one of the transmission ratios "7" to "1" for forward travel, for the realization of which the positively engaging shift element A has to be transferred into or held in its closed operating state, because said shift element is then already present in its closed operating state at the time point T137.

Thus, in a simple manner, a situation is avoided in which, in the presence of high likelihood of a departure from sailing as a result of a load demand from a driver, a downshift is demanded during which the positively engaging shift element A has to be transferred into its closed operating state. Long shift times and low performance after a departure from sailing, owing to a dog-clutch downshift to be performed in accordance with a demand during a departure from sailing, are thus avoided. During the synchronization of the positively engaging shift element A to be activated, the converter lock-up clutch 8 is opened in order to prevent stalling of the drive machine 2 owing to the gearbox input shaft 6 being held rotationally fixed. Subsequently, during the active sailing operating state, the actuation of the converter lock-up clutch 8 performed before the demand for activation of the sailing operating state is enabled again.

As an alternative it may also be provided that the vehicle drivetrain is configured, in the region between the drive machine and the gearbox, with only one frictionally engaging shift element or, more specifically, one frictionally engaging clutch which is operated with open-loop and/or closed-loop control to an extent corresponding to the actuation of the converter lock-up clutch in order, as desired, to synchronize the positively engaging shift element A to be activated and simultaneously prevent stalling of the drive machine 2.

In order to ensure the engagement of the positively engaging shift element A during a transition into sailing, the closing of the frictionally engaging shift elements B, C and D provided simultaneously for the closure of the positively engaging shift element A can be varied by opening the frictionally engaging shift element B in order to eliminate a tooth-on-tooth position that exists in the region of the positively engaging shift element A, because a high torque can be imparted to the positively engaging shift element A by opening the frictionally engaging shift element B.

It is also possible to provide, in the region of the drive machine 2, an engine torque intervention in which the rotational speed n_mot of the drive machine 2 is increased proceeding from the idle rotational speed n_motLL in order to impart a disturbance torque which eliminates the tooth-on-tooth position in the region of the positively engaging shift element A. In addition or alternatively to this, it is also possible to briefly increase the torque transfer capacity of the converter lock-up clutch 8 in order to eliminate the tooth-on-tooth position in the region of the positively engaging shift element A by eliminating the partial blocking of the gear set 5.

By contrast to this, it is also possible for the positively engaging shift element A to be partially closed by the actuation in the closing direction but not to reach its desired end position and thus its fully closed operating state. If a torque prevails at the positively engaging shift element A which prevents the complete closure of the positively engaging shift element A, the shift elements B, C and A continue to be actuated in the closing direction during the closing process of the shift element A, while the frictionally engaging shift element D is transferred into its closed operating state, whereby the torque prevailing at the positively engaging shift element A is reduced to an extent which promotes the closing process, and a so-called release of claw load is performed.

Such torques which impair the closing process of the positively engaging shift element A result inter alia from gearbox-internal drag torques and further influences which subject the positively engaging shift element A, during its closing process, to such a high torque that a complete sliding-in movement is no longer possible.

The approach described above with regard to FIG. 7 of transferring the positively engaging shift element A into its closed operating state already during the transition into sailing offers considerable improvements with regard to the spontaneity of the vehicle drivetrain 1 during a transition into sailing proceeding from the transmission ratios "9" or "8" at vehicle speeds slower than a threshold value, because then, upon a departure from sailing, it is necessary in any case for a lower gear to be engaged in the gearbox 4, and the departure from sailing will in any case involve a downshift. In the presence of relatively high vehicle speeds, this approach may however be disturbing and disadvantageous because the positively engaging shift element A does not have to be transferred into the closed operating state in order to realize an operating state of the vehicle drivetrain 1 demanded as a result of a departure from sailing. Therefore, a speed-dependent definition of the strategy for dog-clutch conditioning is provided in order for the preconditioning of the positively engaging shift element A, as described with regard to FIG. 7, during the active sailing operating state of the vehicle drivetrain to be limited to operating ranges in which the preconditioning effects an improvement in spontaneity.

This means that, upon a transition into sailing proceeding from operating states in which the transmission ratio "9" or "8" for forward travel is engaged in the gearbox 4, the positively engaging shift element A is not transferred into its closed operating state if the vehicle speed is higher than the threshold value and, a present demand for deactivation of the sailing operating state, for an operating state of the vehicle drivetrain 1 to be realized in which the eighth transmission ratio "8" or the ninth transmission ratio "9" for forward travel has to be engaged in the gearbox 4, the positively engaging shift element A has to be transferred into or held in the open operating state. Then, the positively engaging shift element A is left in its open operating state at the time point T136 and, by contrast to the operating state of the vehicle drivetrain 1 as per FIG. 7, said positively engaging shift element A does not have to be transferred into its open operating state at the time point T137.

This approach has advantages in relation to the approach discussed with regard to FIG. 7. First, at the time point T136, in the gearbox 4, it is not necessary for any present tooth-on-tooth positions in the region of the positively engaging shift element A owing to the partially blocked operating state of the gear set 5 to first be eliminated by corresponding variation of the torque transfer capacity of one of the three simultaneously closed shift elements C, D or B. Further, in the region of the positively engaging shift element A, it is not necessary for a rotational speed difference expedient for the activation thereof to be established between shift element halves of the positively engaging shift element A. Furthermore, any present bracing states in the region of the positively engaging shift element A at the time point T137, at which the positively engaging shift element A is transferred into its open operating state during the operating state profile based on FIG. 7, do not have to be eliminated by corresponding changing of the torque transfer capacity of the shift element C or B which then additionally has to be deactivated before the positively engaging shift element A can be transferred into its open operating state in order to realize the ninth transmission ratio "9" or the eighth transmission ratio "8" for forward travel.

Furthermore, the actuation of the frictionally engaging shift element E, which has to be transferred into its closed operating state in order to establish the power flow between the drive machine 2 and the drive output 3, can, from as early as the time point T137, at which the demand for deactivation of the sailing operating state of the vehicle drivetrain 1 is triggered, be transferred into its closed operating state with greater spontaneity than is possible during the operating state profile of the vehicle drivetrain 1 based on FIG. 7.

If the vehicle drivetrain 1 is in sailing operation and if the gearbox 4 is operated over relatively long operating periods in accordance with the second variant of the shift logic such that the positively engaging shift element A is already activated and the shift element E is additionally held in the closed operating state, excessively high drag torques are permanently generated in the gearbox 4 during constant driving operation. Therefore, after a defined operating time has elapsed, the gearbox 4 is operated in accordance with the first variant of the shift logic. Here, the present gradient of the rotational speed n_ab of the drive output 3 constitutes in each case a decision criterion as regards whether, in the presence of an active sailing operating state of the vehicle drivetrain 1, the gearbox 4 is operated permanently in accordance with the first variant or in accordance with the second variant of the shift logic.

If (1) the vehicle drivetrain 1 is in the sailing operating state in the presence of a drive output rotational speed n_ab at which the eighth transmission ratio "8" or the ninth transmission ratio "9" has to be engaged in the gearbox 4 upon a departure from the sailing operating state, (2) the gearbox 4 is actuated in accordance with the first variant or the second variant of the shift logic, and (3) both the positively engaging shift element A and the frictionally engaging shift element E are present in the closed operating state, then, in the presence of a demand for realization of a neutral operating state of the gearbox 4 for which the positively engaging shift element A has to be held in or transferred into the open operating state, a gearspeed jump in the direction of the seventh transmission ratio "7" is performed by software before the realization of the neutral operating state. Thus, in a simple manner, the neutral operating state of the gearbox 4 is implemented in accordance with a demand in the presence of a simultaneously engaged positively engaging shift element A.

This offers the advantage that the new shift logic, during which the positively engaging shift element A is preconditioned in the sailing operating state of the vehicle drivetrain 1, can, for the case of a demanded gear disengagement process which is assigned the highest priority, be implemented without a new shift sequence, and additional hardware resources are not required. Using this approach, existing shift sequences remain possible with little outlay, and gear disengagement sequences can be implemented with high spontaneity, because the power transmission in the region of the gearbox 4 is already fully completely reduced before the positively engaging shift element A is transferred into its open operating state.

Figure 8:
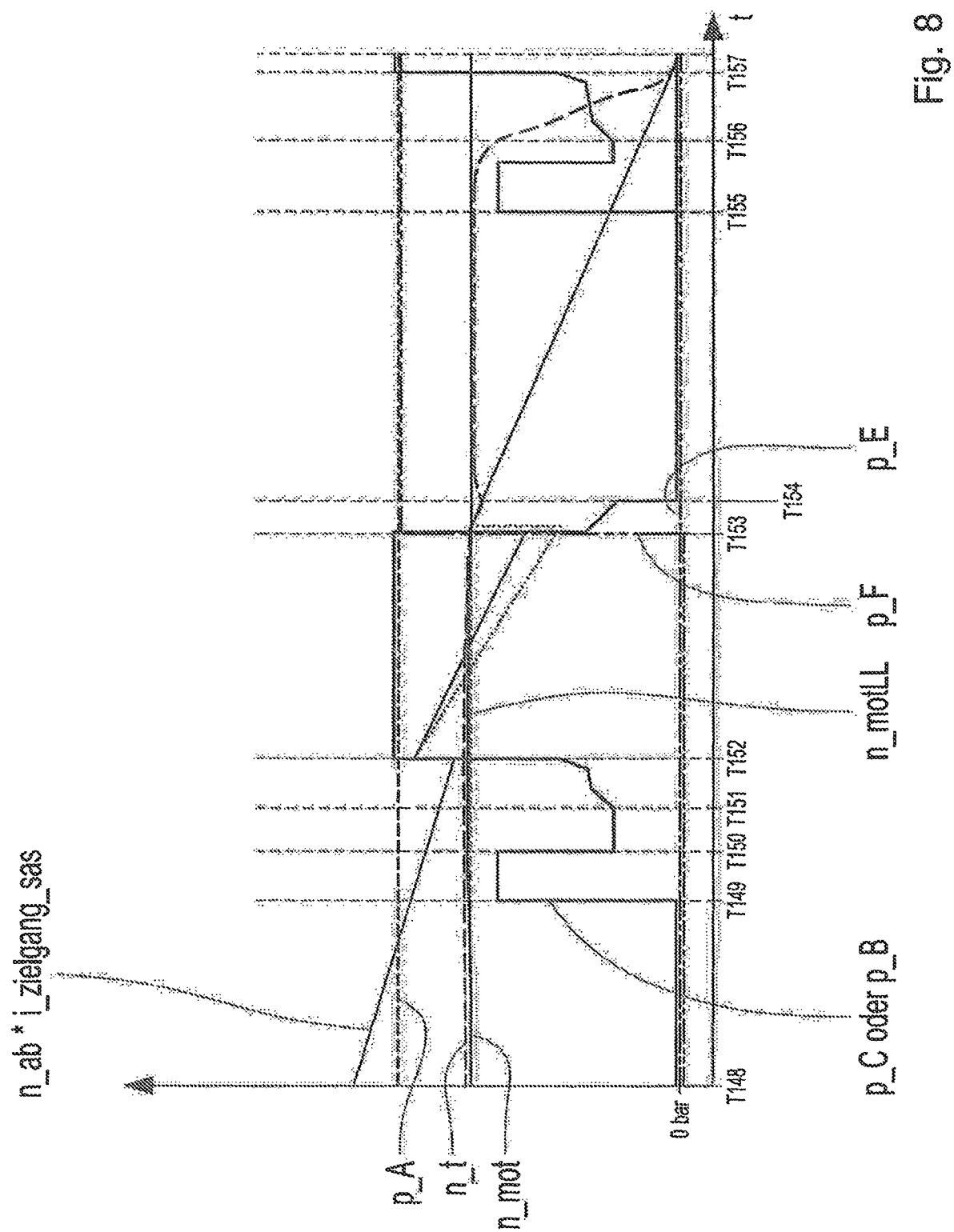
FIG. 8 shows the profiles of the operating variables of the vehicle drivetrain in the presence of an active sailing operating state which is deactivated only shortly before the vehicle comes to a standstill, wherein a synchronization point of a positively engaging shift element to be activated is attained in the case of a constant rotational speed of a drive machine of the vehicle drivetrain in conjunction with special gearspeed tracking.

FIG. 8 shows the profiles of the operating variables of the vehicle drivetrain 1 as per FIG. 7 during an operating state profile of the vehicle drivetrain 1 after the time point T136, at which the vehicle drivetrain 1 is already present in the sailing operating state. At a time point T148, the gearbox 4 is in an operating state for which, in the gearbox 4, only the positively engaging shift element A is closed, whereas all other shift elements B to F are open. Up to a time point T149, a superordinate driving strategy identifies that, in the event of a possible departure from the sailing operating state of the vehicle drivetrain 1, the seventh transmission ratio "7" for forward travel has to be engaged in the gearbox 4. At the time point T149, the driving strategy determines, in the presence of an active sailing operating state of the vehicle drivetrain 1 and in a manner dependent on the present operating state profile of the vehicle drivetrain 1, that, in the event of a departure from the sailing operating state, the sixth transmission ratio "6" for forward travel, or in the case of an operating state profile which deviates from this, the fifth transmission ratio "5" for forward travel, has to be engaged in the gearbox 4.

Owing to the fact that the driving strategy has identified that the sixth transmission ratio "6" or the fifth transmission ratio "5" for forward travel has to be engaged in the gearbox 4 proceeding from the time point T149, it is provided, in order to increase the spontaneity of the gearbox 4, that either the actuation pressure p_C of the frictionally engaging shift element C or the actuation pressure p_B of the frictionally engaging shift element B is, at the time point T149, increased to the fast-charging pressure level of the shift element C or B respectively and is, at a subsequent time point T150, reduced to the level of the charging compensation pressure, and is maintained at said pressure over a period until a time point T151, which in the present case represents the end of the charging compensation phase of the shift element C or B. Subsequently the actuation pressure p_C or p_B of the shift element C or B respectively is increased by three successive pressure ramps until a time point T152 to a pressure level at which the frictionally engaging shift element C or B is present in the closed operating state, wherein, at the time point T152, the actuation pressure p_C or p_B respectively is increased to the closing pressure level. With progressive operating time t, the drive output rotational speed n_ab and thus the profile of the product n_ab*i_zielgang_sas decrease continuously to the extent illustrated.

If the gearbox 4 is operated in accordance with the standard sailing logic, the superordinate driving strategy determines after the time point T152, that, in addition to the positively engaging shift element A, the further positively engaging shift element F also has to be transferred into its closed operating state in order to be able to engage one of the transmission ratios "1" to "4" of the first transmission ratio subrange in the gearbox 4 with high spontaneity in the event of a departure from sailing.

In the presence of simultaneously closed shift elements A and B, the rotational speed difference dnF between the shift element halves of the further positively engaging shift element F can be determined using the following relationship, expressed below in the form of a formula:

$$dnF = X*n\_t + Y*n\_ab$$

Here, the variables X and Y represent factors which are dependent on the respective transmission ratios of the individual gear sets of the gearbox 4. In the presence of simultaneously active shift elements A and B, it is the case in the exemplary embodiment of the gearbox 4 as per FIG. 1, as is considered here, that the variable X has a value equal to −1.1, whereas Y is equal to −2.1. By contrast to this, in the presence of simultaneously active shift elements A and C, X is equal to −0.739, while Y is again equal to −2.1.

In the present case, using the relationship according to the formula, at the time T153 a rotational speed difference value between the shift element halves of the further positively engaging shift element F which is expedient for the closure of the further positively engaging shift element F is determined and the further positively engaging shift element F is transferred into its closed operating state by a corresponding increase of the actuation pressure p_F of the further positively engaging shift element F. At the same time, the actuation pressure p_C or p_B of the frictionally engaging shift element C or B respectively is, proceeding from the time point T153, reduced to the extent illustrated in FIG. 8, and is reduced to zero until a time point T154. The activation of the further positively engaging shift element F and the subsequent deactivation of the frictionally engaging shift element C or B respectively has the effect that the turbine rotational speed n_t initially follows the profile of the product n_ab*i_zielgang_sas and, proceeding from the time point T154, returns in the direction of the engine rotational speed n_mot.

Thus, the change from the second transmission ratio subrange towards the first transmission ratio subrange of the gearbox 4 is implemented in a simple manner without additional measures in the presence of the still active sailing operating state of the vehicle drivetrain 1. With progressive operating time t, proceeding from the operating state of the vehicle drivetrain 1 that is present at the time point T154, a continued sailing operating state with decreasing drive output rotational speed n_ab can be implemented without further actuation of the gearbox 4 and can additionally be deactivated with high spontaneity because a possibly required build-up of power transmission in the region of the gearbox 4 between the drive machine 2 and the drive output 3 can then be realized by activation of the frictionally engaging shift element B, C or D, without additional actuation of the positively engaging shift elements A and F within short operating times.

In the present case, such a demand is triggered at the time point T155, proceeding from which the actuation pressure p_C or p_B of the frictionally engaging shift element C or B respectively is initially set as illustrated, via a fast-charging phase and a subsequent charging compensation phase until a time point T156, for an activation of the shift element C or B respectively. Following the time point T156 the actuation pressure p_C or p_B is increased for example by three successive pressure ramps until a time point T157 to a level at which the frictionally engaging shift element C or B is present in the slippage-free operating state, and the actuation pressure p_C or p_B is increased, at the time point T157, to the closing pressure level of the frictionally engaging shift element C or B respectively.

As an alternative to this, it is also possible for a vehicle equipped with the vehicle drivetrain 1 to coast to standstill proceeding from the time point T155, and for the vehicle drivetrain 1 to be operated in accordance with an engine start-stop function, and for the two positively engaging shift elements A and F to be activated and for the further shift elements C, D, B and E to be present in the open state in the gearbox 4, when the vehicle is in the standstill state or already close to the standstill state. When the vehicle is at a standstill, the drive machine 2 which is decoupled from the drive output 3 is shut down, and in the event of a corresponding demand for launching the vehicle, said drive machine 2 is started and the shift element D, C, B or E that has to be activated in each case for realizing the demanded starting transmission ratio "1", "2", "3" or "4" for forward travel is transferred into the closed operating state.

The above-described gearspeed tracking of the further positively engaging shift element F is performed in the presence of virtually constant rotational speeds n_mot and n_t of the drive machine 2 and of the gearbox input shaft 6 in the presence of simultaneously varying rotational speed n_ab of the drive output 3, whereby the further positively engaging shift element F reaches its synchronous state. To avoid reaction torques in the vehicle drivetrain 1 that are perceptible to a driver, after the closure of the further positively engaging shift element F the previously actuated shift element C or B is deactivated.

The use of the further positively engaging shift element F as a force-closing clutch is possible owing to the virtually load-free operating state of the further positively engaging shift element F, which in turn results from the low torque transmitted via the hydrodynamic torque converter 7 in the presence of a simultaneously open converter lock-up clutch 8. During the determination of the synchronization point of the further positively engaging shift element F to be activated, the torque transfer capacity of the converter lock-up clutch 8 is set such that the rotational speeds n_mot and n_t of the drive machine 2 and of the gearbox input shaft 6 correspond to each other and so as to transfer the further positively engaging shift element F into an operating state expedient for its activation.

Figure 9:
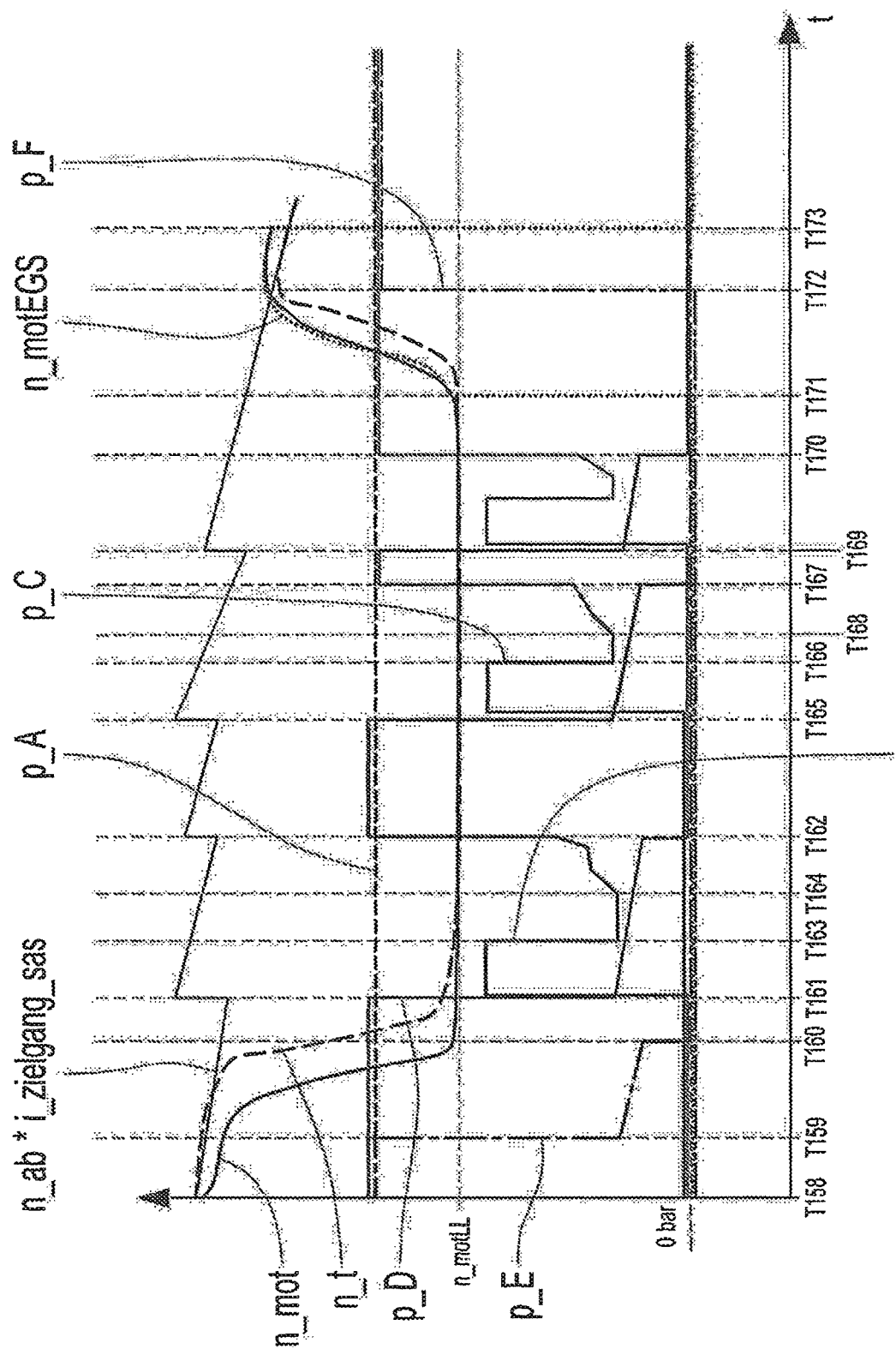
FIG. 9 shows the profiles of the operating variables of the vehicle drivetrain in the case of an active sailing operating state which is deactivated before the vehicle comes to a standstill, wherein a synchronization point of a positively engaging shift element to be activated is enabled through a targeted engine torque intervention.

FIG. 9 shows the profiles of the operating variables of the vehicle drivetrain 1 as per FIG. 7 and FIG. 8 during an operating state profile of the vehicle drivetrain 1 in which, in the region of the gearbox 4, at a time point T158, the seventh transmission ratio "7" for forward travel is engaged and the drive machine 2 is active. At the time point T158, the rotational speed n_mot of the drive machine 2 is higher than the idle rotational speed n_motLL of the drive machine 2, and a demand is triggered for realizing the sailing operating state of the vehicle drivetrain 1 during which the drive machine 2 is active and the power flow between the drive machine 2 and the drive output 3 is disconnected in the region of the gearbox 4. Proceeding from a time point T159, the frictionally engaging shift element E is transferred, to the same extent as following the time point T131, into its open operating state. In the present case, the frictionally engaging shift element E reaches the open operating state at the time point T160. The engine rotational speed n_mot is reduced towards the idle rotational speed n_motLL and reaches the latter likewise at the time point T160. Owing to the open frictionally engaging shift element E, the power transmission between the drive machine 2 and the drive output 3 is disconnected in the region of the gearbox 4, whereby the turbine rotational speed n_t also decreases towards the idle rotational speed n_mot.

With progressive operating time t, the superordinate driving strategy identifies that, at a time point T161, the vehicle drivetrain 1 is present in an operating state in which the sixth transmission ratio "6" or the fifth transmission ratio "5" for forward travel has to be engaged in the region of the gearbox 4 in the event of a demand for deactivation of the sailing operating state. For this reason, the actuation pressure p_D of the frictionally engaging shift element D is reduced abruptly from the closing pressure level to an intermediate pressure level at the time point T161, is subsequently reduced in continuous fashion along a pressure ramp until a time point T162, and is reduced to zero at the time point T162. At the time point T161, the actuation pressure p_C or p_B of the frictionally engaging shift element C or B respectively is increased to the fast-charging pressure level and, at a subsequent time point T163, is reduced to the level of the charging compensation pressure at which the actuation pressure p_C or p_B is maintained until a time point T164.

The time point T164 constitutes the end of the charging compensation phase of the frictionally engaging shift element C or B respectively. Proceeding from the time point T164, the actuation pressure p_C or p_B of the frictionally engaging shift element C or B respectively is in turn increased for example by three successive pressure ramps until the time point T162 to a pressure level at which the frictionally engaging shift element C or B respectively is in the slippage-free operating state. At the time point T162, the actuation pressure p_C or p_B is increased to the closing pressure level, whereby the frictionally engaging shift element C or B is, in addition to the positively engaging shift element A, present in the closed operating state. Proceeding from the time point T162, in the gearbox 4, a change from the operating state of the gearbox 4 prepared for the activation of the fifth transmission ratio "5" for forward travel towards the operating state of the gearbox 4 prepared for the activation of the fourth transmission ratio "4" is performed by software without a change in the clutch logic being performed for this purpose.

At the time T165, it is identified by the superordinate driving strategy that, in the event of a departure from the sailing operation of the vehicle drivetrain 1, the second transmission ratio "2" for forward travel has to be engaged in the region of the gearbox 4, for which reason the actuation pressure p_B of the frictionally engaging shift element B is, at the time point T165, reduced to an intermediate pressure level at which the frictionally engaging shift element B is transferred into slipping operation. At the same time, the actuation pressure p_C of the frictionally engaging shift element C is increased to the level of the fast-charging pressure and is maintained at said level until a time point T166. The actuation pressure p_B of the frictionally engaging shift element B is reduced in continuous fashion along a pressure ramp from the time point T165 to the time point T167. The actuation pressure p_C is, after ending of the charging compensation phase, which in the present case ends at the time point T168, increased during two subsequent pressure ramps until the time point T167 to a pressure level at which the frictionally engaging shift element C is present in a slippage-free operating state. For this reason, the actuation pressure p_C is increased to the closing pressure level at the time point T167, while the actuation pressure p_B is reduced to zero at the time point T167.

At a time point T169, the superordinate driving strategy identifies an operating state of the vehicle drivetrain in which, in the event of a deactivation of the sailing operating state, the first transmission ratio "1" for forward travel has to be engaged in the gearbox 4. Therefore, at the time point T169, the frictionally engaging shift element p_C is deactivated in the same manner as the frictionally engaging shift element B was previously disengaged between the time points T165 and T170, and the frictionally engaging shift element D is, between the time points T169 and T170, transferred by a fast-charging phase, a subsequent charging compensation phase, and a pressure ramp into its slippage-free operating state and, at the time point T170, transferred into its fully closed operating state.

Thus, at the time point T170, both the shift element A and the shift element D are closed in the gearbox 4. At a time point T171 following the time point T170, a demand for deactivation of the sailing operating state and for coupling-on of the drive machine 2 is triggered. Proceeding from the time point T171, the drive machine 2 is in turn in the closed-loop rotational speed control mode, and the engine rotational speed n_mot is in turn increased in accordance with the EGS engine target rotational speed setpoint until the engine rotational speed n_mot is equal to the profile of the product n_ab*i_zielgang_sas at the time point T172. In this operating state, the further positively engaging shift element F is present in its synchronized operating state, for which reason the actuation pressure p_F of the further positively engaging shift element F is increased to the extent illustrated in FIG. 5 and the further positively engaging shift element F is transferred as required into its closed operating state, whereby the first transmission ratio "1" for forward travel is engaged in the gearbox 4. The closed-loop rotational speed control mode of the drive machine 2 is in the present case ended at the time point T173, whereby the sailing operating state of the vehicle drivetrain 1 is deactivated and subsequent shifts in the gearbox 4 can be performed using conventional shift processes in a manner dependent on the operating state.

The activation time point of the further positively engaging shift element F to be activated is calculated, in a manner dependent on a so-called switching time lead calculation, from the gradient of the rotational speed n_mot of the drive machine 2, wherein the activation of the positively engaging shift element F is started at a time point at which the engine rotational speed n_mot is greater than or equal to the profile of the product n_ab*i_zielgang_sas, and the rotational speed difference in the region of the open further positively engaging shift element F is lower than a threshold value. In the case of the operating state profile described with regard to FIG. 9, the claw-type shift element F can be easily transferred into its synchronized operating state by variation of the engine rotational speed n_mot.

If, during the sequence for the activation of the further positively engaging shift element F, as described with regard to FIG. 8, the drive output rotational speed changes n_ab with such a gradient that the synchronization point of the further positively engaging shift element F cannot be achieved or set as required with the present operating state of the gearbox 4, provision is made for the clutch logic to be changed at an early point in time and, in addition to the positively engaging shift element A, for the frictionally engaging shift element C or the frictionally engaging shift element D rather than the shift element B to be engaged in preparatory fashion in the gearbox 4 in order, in the case where the drive machine 2 is simultaneously operated at the idle rotational speed level, to achieve a rotational speed difference of at least approximately zero in the region of the further positively engaging shift element F to be activated.

In the sequence described with regard to FIG. 8, during which that operating state of the vehicle drivetrain 1 in which the turbine synchronous rotational speed of the desired synchronization gearspeed corresponds to the engine idle rotational speed n_motLL is awaited, it is achieved by an adaptation of the synchronization gearspeed and an associated selection of a suitable rotational speed window within which the positively engaging shift element F is present in each case in its synchronized operating state that a situation in which said rotational speed window is missed in the event of freewheeling of the vehicle and an occurrence of a brief action on the drive output 3 is avoided.

Figure 10:
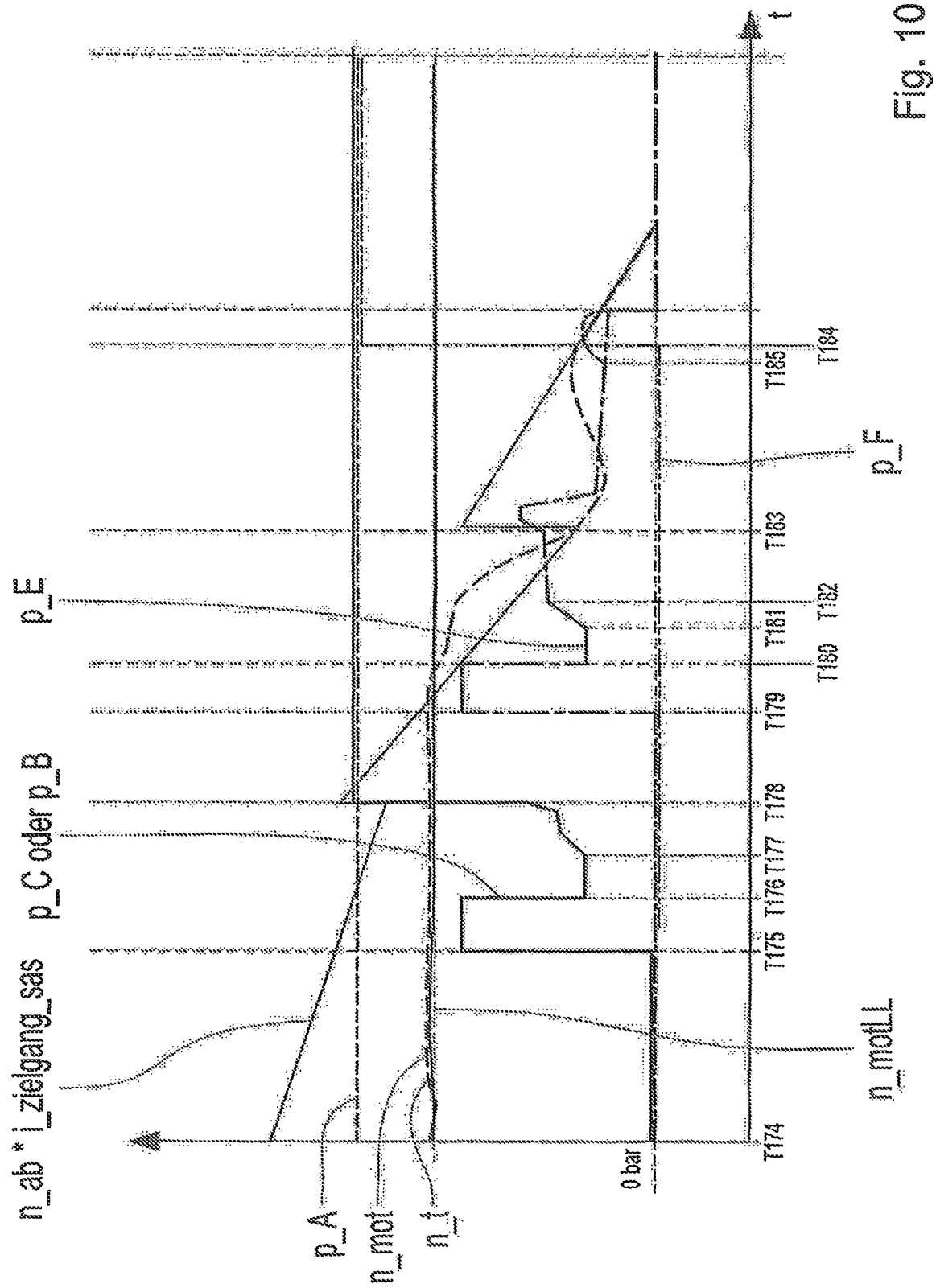
FIG. 10 shows the profiles of the operating variables of the vehicle drivetrain in the presence of an active sailing operating state, which is deactivated as a result of intense deceleration of a vehicle equipped with the vehicle drivetrain.
Figure 11:
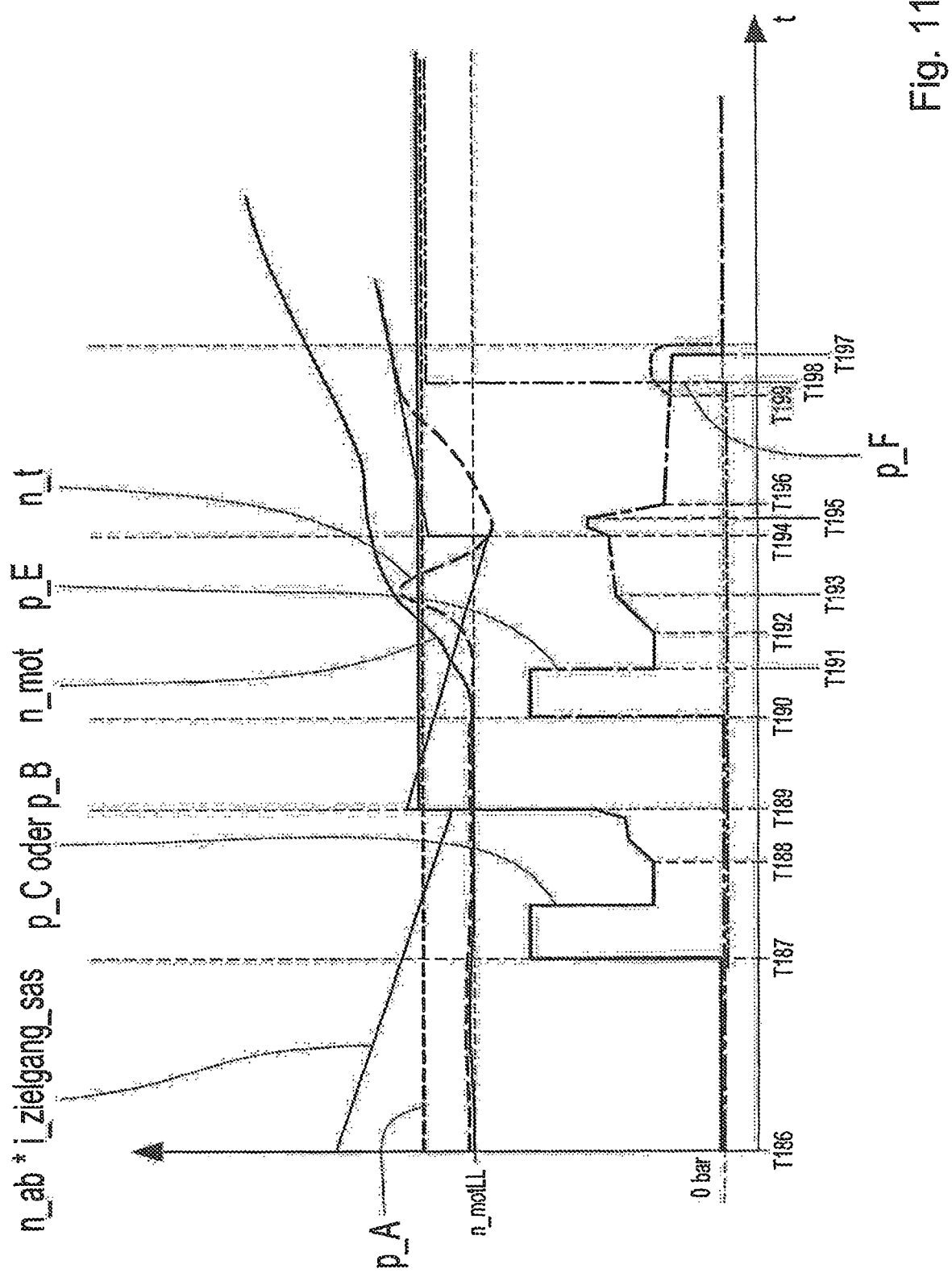
FIG. 11 shows the profiles of the operating variables of the vehicle drivetrain in the presence of an active sailing operating state, which is deactivated on the basis of a power demand from a driver.

However, if the synchronization point of the positively engaging shift element F cannot be attained as described in each case with regard to FIG. 8 and FIG. 9 owing to the respectively prevailing profile of the rotational speed n_ab of the drive output 3 and/or the profile of the engine rotational speed n_mot of the drive machine 2 or if the synchronization point of the further positively engaging shift element F to be activated can be attained using one of the two approaches as per FIG. 8 or FIG. 9 only after undesirably long operating times have elapsed, then the approaches described in more detail below on the basis of the illustrations of FIG. 10 and FIG. 11 are implemented.

At a time point T174, the sailing operating state of the vehicle drivetrain 1 is active and only the positively engaging shift element A is closed. The engine rotational speed n_mot corresponds to the idle rotational speed n_motLL. Owing to the power transmission between the drive machine 2 and the drive output 3 being disconnected in the region of the gearbox 4, the turbine rotational speed n_t is equal to the engine rotational speed n_mot. The value of the product n_ab*i_zielgang_sas is higher than the idle rotational speed n_motLL and decreases with a defined gradient. At the time point T175, the superordinate driving strategy identifies that, in the event of a departure from sailing, the sixth transmission ratio "6" or the fifth transmission ratio "5" for forward travel has to be engaged in the gearbox 4.

For this reason, at the time point T175, the actuation pressure p_C or p_B of the frictionally engaging shift element C or B respectively is set, by a fast-charging phase which lasts until a time point T176 and a subsequent charging compensation phase which follows said fast-charging phase and which ends at the time point T177, for the activation of the shift element C or B respectively. Proceeding from the time point T177, the actuation pressure p_C or p_B is increased by three successive pressure ramps until the time point T178 to the pressure level at which the friction-ally engaging shift element C or B respectively is present in the slippage-free operating state. Subsequently, the actuation pressure p_C or p_B is adjusted to its closing pressure level at the time point T178, and the frictionally engaging shift element C or B respectively is present in the fully closed operating state. The drive output rotational speed n_ab and thus also the profile of the product n_ab*i_zielgang_sas decrease with a steep gradient proceeding from the time point T178 owing to an intense deceleration of the vehicle, which results for example from an actuation of the service brake by the driver.

Depending on the presently selected clutch logic the rotational speed difference of the positively engaging shift element F to be activated is determined according to the relationship expressed as a formula above, and here, it is identified that the further positively engaging shift element F cannot be transferable into its closed operating state using the approach described with regard to FIG. 8 or the approach described with regard to FIG. 9. For this reason, the actuation pressure p_E of the shift element E is increased to the fast-charging pressure at the time point T179 and decreased to the charging compensation pressure level at the time point T180. The charging compensation phase of the frictionally engaging shift element E ends, in the present case, at for example the time point T181. Subsequently the actuation pressure p_E is increased with a steep gradient to an intermediate pressure level during a first pressure ramp, and is increased further during a further pressure ramp which, proceeding from the time point T182, follows the first pressure ramp and has a gradient shallower than the gradient of the first pressure ramp which ends at the time point T182.

At the time T183, the frictionally engaging shift element E has a torque transfer capacity for which, owing to the positively engaging shift element A already being present in the closed operating state and the frictionally engaging shift element C or B likewise being active, the sixth transmission ratio "6" or the fifth transmission ratio "5" for forward travel is at least partially engaged in the gearbox 4. Proceeding from this operating state of the vehicle drivetrain 1, in which the turbine rotational speed n_t at least briefly corresponds to the value of the product n_ab*i_zielgang_sas, the torque transfer capacity of the frictionally engaging shift element E is varied by a corresponding adjustment of the actuation pressure p_E such that the profile of the turbine rotational speed n_t and the profile of the product n_ab*i_zielgang_sas at least approximately correspond to one another over a relatively long operating time and the further positively engaging shift element F to be activated exhibits its synchronized operating state at the time point T184. For this reason, the actuation pressure p_F of the further positively engaging shift element F is increased at the time point T184, and a downshift is performed in the gearbox 4 proceeding from the sixth transmission ratio "6" or from the fifth transmission ratio "5" for forward travel towards the third transmission ratio "3" or towards the second transmission ratio "2", whereby the further positively engaging shift element F is transferred into the demanded closed operating state.

To be able to activate the further positively engaging shift element F as required for a high level of driving comfort, it is possible for the actuation pressure p_E of the frictionally engaging shift element E to be increased slightly to the extent illustrated in FIG. 6, correspondingly to the dashed line, proceeding from a time point T185, and for the torque transfer capacity of the frictionally engaging shift element E to be increased. With this measure, the gradient of the turbine rotational speed n_t is reduced, and the rotational speed difference of the positively engaging shift element F is, over a relatively long time period, kept within a rotational speed difference window required for the activation of the further positively engaging shift element F.

A load demand from the driver may possibly also have the effect that the synchronization point of the further positively engaging shift element F to be activated is not attained as described with regard FIG. 8 and FIG. 9. To nevertheless be able to transfer the positively engaging shift element F into its activated operating state with high spontaneity as required, the approach described below with regard to FIG. 11 is implemented in the event of a corresponding load demand from the driver.

At the time point T186, it is in turn the case that the sailing operating state of the vehicle drivetrain 1 is active and only the positively engaging shift element A is present in the closed operating state. The turbine rotational speed n_t and the engine rotational speed n_mot correspond to one another owing to the power transmission between the drive machine 2 and the drive output 3 being disconnected in the region of the gearbox 4. The engine rotational speed n_mot is equal to the idle rotational speed n_motLL, while the drive output rotational speed n_ab is at a level such that the product of the drive output rotational speed n_ab and the transmission ratio i_zielgang_sas is greater than the engine idle rotational speed n_motLL.

In turn, at the time point T187, the superordinate driving strategy determines, as a function of the present operating state profile of the vehicle drivetrain 1, that the sixth transmission ratio "6" or the fifth transmission ratio "5" or the third transmission ratio "3" for forward travel has to be engaged in the gearbox in the event of a demand for deactivation of the sailing operating state in the gearbox 4. This has the effect that the actuation pressure p_C or p_B of the frictionally engaging shift element C or B respectively is set, during a fast-charging phase and a subsequent charging compensation phase, which in the present case ends at the time point T188, for the activation of the frictionally engaging shift element C or B respectively. Proceeding from the time point T188, the actuation pressure p_C or p_B is increased during three successive pressure ramps until the time point T189 to a pressure level at which the frictionally engaging shift element C or B respectively is present in the slippage-free operating state.

At the time point T189, the actuation pressure p_C or p_B, respectively, is increased to the closing pressure level and the frictionally engaging shift element C or B respectively is, in addition to the shift element A, transferred into its closed operating state. At a time point T190 which follows the time point T189, a load demand is made by a driver, which causes an increase in engine rotational speed n_mot proceeding from the idle rotational speed n_motLL. As a function of the gradient of the engine rotational speed n_mot, it is identified that an activation of the further positively engaging shift element F cannot be performed without further measures because the profile of the engine rotational speed n_mot intersects the profile of the product n_ab*i_zielgang_sas at a large angle, and an actuation of the further positively engaging shift element F in a closing direction does not result in the desired activation of the positively engaging shift element F.

For this reason, at the time point T190, the actuation pressure p_E of the frictionally engaging shift element E is increased to the level of the fast-charging pressure and is reduced to the charging compensation level at the time point T191. At the time point T192, the charging compensation phase is ended and the actuation pressure p_E is increased up to a first pressure ramp ending at the time point T193 and through a second pressure ramp which extends to the time point T194 to a pressure level at which the frictionally engaging shift element E exhibits a torque transfer capacity such that the sixth transmission ratio "6" or the fifth transmission ratio "5" is at least partially engaged in the gearbox 4. The gradient of the second pressure ramp is shallower than the gradient of the first pressure ramp which ends at the time point T193. Following this, the actuation pressure p_E of the frictionally engaging shift element E is reduced along a steep pressure ramp proceeding from a time point T195, the steep pressure ramp ending at the time point T196. Proceeding from the time point T196 the actuation pressure p_E is reduced slightly along a further pressure ramp with a shallow gradient until a time point T197. This actuation of the frictionally engaging shift element E in turn has the effect that, up to a time point T198 which precedes the time point T197, the turbine rotational speed n_t adjusts with the profile of the product n_ab*i_zielgang_sas, and the further positively engaging shift element F to be activated is present at its synchronization point and can be transferred into its closed operating state through an increase of the actuation pressure p_F.

In order that, in turn, the further positively engaging shift element F can be activated with high comfort, it is possible for the actuation pressure p_F to be temporarily increased slightly proceeding from a time point T199 as described above with regard to FIG. 10 in order to set or flatten the gradient of the profile of the turbine rotational speed n_t to an extent that promotes the activation process of the further positively engaging shift element F.

Figure 12:
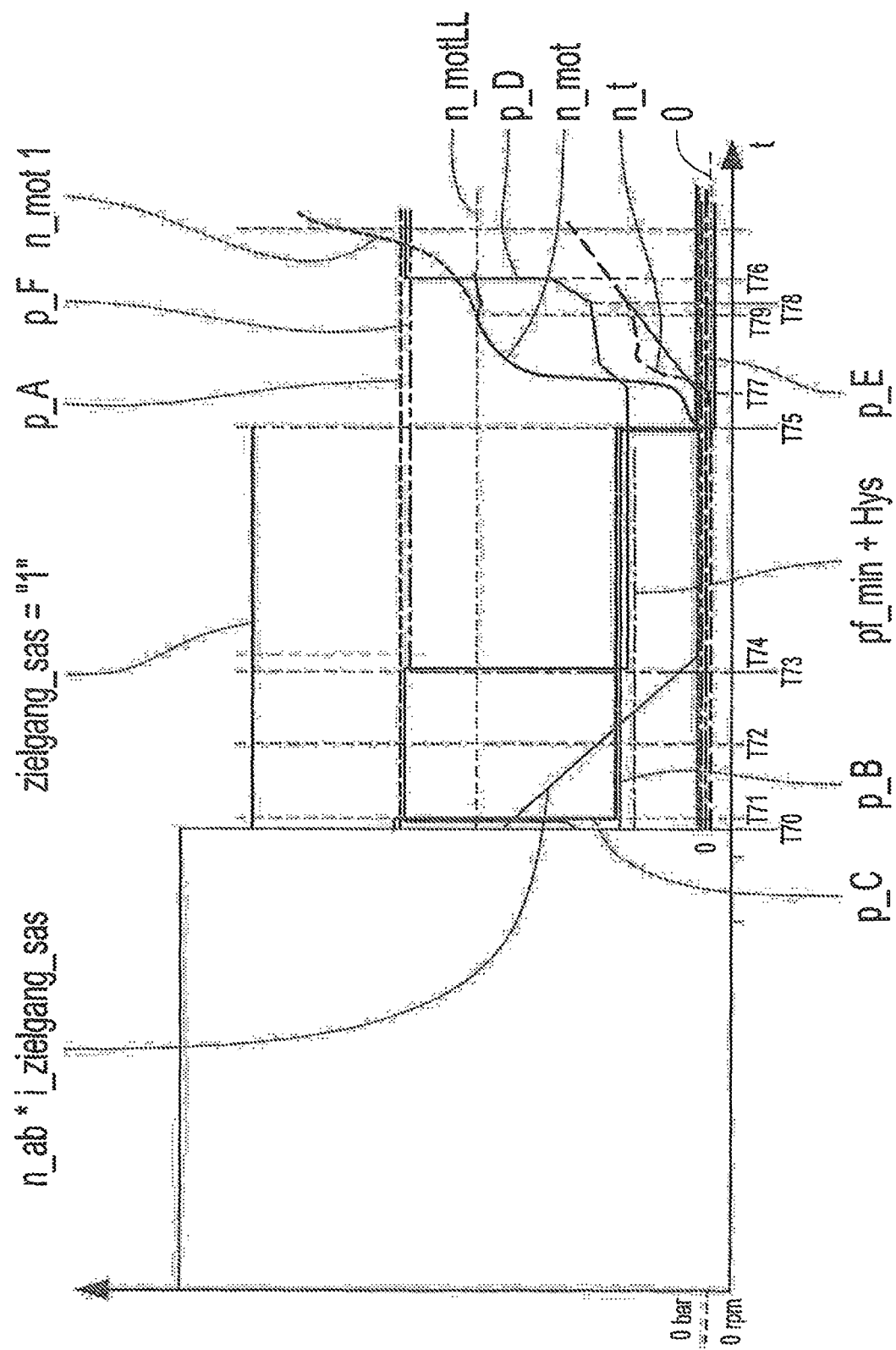
FIG. 12 shows multiple profiles, versus the time t, of several operating variables of the vehicle drivetrain as per FIG. 1 which set with the time t during the implementation of a variant of the method according to the invention.

FIG. 12 shows multiple profiles of different operating variables of the vehicle drivetrain 1 versus the time t. At a time point T70 indicated in more detail in FIG. 12, the vehicle drivetrain 1 is in a sailing operating state in which the rotational speed n_mot of the drive machine 2 is equal to zero and the power flow between the drive machine 2 and the drive output 3 is disconnected in the region of the gearbox 4. The value of the product of the rotational speed n_ab of the drive output 3 and the transmission ratio i_zielgang_sas, which corresponds to a transmission ratio identified by a superordinate driving strategy as a function of the present operating state and which is to be engaged in the gearbox 4 upon a departure from sailing or which is equal to the transmission ratio presently engaged in the region of the gearbox 4 in the power flow, produced in the region of the gearbox 4, between the drive machine 2 and the drive output 3, is greater than 0 and lower than the idle rotational speed n_motLL of the drive machine 2. Here, the profile of the product n_ab*i_zielgang_sas decreases, as illustrated in more detail in FIG. 12, with a steep gradient towards 0 over the operating time t.

At the time T70, in the gearbox 4, the positively engaging shift element A is initially closed, wherein the positively engaging shift element A is, for this purpose, actuated in a closing direction with an actuation pressure p_A at a closing pressure level. Furthermore, it is also the case that the frictionally engaging shift element C is present in a closed operating state at the time point T70 and is, for this purpose, likewise actuated in a closing direction with an actuation pressure p_C at the closing pressure level. The further frictionally engaging shift element E is fully open, because the actuation pressure p_E that can be applied to the frictionally engaging shift element E is equal to zero. Furthermore, the frictionally engaging shift element B is charged with an actuation pressure p_B at a pressure level which is higher, by an offset value, than the pressure value pf_min+

Hys plus an offset value dependent on a hysteresis, which constitutes an actuation threshold above which the frictionally engaging shift elements B, C and D are in a slippage-free operating state in the presence of an active coasting operating state. The further shift element F is likewise charged with an actuation pressure p_F, as a result of which the further shift element F is likewise open.

Owing to the drive machine 2 being in a shut-down state and the power flow being disconnected in the region of the gearbox 4, the turbine rotational speed n_t is equal to zero. Said operating state of the gearbox 4 also results from the fact that, in addition to the frictionally engaging shift elements B and C, the frictionally engaging shift element D is charged with an actuation pressure p_D which lies above the pressure value pf_min+Hys.

At a time point T71, a pressure ramp of the actuation pressure p_D of the frictionally engaging shift element D ends and the frictionally engaging shift element D is present in a slippage-free operating state. To be able, at the time point T71, to transfer the gearbox 4 into an operating state in which not only the positively engaging shift element A but also the frictionally engaging shift element D is fully closed in the gearbox 4, the actuation pressure p_D is increased abruptly from the intermediate pressure level to the closing pressure level at the time point T71. Substantially at the same time, the actuation pressure p_C of the frictionally engaging shift element C is reduced from the closing pressure level to a pressure level which is higher, by an offset value, than the pressure value pf_min+Hys, at which, as before, the frictionally engaging shift element C is in a slippage-free operating state. With progressive operating time t, the superordinate driving strategy identifies that the drive output rotational speed n_ab is decreasing towards zero and the vehicle is transitioning to a standstill state.

In order that the vehicle equipped with the vehicle drivetrain 1 is capable of launching with desired high spontaneity from a standstill state of the vehicle in the event of a corresponding demand from the driver, a demand for activation of an engine start-stop function is triggered at a time point T72, whereby, at the same time, the sailing operating function of the vehicle drivetrain 1 is deactivated and a demand zielgang_sas="1" is triggered to prepare the gearbox 4 for activation of the first transmission ratio "1" for forward travel. The activation of the engine start-stop function has the effect that, as a function of the gradient of the profile of the product n_ab*i_zielgang_sas, a synchronization point of the further positively engaging shift element F is identified, which is to be transferred into its closed operating state in addition to the positively engaging shift element A owing to the active engine start-stop function.

In the present case, it is identified that the further positively engaging shift element F attains its synchronization point, which is required for the activation, at the time point T73, as a result of which the actuation pressure p_F of the shift element F is increased abruptly to the closing pressure level at the time point T73. At the time point T73, the actuation pressure p_D of the frictionally engaging shift element D is reduced to a pressure level which is higher, by an offset value, than the pressure value pf_min+Hys. At a time point T74, the profile of the product n_ab*i_zielgang_sas is equal to zero, and the vehicle is at a standstill. At the same time, at the time point T74, the closed operating state of the shift element F is identified. Up to a time point T75, the vehicle is at a standstill with the engine start-stop function active and the drive machine 2 is in a shut-down operating state. For this reason, the shift elements A to F are actuated or charged with those pressure levels of the actuation pressures p_A to p_F which prevail at the time point T74. At the time point T75, a demand for starting of the drive machine 2 and for coupling the drive machine 2 to the drive output 3 is triggered. For this reason, the engine rotational speed n_mot increases as illustrated towards the idle rotational speed n_motLL.

Depending on the transmission ratio "1", "2" or "3" for forward travel to be engaged in the gearbox 4 in each case, either the actuation pressure p_D, p_C or p_B of the frictionally engaging shift element D, C or B is increased as illustrated in FIG. 3 proceeding from the time point T75 until a time point T76, initially to an intermediate pressure at which the frictionally engaging shift element D, C or B is present in the closed operating state. When the intermediate pressure level is reached at the time point T76, the actuation pressure p_D, p_C or p_B is increased abruptly to the closing pressure level, whereby, in the gearbox 4, in addition to the two positively engaging shift elements A and F, the frictionally engaging shift element D, C or B is additionally activated, and the transmission ratio "1", "2" or "3" is engaged in the gearbox 4.

So as not to impair the starting process of the drive machine 2, it is provided that, at the time point T75, as a function of the transmission ratio "1", "2" or "3" to be engaged in the gearbox 4 in each case, the actuation pressures p_B and p_C, p_B and p_D or p_C and p_D are reduced from the pressure level above the pressure value pf_min+Hys to zero, whereby the partially blocked state of the gear set 5 of the gearbox 4, in which the gearbox input shaft 6 is held rotationally fixed, is eliminated. With increasing engine rotational speed n_mot, the turbine rotational speed n_t also increases, proceeding from the time point T75, over the operating time t. Furthermore, the profile of the product n_ab*i_zielgang_sas also increases proceeding from a time point T77, wherein the turbine rotational speed n_t lies above the profile of the product n_ab*i_zielgang_sas. The deviation between the turbine rotational speed n_t and the value of the product n_ab*i_zielgang_sas results from slippage modulation in the region of the frictionally engaging shift element D, C or B to be engaged, and this modulation allows an improvement of drivetrain comfort during engine starting of the drive machine 2 to be achieved. At a time point T78, the turbine rotational speed n_t is equal to the profile of the product n_ab*i_zielgang_sas because the frictionally engaging shift element D, C or B to be activated is already in its slippage-free operating state.

Proceeding from a time point T79, in a manner dependent on the respectively present demand from the driver, the engine rotational speed n_mot remains at the level of the idle rotational speed n_motLL or increases for example progressively further in accordance with the dashed profile of the engine rotational speed n_mot1.

Figure 13:
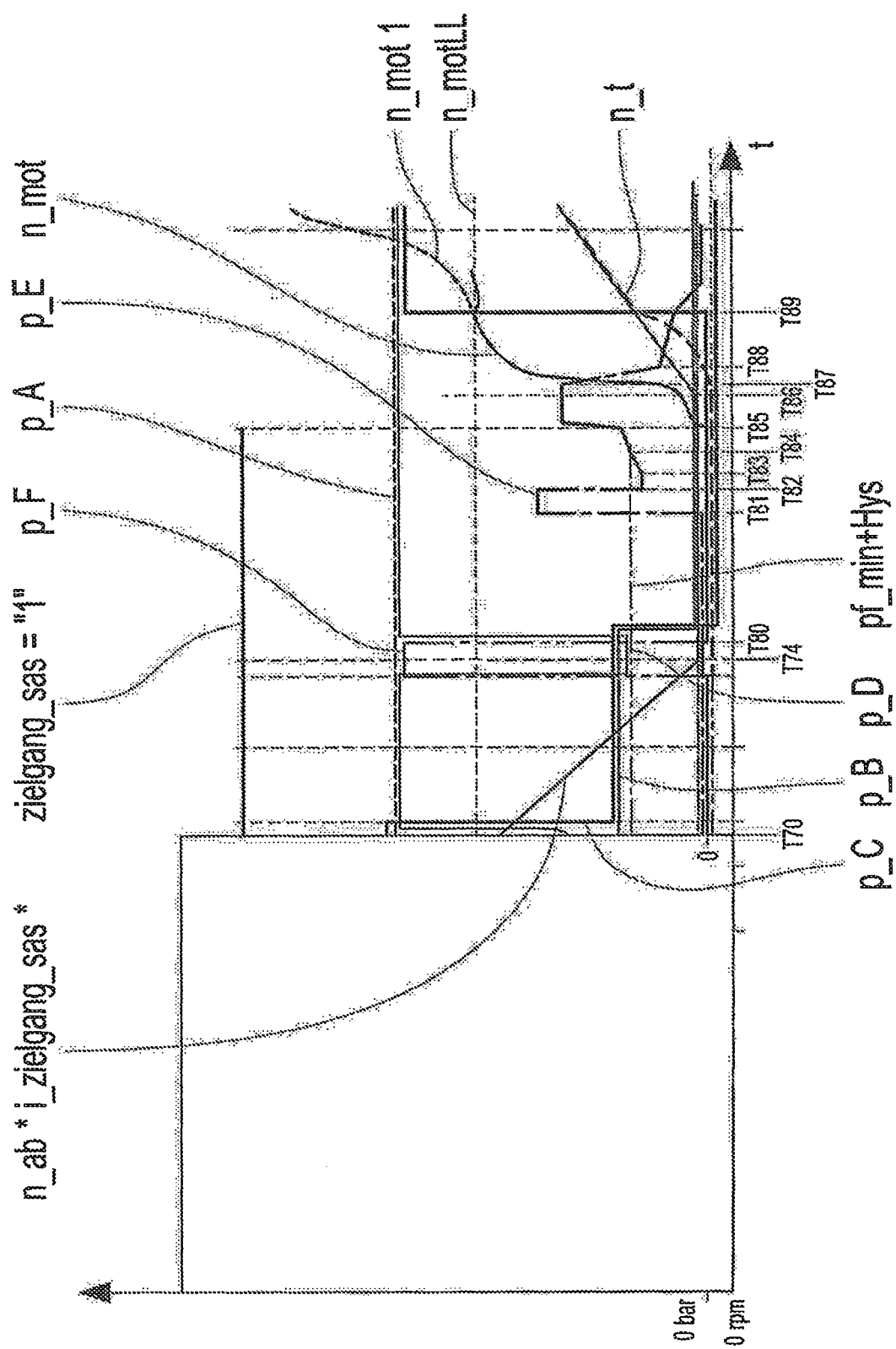
FIG. 13 shows multiple profiles, of several operating variables of the vehicle drivetrain as per FIG. 1 which set with the time t during the implementation of a further variant of the method according to the invention.

FIG. 13 shows the profiles of the operating variables of the vehicle drivetrain 1 illustrated in FIG. 12 proceeding from the time point T70 during an operating state profile of the vehicle drivetrain 1 during which it is identified, at the time point T74, that the positively engaging shift element F is not transferred as required into its closed operating state as a result of the increase of the actuation pressure p_F. For this reason, at a further time point T80 which follows the time point T74, the actuation pressure p_F of the positively engaging shift element F is reduced to zero again. Independently of this, proceeding from the time point T74, the engine start-stop function is activated, and the sailing operating function of the vehicle drivetrain 1 is deactivated.

As a function of the transmission ratio "1", "2" or "3" for forward travel to be engaged in the gearbox 4 upon a restart of the drive machine 2, it is provided that either the actuation pressure p_D, p_C or p_B of the frictionally engaging shift element D, C or B is increased from the pressure level above the pressure value pf_min+Hys to the closing pressure level at the time point T80, while the actuation pressures p_B and p_C, p_B and p_D or p_C and p_D of the frictionally engaging shift elements B and C or B and D or C and D are reduced to zero.

Since, proceeding from the time point T74, the vehicle equipped with the vehicle drivetrain 1 is at a standstill and the profile of the product n_ab*i_zielgang_sas is equal to zero, the synchronization point of the positively engaging shift element F to be activated can no longer be attained as illustrated with regard to FIG. 12 proceeding from the time point T73 and the positively engaging shift element F cannot be transferred as desired into its closed operating state.

In order that, upon a restart of the drive machine 2, the transmission ratio "1", "2" or "3" to be engaged in each case can be engaged with high spontaneity in the gearbox 4, it is provided that, already before a demand for the activation of the drive machine 2 and the coupling of the drive machine 2 to the drive output 3, the actuation pressure p_E of the frictionally engaging shift element E is increased from the opening pressure level to the pressure level of the fast-charging pressure at a time point T81. The fast-charging phase of the frictionally engaging shift element E ends at a time point T82, whereby the actuation pressure p_E has been reduced to the pressure level of the charging compensation pressure and is held constant at said pressure level until the end of the charging compensation phase, in the present case until the time point T83. Following this, the actuation pressure p_E is increased to an intermediate pressure level by a first pressure ramp which lasts until a time point T84 and, following this in turn, is increased further along a second pressure ramp whose gradient is shallower than the gradient of the first pressure ramp which ends at the time point T84. At a time point T85 which simultaneously constitutes the end of the second pressure ramp, a demand for the activation and coupling-on of the drive machine 2 is triggered, whereby, proceeding from the time point T85, the engine rotational speed n_mot increases towards of the idle rotational speed n_motLL as illustrated.

In order that the positively engaging shift element F to be activated can be transferred into its closed operating state, the actuation pressure p_E is increased with a steep gradient to a further intermediate pressure level proceeding from the time point T85, whereby the torque transfer capacity of the frictionally engaging shift element E increases. The increase of the torque transfer capacity of the frictionally engaging shift element E has the effect that both the profile of the product n_ab*i_zielgang_sas and the turbine rotational speed n_t increase proceeding from a time point T86. Proceeding from a time point T87, it is in turn the case that the actuation pressure p_E of the frictionally engaging shift element E is reduced as illustrated with a steep gradient in order to reduce a rotational speed difference in the region between shift element halves of the shift element F. Since the profile of the turbine rotational speed n_t increasingly approaches the profile of the product n_ab*i_zielgang_sas over the operating time t, the actuation pressure p_E of the frictionally engaging shift element E is reduced further along a further pressure ramp proceeding from a time point T88, the gradient of the further pressure ramp being smaller than the gradient of the pressure ramp provided between the time points T87 and T88.

At a time point T89, the turbine rotational speed n_t substantially corresponds to the profile of the n_ab*i_zielgang_sas and it is identified that the positively engaging shift element F is in an operating state expedient for the activation. This has the effect that the actuation pressure p_F is increased abruptly as illustrated to the closing pressure level at the time point T89, while the actuation pressure p_E of the frictionally engaging shift element E is reduced to zero and the frictionally engaging shift element E is transferred into its fully open operating state.

Owing to the actuation of the frictionally engaging shift element E described between the time points T81 and T89, it is the case that, in the gearbox 4, for the synchronization of the positively engaging shift element F to be activated, as a function of the operating state of the gearbox 4 present at the time T74, either the fifth transmission ratio "5", the sixth transmission ratio "6" or the seventh transmission ratio "7" is at least partially engaged in order to synchronize the positively engaging shift element F, and subsequently a downshift is performed in the gearbox 4 proceeding from the seventh transmission ratio "7", the sixth transmission ratio "6" or the fifth transmission ratio "5" towards the transmission ratio "1", "2" or "3" to be engaged in the gearbox 4, while the positively engaging shift element F is activated in addition to the further positively engaging shift element A and the frictionally engaging shift element D, C or B that is already active at the time point T80.

Figure 14:
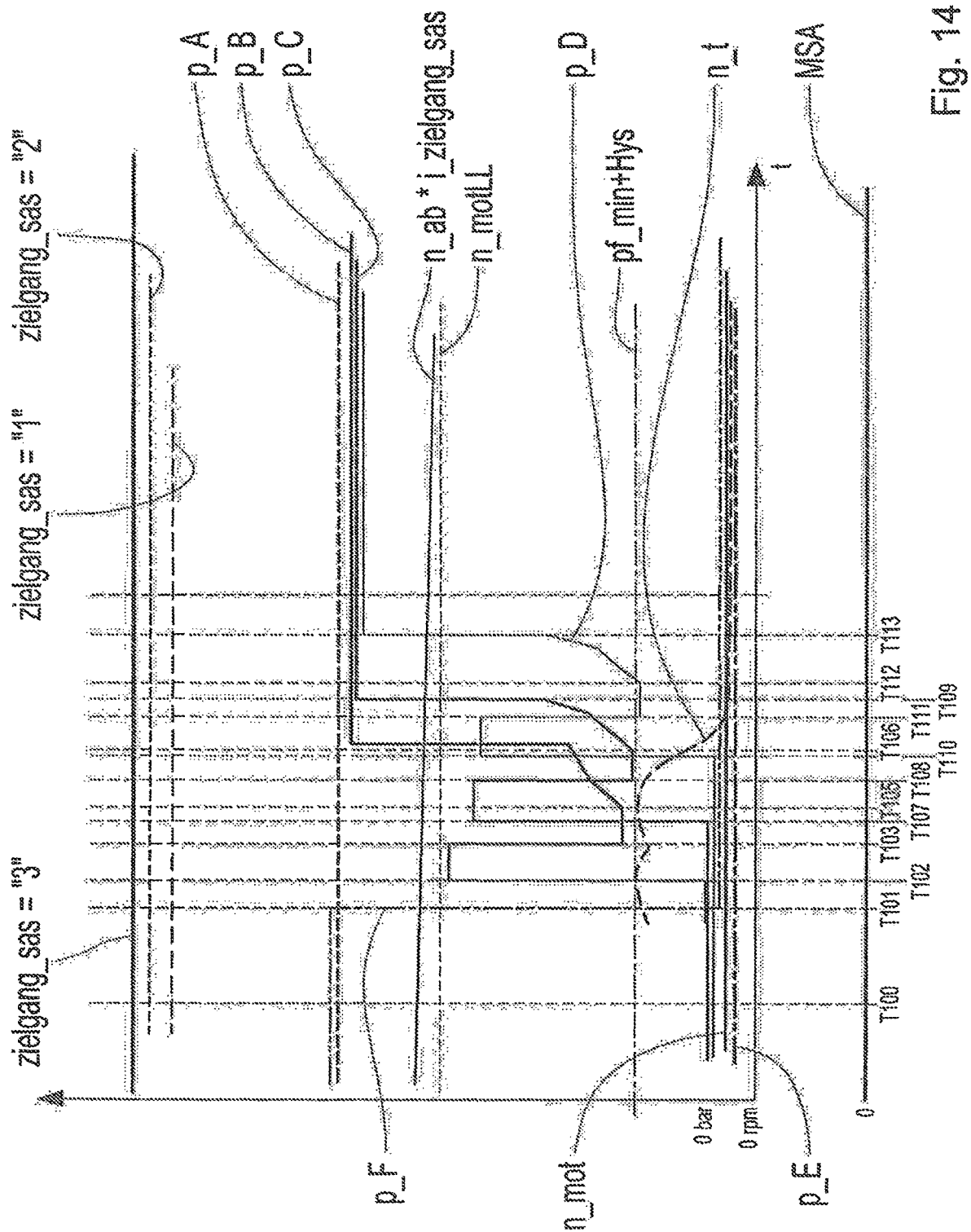
FIG. 14 shows multiple profiles, versus the time t, of several operating variables of the vehicle drivetrain as per FIG. 1 which set with the time t during the implementation of a variant of the method according to the invention.

FIG. 14 in turn shows multiple profiles of different operating variables of the vehicle drivetrain 1 versus the time t, wherein the vehicle drivetrain 1 is, at a time point T100 indicated in more detail in FIG. 14, in an operating state in which the two positively engaging shift elements A and F are closed in the gearbox 4, while the further frictionally engaging shift elements B, C, D and E are present in the open operating state and the drive machine 2 is in a shut-down state. The profile MSF has the value zero during the entire operating state profile of the vehicle drivetrain 1 under consideration, because the engine-stop enable signal is active.

This operating state of the vehicle drivetrain 1 is established owing to an activation of an engine start-stop function, which allows the drive machine 2 to be decoupled from the drive output 3 when the vehicle is at a standstill by opening the frictionally engaging shift elements B to E, and the two positively engaging shift elements A and F being held in a closed operating state in order to be able to engage one of the transmission ratios "1" to "4" for a launch process with high spontaneity, the launch process being realized in a vehicle equipped with the vehicle drivetrain 1, because it is then the case that, in each case by activation of the shift element D, of the shift element C, of the shift element B or of the shift element E, one of said transmission ratios can be engaged within short operating times in the gearbox 4. Owing to the fact that the drive output rotational speed n_ab of the drive output 3 is greater than zero, the profile of the product n_ab*i_zielgang_sas sets as shown in FIG. 14, wherein the variable i_zielgang_sas in turn corresponds to the transmission ratio to be engaged in the gearbox 4 upon a departure from the engine start-stop function.

Owing to gearbox-internal drag torques, the rotational speed n_t of the gearbox input shaft 6 is greater than zero. At a time point T101, it is identified in the region of a superordinate driving strategy that the clutch logic presently selected by the activated engine start-stop function causes undesirably high drag torques in the region of the gearbox 4 owing to the determined ratio between the turbine rotational speed n_t and the drive output rotational speed n_ab of the drive output 3. For this reason, a demand is triggered for realizing a sailing operating function of the vehicle drivetrain 1 during which, as a function of the present operating state of the vehicle drivetrain 1, the positively engaging shift element F has to be transferred into its open operating state first.

For this purpose, at the time point T101, an actuation pressure p_F of the positively engaging shift element F is decreased abruptly from the closing pressure level to zero. At a time point T102 which follows shortly thereafter, the open operating state of the positively engaging shift element F with simultaneously closed positively engaging shift element A is identified, and furthermore, in the presence of an active sailing operating function, an operating state of the vehicle drivetrain 1 is identified in which the third transmission ratio "3" for forward travel has to be engaged in the gearbox 4 in the event of a deactivation of the sailing operating function. Therefore, an actuation pressure p_B of the frictionally engaging shift element B is increased to a fast-charging pressure level at the time point T102 and is held constant at such pressure level until a time point T103. At the time point T103, the actuation pressure p_B of the frictionally engaging shift element B is decreased abruptly to the pressure level of the charging compensation pressure and is in turn held constant at said pressure level until the end of the charging compensation phase, in the present case until a time point T105.

Subsequently, the actuation pressure p_B is increased by two successive pressure ramps to an intermediate pressure level at which the frictionally engaging shift element B is present in its slippage-free operating state until a time point T106. Upon attainment of said operating state of the frictionally engaging shift element B, the actuation pressure p_B of the frictionally engaging shift element B is increased to the closing pressure level, whereby the frictionally engaging shift element B is fully closed.

In order to be able, at the time point T101, to transfer the positively engaging shift element F as desired into its open operating state, it is possible, in an embodiment of the gearbox 4 in which the positively engaging shift element F is charged with hydraulic pressure in order to be opened, for a system pressure of the gearbox 4 to be increased and for a possibly installed electrical auxiliary oil supply to be adjusted to a higher power point if the actuation pressure p_F which is to be applied to the positively engaging shift element F to be opened and which acts in the opening direction is dependent on the system pressure or on the electrical auxiliary oil supply implemented as an electrical auxiliary pump.

During the charging compensation phase of the frictionally engaging shift element B, at a time point T107 which in the present case lies between the time points T103 and T105, an actuation pressure p_C of the frictionally engaging shift element C is increased to the fast-charging pressure level and is maintained at said pressure level until the end of the fast-charging phase at the time point T108. At the time point T108 the actuation pressure p_C of the frictionally engaging shift element C is reduced to the charging compensation pressure level and is maintained at said pressure level until the time point T106, at which the frictionally engaging shift element B is transferred into its closed operating state. Proceeding from the time point T106, the actuation pressure p_C of the frictionally engaging shift element C is likewise transferred by two successive pressure ramps into its slippage-free operating state and is transferred into its fully closed operating state at the time point T109 by increasing the actuation pressure p_C.

Furthermore, during the charging compensation phase of the frictionally engaging shift element C, an actuation pressure p_D of the frictionally engaging shift element D is increased to the fast-charging pressure level at a time point T110 which lies between the time points T108 and T106 and the actuation pressure p_D of the frictionally engaging shift element D is reduced to the charging compensation pressure level at a time point T111 which lies between the time points T106 and T109. The charging compensation phase of the frictionally engaging shift element D is ended at a time point T112, and at the time point T112, the actuation pressure p_D is increased by two pressure ramps until the time point T113 to an intermediate pressure level at which the frictionally engaging shift element D is likewise present in the slippage-free operating state. Upon attainment of this operating state, the actuation pressure p_D of the frictionally engaging shift element D is in turn increased to the closing pressure level, whereby, in addition to the shift elements A, B and C, the frictionally engaging shift element D is also present in its fully closed operating state. In the closed operating state of the frictionally engaging shift elements C, D and E, the gear set 5 of the gearbox 4 is in the partially blocked operating state, in which the gearbox input shaft 6 is held rotationally fixed and the gearbox output shaft 9 connected to the drive output 3 is rotatable. For this reason, the turbine rotational speed n_t continuously decreases towards zero proceeding from the time point T105.

Since, at the time point T113, the frictionally engaging shift element D is also transferred into its closed operating state, the sailing operating state of the vehicle drivetrain 1 demanded at the time point T101 is activated as desired at the time point T113.

By contrast to the above-described charging sequence of the frictionally engaging shift elements B, C and D, it is provided that, proceeding from an operating state of the vehicle drivetrain 1 at the time point T101 in which, upon a departure from the sailing operating function, the second transmission ratio "2" for forward travel has to be engaged in the gearbox 4 as target gear in accordance with the demand zielgang_sas in order to establish the power flow between the drive machine 2 and the drive output 3 and proceeding from a situation in which the positively engaging shift elements A and F are present in the closed operating state, the frictionally engaging shift element C is transferred into its closed operating state first proceeding from the time point T102 in a manner corresponding to the actuation of the frictionally engaging shift element B, and, already during the charging compensation phase of the frictionally engaging shift element C, the frictionally engaging shift element D rather than the frictionally engaging shift element C is prepared for activation in the described manner proceeding from the time point T107. Subsequently it is finally the case that the frictionally engaging shift element B rather than the frictionally engaging shift element D is transferred into its closed operating state over the period from the time point T111 to the time point T113.

By contrast to this, in the presence of an operating state of the vehicle drivetrain 1 at the time point T101 in which, upon a deactivation of the sailing operating state, the first transmission ratio "1" for forward travel has to be engaged in the gearbox 4, it is provided that first the shift element D, then the shift element C and in turn subsequently the shift element B is transferred into its closed operating state respectively, in order to achieve the advantages, described in each case further below, in the event of a departure from the sailing operating state of the vehicle drivetrain 1 during the activation of the sailing operating function between the time points T101 and T113.

For the case in which the further positively engaging shift element F, despite corresponding actuation, is not present in its open operating state at the time point T102, or the superordinate driving strategy identifies high drag torques in the region of the gearbox 4 which prevent an opening of the positively engaging shift element F as described with regard to FIG. 3, approaches discussed in more detail below with regard to FIG. 4 are implemented in order to transfer the positively engaging shift element F as desired into its open operating state.

Figure 15:
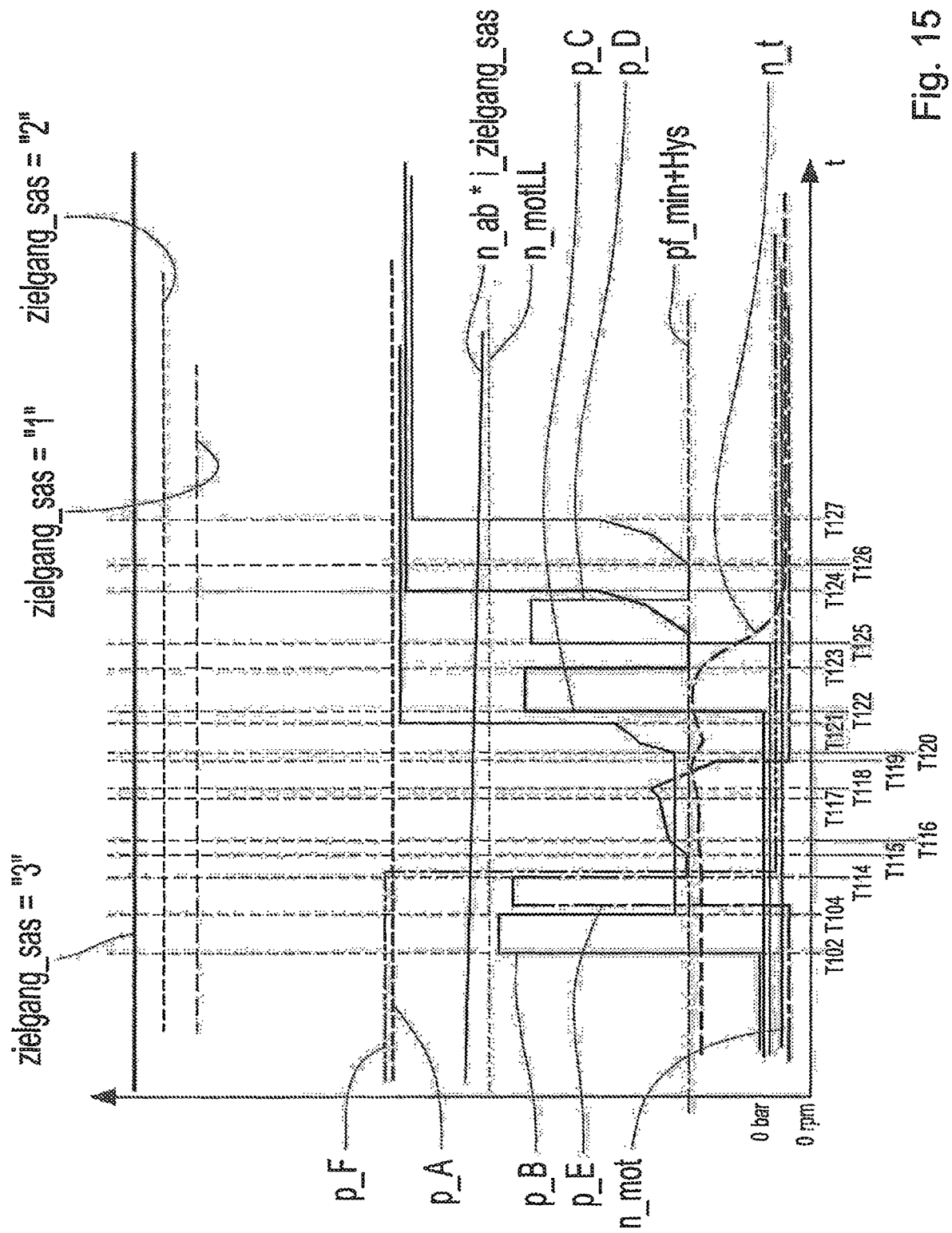
FIG. 15 shows multiple profiles of several operating variables of the vehicle drivetrain as per FIG. 1 which set with the time t during the implementation of a further variant of the method according to the invention.

The profiles of the operating variables described in FIG. 15 of the vehicle drivetrain 1 as per FIG. 1 form the basis, at the time point T102, of an operating state profile in which, higher drag torques prevail at the positively engaging shift element F than in the operating state of the vehicle drivetrain 1 at the time point T102 as per FIG. 14. For this reason, proceeding from the time point T102 as per FIG. 15, it is provided that, firstly, for the activation of the sailing operating state, the actuation pressure p_B of the frictionally engaging shift element B is charged with a fast-charging pulse by a corresponding increase of the actuation pressure p_B in the manner illustrated in FIG. 4 until the time point T104 and the frictionally engaging shift element B is reduced to the level of the charging compensation pressure at the time point T104. Furthermore, at the time point T104, the frictionally engaging shift element E is charged with a fast-charging pulse by an increase of its actuation pressure p_E until a time point T114, and during a subsequent charging compensation phase which lasts until a time point T115, said frictionally engaging shift element E is actuated with an actuation pressure p_E at a charging compensation pressure level and is thus prepared for the activation. At the time point T115, the frictionally engaging shift element E is in an operating state in which the torque transfer capacity of the frictionally engaging shift element E is substantially equal to zero, and an increase of the actuation force results in an immediate increase of the torque transfer capacity of the frictionally engaging shift element E.

Furthermore, the actuation pressure of the positively engaging shift element F to be deactivated is reduced to zero shortly after the time point T114. Proceeding from the time point T115, the actuation pressure p_E is increased along a first pressure ramp which ends at the time point T116. Subsequently the actuation pressure p_E of the frictionally engaging shift element E is increased further in continuous fashion by a following further pressure ramp, which in the present case ends at the time point T117 and has a shallower gradient than the pressure ramp provided between the time points T115 and T116. Following this, the actuation pressure p_E is in turn increased to a greater extent along a further pressure ramp, the gradient of which is in turn steeper than the gradient of the pressure ramp between the time points T116 and T117, until finally, the open operating state of the positively engaging shift element is identified at a time point T118. The successive increase of the torque transfer capacity of the frictionally engaging shift element E results in a reduction in load on the shift element F, or a lowering of the torque which acts on the shift element F and which counteracts the desired opening of the shift element F. At the time point T118, the torque that prevails at the positively engaging shift element F has been reduced as a result of the increase of the torque transfer capacity of the frictionally engaging shift element E, to such an extent that the positively engaging shift element F transitions into its open operating state.

Upon identification of the open operating state of the shift element F, the actuation pressure p_E of the frictionally engaging shift element E is, proceeding from the time point T118, reduced as illustrated along a pressure ramp with a steep gradient until a time point T119 to an intermediate pressure level which lies below the charging compensation pressure level, whereby the frictionally engaging shift element E is present in the open operating state at or before the time point T119. At the time point T119, the actuation pressure p_E is reduced to zero again, whereby the frictionally engaging shift element E transitions into its fully deactivated operating state.

Shortly thereafter the actuation pressure p_B of the frictionally engaging shift element B is increased at a time point T120, as discussed in more detail with regard to FIG. 14, proceeding from the charging compensation pressure level along the two pressure ramps to the intermediate pressure level, at which the frictionally engaging shift element B is present in the slippage-free operating state. To fully activate the frictionally engaging shift element B, the actuation pressure p_B is increased abruptly to the closing pressure level at the time point T121, whereby the frictionally engaging shift element B is fully activated. In the activated operating state of the frictionally engaging shift element B, the frictionally engaging shift element C is first charged with a fast-charging pulse proceeding from a time point T122 and is prepared for the activation during a charging compensation phase which follows said fast-charging pulse and which lasts until a time point T123. At the time point T124, the frictionally engaging shift element C is in its slippage-free operating state, as a result of which the actuation pressure p_C is increased again, in the manner described above, to the closing pressure level at the time point T124.

Before the end of the charging compensation phase of the frictionally engaging shift element C, the frictionally engaging shift element D is likewise charged with a fast-charging pulse proceeding from a time point T125, and is prepared for the activation during a charging compensation phase which follows said fast-charging pulse and which lasts until a time point T126. At the time point T127, the frictionally engaging shift element D is likewise in its slippage-free operating state, as a result of which the actuation pressure p_D of the frictionally engaging shift element D is increased to the closing pressure level at the time point T127, whereby the vehicle drivetrain 1 is present in its demanded sailing operating state at the time point T127.

If, at the time point T102, it is identified by the superordinate driving strategy that the second transmission ratio "2" rather than the third transmission ratio "3" for forward travel has to be engaged in the event of a termination of the activation of the sailing operating state, the actuation pressure p_C of the frictionally engaging shift element C rather than the actuation pressure p_B of the frictionally engaging shift element B is set in the manner described with regard to FIG. 4 at the time point T102. After the end of the fast-charging phase of the frictionally engaging shift element C the actuation pressure p_E of the frictionally engaging shift element E is correspondingly set in order to relieve the positively engaging shift element F of load. Furthermore, at the time point T122, the actuation pressure p_D of the frictionally engaging shift element D and subsequently at the time point T125 the actuation pressure p_B of the frictionally engaging shift element B are set in the manner described above in order to transfer the shift elements C and D respectively into their fully closed operating state at the time points T124 and T127.

If, by contrast to this, at the time point T102, an operating state of the vehicle drivetrain 1 is identified proceeding from which the first transmission ratio "1" for forward travel has to be engaged in the gearbox 4 in the event of a termination of the activation of the sailing operating function, first the frictionally engaging shift element D rather than the frictionally engaging shift element B or frictionally engaging shift element C is actuated proceeding from the time point T102 in the manner described above with regard to FIG. 4, before the frictionally engaging shift element E is introduced into the power flow of the gearbox 4 in order to relieve the positively engaging shift element F of load. Subsequently, it is in turn the case that first the frictionally engaging shift element C is adjusted in the direction of its fully closed operating state and during the activation process of the frictionally engaging shift element C the frictionally engaging shift element B is likewise adjusted in the direction of its fully closed operating state proceeding from the time point T125, in order to ultimately activate the sailing operating state of the vehicle drivetrain 1 as desired at the time point T127.

Furthermore, the approaches described in more detail below may be called upon by the superordinate driving strategy in order to operate or actuate the vehicle drivetrain 1 and in particular the gearbox 4 such that, in the presence of a demand for activation of the sailing operating state of the vehicle drivetrain 1 during its activation process, a departure from sailing triggered by present changes in operating state of the vehicle drivetrain 1 can be implemented with high spontaneity with simultaneously high levels of driving comfort.

If a corresponding demand for deactivation of the sailing operating function is present during an operating state profile of the vehicle drivetrain 1 as per FIG. 3 before the time point T101, the two positively engaging shift elements F and A are left in the activated operating state and, in a manner dependent on the transmission ratio to be engaged in each case in the region of the gearbox 4, the frictionally engaging shift element to be activated for this purpose is activated within short operating times and with desired high spontaneity with simultaneously high levels of driving comfort.

By contrast to this, the shift elements B, C or D, which are already actuated before the time point T114 as described with regard to FIG. 15, and the frictionally engaging shift element E are discharged again and the positively engaging shift elements F and A are left in the activated operating state if a demand for deactivation of the sailing operating function is triggered before the time point T114 and, subsequently, the frictionally engaging shift element to be activated in each case in order to realize the demanded operating state of the vehicle drivetrain 1 is engaged or the frictionally engaging shift elements are, in the presence of an active engine start-stop function, held in an open operating state.

If the demand for deactivation of the sailing operating function is triggered at a time point at which the positively engaging shift element F is already being actuated in an opening direction and, owing to the actuation, has transitioned into its open operating state, one of the transmission ratios "5", "6" or "7" for forward travel, for the realization of which the further positively engaging shift element F has to be held in or transferred into the open operating state, is engaged in the gearbox 4 first.

If, during the activation of the sailing operating state of the vehicle drivetrain 1, the gearbox 4 is actuated, owing to a present operating state of the vehicle drivetrain 1 such that, upon a departure from sailing, the third transmission ratio "3" for forward travel can be engaged in the gearbox 4 with high spontaneity merely by activating the positively engaging shift element F, it is provided that, in the presence of a demand for the deactivation of the sailing operating function, the fifth transmission ratio "5" is engaged in the gearbox 4 first and subsequently the positively engaging shift element F is transferred into its closed operating state during a downshift towards the third transmission ratio "3" in accordance with a conventional shift sequence. At the same time, the frictionally engaging shift element E is deactivated during the downshift from the fifth transmission ratio "5" towards the third transmission ratio "3". Depending on the respectively demanded operating state, the frictionally engaging shift element B is held in the closed operating state or is transferred into its open operating state. The latter is the case if, for example, the engine start-stop function is activated and a decoupled operating state of the shut-down drive machine 2 is demanded.

When the vehicle is at a standstill, the frictionally engaging shift element B is thus transferred into its closed operating state and the two further frictionally engaging shift elements C and D are transferred into their open operating state if they are already charged or closed. If the shift elements C and D are not yet charged or not yet closed, the charging process of the frictionally engaging shift elements C and D is no longer started. In addition to the frictionally engaging shift element B, the frictionally engaging shift element E has to be transferred into its closed operating state in order to engage the fifth transmission ratio "5" in the gearbox 4 as required, to subsequently synchronize the positively engaging shift element to be activated, and to transfer the latter into the closed operating state during the downshift proceeding from the fifth transmission ratio "5" towards the third transmission ratio "3".

By contrast to this, if the demand for deactivation of the sailing operating function triggers an operating state of the vehicle drivetrain 1 proceeding from which the second transmission ratio "2" for forward travel has to be engaged in the gearbox 4, the frictionally engaging shift element C is closed or held in its closed operating state while the frictionally engaging shift elements D and B are held in or transferred into their open operating states. By contrast to the departure from sailing into the third transmission ratio "3" for forward travel, as described above, in the event of a departure from sailing in the direction of the second transmission ratio "2" for forward travel, instead of the synchronization gearspeed "5" which calls for the positively engaging shift element F to be activated, the sixth transmission ratio "6" is engaged first as synchronization gearspeed in the gearbox 4, and subsequently, the positively engaging shift element F is synchronized and in the process transferred into its closed operating state during a downshift proceeding from the sixth transmission ratio "6" towards the second transmission ratio "2".

By contrast, if the first transmission ratio "1" for forward travel has to be engaged in the gearbox 4 upon a departure from sailing, the frictionally engaging shift element D has to be closed or held in its closed operating state, while the two other frictionally engaging shift elements C and B have to be opened or held in their open operating states. Following this, the further frictionally engaging shift element E is transferred into its closed operating state in order to first engage the seventh transmission ratio "7" in the gearbox "4", which constitutes the so-called synchronization gear for the positively engaging shift element F to be activated. Proceeding from the seventh transmission ratio "7" for forward travel which is then engaged in the region of the gearbox 4, a downshift is performed in the direction of the first transmission ratio "1" for forward travel by opening the frictionally engaging shift element E and by closing the positively engaging shift element F, whereby the operating state of the vehicle drivetrain 1 to be established as a result of the demanded departure from sailing is present.

Furthermore, using the superordinate driving strategy, in the presence of a demand for a departure from sailing as a result of a demand for load during the above-described charging sequence of the frictionally engaging shift elements B, E, C and D, a further approach may be selected. Using the selected approach, as a function of a possibly new target gear setpoint and the time point at which the target gear change takes place during the charging sequence of the frictionally engaging shift elements B, E, C and D, a termination of the charging sequence or the next clutch B, E, C and D to be closed is selected such that a greater downshift gearspeed step is possible proceeding from the prepared operating state of the gearbox 4.

Thus, in the presence of a demand for departure from sailing and a target gear change proceeding from the third transmission ratio "3" in the direction of the second transmission ratio "2", the frictionally engaging shift element C is transferred into its closed operating state and the frictionally engaging shift elements B and D are opened, or the charging thereof is omitted. Subsequently, in turn, the frictionally engaging shift element E is closed for the engagement of the synchronization gear or, more specifically, for the sixth transmission ratio "6", and the positively engaging shift element F to be engaged is engaged during the downshift towards the second transmission ratio "2".

If, owing to a demand for load, a transition into sailing with a target gear change from the third transmission ratio "3" towards the first transmission ratio "1" for forward travel is present, the frictionally engaging shift element D is transferred into or left in its closed operating state, while the frictionally engaging shift elements B and C are transferred into or left in their fully open operating state. Furthermore, the frictionally engaging shift element E is closed in order to engage in the gearbox 4 the synchronization gear for the positively engaging shift element F to be closed or, more specifically, for the seventh transmission ratio "7", and subsequently transfer the positively engaging shift element F into its synchronized operating state and close said positively engaging shift element F during the downshift towards the first transmission ratio "1".

Figure 16:
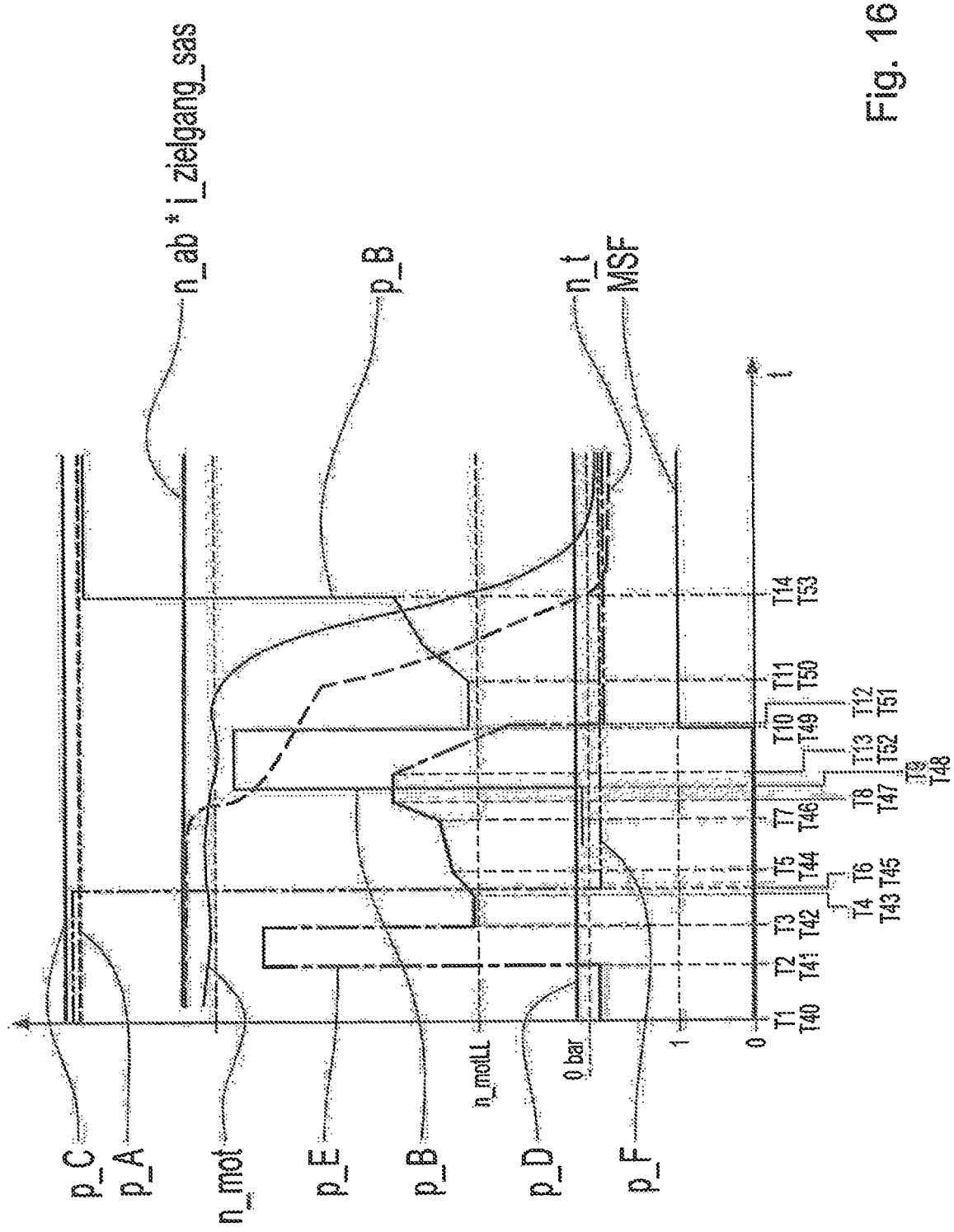
FIG. 16 shows multiple profiles, versus the time t, of several operating variables of the vehicle drivetrain as per FIG. 1 which set with the time t during the implementation of a variant of the method according to the invention.

FIG. 16 shows multiple profiles of different operating variables of the vehicle drivetrain 1 versus the time t, wherein the vehicle drivetrain 1 is, at a time point T40 denoted in more detail in FIG. 16, in an operating state in which the second transmission ratio "2" is engaged in the gearbox 4 and the rotational speed n_mot of the drive machine 2 is higher than the idle rotational speed n_motLL of the drive machine 2. At the time point T40, it is checked whether the drive machine 2 has to be transferred into a shut-down operating state by an engine start-stop function or by a sailing operating function. Based on the preceding operating state profile of the vehicle drivetrain 1, a demand for realizing the sailing operating state of the vehicle drivetrain 1 is triggered at the time point T40, during which the drive machine 2 is in a shut-down state and the power flow between the drive machine 2 and the drive output 3 is disconnected in the region of the gearbox 4.

Here, the demand for the activation of the sailing operating state is triggered proceeding from an operating state of the vehicle drivetrain 1 in which the drive machine 2 is active and is connected to the drive output 3 by the gearbox 4. Furthermore, the rotational speed n_ab of the drive output 3 is greater than zero, wherein the vehicle equipped with the vehicle drivetrain 1 is in an operating state close to standstill. As already discussed above, in addition to the two positively engaging shift elements A and F, the frictionally engaging shift element C is active and the second transmission ratio "2" for forward travel is engaged in the gearbox 4, while the shift elements B, D and E are each present in the open operating state. For this purpose, the shift elements A to F are charged with the actuation pressures p_A to p_F respectively required for this purpose.

Proceeding from a time point T41, for activation of the sailing operating state, it is provided that the frictionally engaging shift element E is charged with a fast-charging pulse by a corresponding increase of an actuation pressure p_E in the manner illustrated in FIG. 16 until a time point T42, and said frictionally engaging shift element E is actuated with an actuation pressure p_E at a charging compensation pressure level during a subsequent charging compensation phase which lasts until a time point T43, and is thus prepared for the activation. At the time point T43, the frictionally engaging shift element E is in an operating state in which the torque transfer capacity of the frictionally engaging shift element E is substantially equal to zero, and an increase of the actuation force results in an immediate increase of the torque transfer capacity of the frictionally engaging shift element E.

Furthermore, proceeding from the time point T40, the rotational speed n_mot of the drive machine 2 is adjusted increasingly towards the idle rotational speed n_motLL in the illustrated manner. The increase of the torque transfer capacity of the frictionally engaging shift element E proceeding from the time point T43 along a pressure ramp which lasts until a time point T44 has the effect that the positively engaging shift element F transitions into an at least approximately load-free operating state, and, at a time point T45 which lies between the time points T43 and T44, the actuation pressure p_F of the further positively engaging shift elemenet F is decreased in abrupt fashion by correspondingly setting the actuation pressure p_F of the positively engaging shift element F from a pressure value which corresponds to the closed operating state of the positively engaging shift element F to a pressure value which corresponds to the open operating state of the positively engaging shift element F. The activation of the frictionally engaging shift element E has the effect that the positively engaging shift element F is transferred into an at least load-free operating state. Said operating state is attained by the positively engaging shift element F at the deactivation time point T45.

Proceeding from the time point T44 the actuation pressure p_E of the frictionally engaging shift element E is increased along a further pressure ramp until a time point T46, the gradient of the further pressure ramp being shallower than that of the pressure ramp provided between the time points T43 and T44. Proceeding from the pressure level of the actuation pressure p_E prevailing at the time point T46, the actuation pressure p_E is increased along a third pressure ramp to a higher pressure level until a time point T47, the gradient of the third pressure ramp being in turn steeper than the gradient of the two preceding pressure ramps. At the time point T47, it is identified that a rotational speed n_t of the gearbox input shaft 6, deviates from a product of the rotational speed n_ab of the drive output 3 and the transmission ratio i_zielgang_sas presently engaged in the gearbox 4 at the time point T40. If the deviation between the turbine rotational speed n_t and the product of the rotational speed n_ab of the drive output 3 and the transmission ratio i_zielgang_sas exceeds the threshold value kfl, then in the present case, the disconnected power flow between the drive machine 2 and the drive output 3 in the region of the gearbox 4 is identified. This is the case here at the time point T47.

At the time point T47, the sixth transmission ratio "6" is at least partially engaged in the gearbox 4 owing to the shift elements C and A being present in the closed operating state and the at least partially activated frictionally engaging shift element E. It is provided that, at a time point T48 which follows the time point T47, the frictionally engaging shift element B is prepared for the activation or, more specifically, closure, in the manner illustrated in FIG. 16, by a fast-charging phase, which lasts until a time point T47, and a subsequent charging compensation phase, which ends at a time point T50. This is because, in the presence of an active sailing operating state at the present operating point of the vehicle drivetrain 1, with progressive operating time t, the third transmission ratio "3" for forward travel has to be engaged in the gearbox rather than the sixth transmission ratio "6" for forward travel in the event of a departure from the sailing operating state in the gearbox 4. An additional reason is that, in order to realize operation of the vehicle drivetrain 1 with the greatest possible efficiency, the power flow between the drive machine 2, which is to be shut down, and the drive output 3 has to be disconnected in the gearbox 4.

At a time point T51 which follows the time point T49, the demand for the shutdown of the drive machine 2 is triggered, as a result of which the rotational speed n_mot of the drive machine 2 decreases towards zero. The demand corresponding to this results from the profile MSF, which at the time point T51 jumps from the value 0 to the value 1 and thus activates the engine-stop enable signal. Thus, at the time point T45, the sailing operating state demanded at the time point T40 is activated as desired.

Shortly after the time point T47 at which the open operating state of the positively engaging shift element F is identified, the actuation pressure p_E of the frictionally engaging shift element E is, proceeding from a time point T52 which lies between the time point T48 and T49, reduced first, in the manner illustrated in FIG. 16, by a pressure ramp which lasts until the time point T51, and the actuation pressure p_E of said frictionally engaging shift element E is subsequently reduced in abrupt fashion to zero at the time point T51, whereby the frictionally engaging shift element E transitions into its fully open operating state and the power flow between the drive machine 2 and the drive output 3 is disconnected in the region of the gearbox 4.

At the time point T50, the frictionally engaging shift element B is present in an operating state in which the torque transfer capacity of the frictionally engaging shift element B is substantially equal to zero and an increase of the actuation force of the frictionally engaging shift element B or of the actuation pressure p_B results in an immediate increase of the torque transfer capacity of the frictionally engaging shift element B. Proceeding from the time point T50, the actuation pressure p_B of the frictionally engaging shift element B is increased as illustrated by two successive pressure ramps until a time point T53, at which the frictionally engaging shift element B is present in the slippage-free operating state. For this reason, at the time point T53, the actuation pressure p_B of the frictionally engaging shift element B is increased in abrupt fashion to the closing pressure level, at which the frictionally engaging shift element B is fully closed. Thus, at the time point T53, the three shift elements A, B and C are closed, as a result of which the gear set 5 of the gearbox 4 is present in a partially blocked operating state, in which the gearbox input shaft 6 is held rotationally fixed and the gearbox output shaft 9 connected to the drive output 3 is rotatable.

In the case of the operating state profile of the vehicle drivetrain 1 described in more detail above, the sailing operating state or the sailing operating function is for example activated proceeding from an operating state of a vehicle close to a standstill if it is simultaneously identified that a profile of the rotational speed n_ab of the drive output 3 has a positive gradient and, nevertheless, the drive machine 2 has to be transferred into its shut-down operating state. This is the case for example if a power demand from a driver remains absent during simultaneous downhill travel of a vehicle, or a vehicle is implemented with an electrically driveable vehicle axle and it is identified that the present power demand from the driver can be implemented using said electrically driveable vehicle axle alone.

In the event of a demand for activation of the sailing operating state being detected, the frictionally engaging clutch or, more specifically, the frictionally engaging shift element E which relieves the positively engaging shift element F, which is to be deactivated, of load is actuated. During the charging process of the frictionally engaging shift element E and the associated build-up phase of the relief torque in the region of the positively engaging shift element F, the actuation of the positively engaging shift element F, which is to be disengaged, in the opening direction is triggered.

If the positively engaging shift element F is rendered virtually free from torque by the relief torque built up in the region of the frictionally engaging shift element E, the positively engaging shift element F is opened without generating a relief shock in the vehicle drivetrain 1. If the open operating state of the positively engaging shift element F is detected, for example through a corresponding travel sensor arrangement in the region of the positively engaging shift element F or a correspondingly identified rotational speed reaction in the region of the gearbox 4, the relief torque built up in the region of the frictionally engaging shift element E is reduced by reduction of the actuation pressure p_E and the resulting pressure dissipation in the region of the relief clutch or, more specifically, in the region of the frictionally engaging shift element E, and thus the drive output 3 is decoupled from the drive machine 2, and thus the power transmission to the gearbox output is eliminated.

In this operating state of the vehicle drivetrain 1 that is then present, the vehicle equipped with said drivetrain 1 thus coasts with the drive machine 2 initially still active. To be able to operate the vehicle drivetrain 1 with the drive machine 2 shut down, frictionally engaging shift elements of the gearbox 4 are charged and transferred into their closed operating state in each case in a manner dependent on the present operating state of the vehicle drivetrain 1. Since the gearbox output shaft 9 and the drive output 3 connected rotationally conjointly thereto can already rotate freely, the charging of those frictionally engaging shift elements of the gearbox 4 which have to be activated and transferred into the closed operating state can be performed within short operating times.

Proceeding from this operating state of the vehicle drivetrain 1, it is possible, in the presence of an active sailing operating function, for the gearbox 4 to in each case be correspondingly actuated in a manner dependent on the respectively present operating state profile of the vehicle drivetrain 1 in order to achieve an operating state to be established in the region of the gearbox 4 in the event of a departure from the coasting operating state with high spontaneity. For this purpose, the shift elements A to F are actuated in each case in a manner dependent on the present operating point of the vehicle drivetrain 1 and in the presence of a simultaneously active sailing operating function, wherein the actuation of the shift elements A to F is performed to a major extent in a manner dependent on the rotational speed n_ab of the drive output 3 of the vehicle drivetrain 1 in order to be able to realize gearspeed tracking that is required for high spontaneity.

Figure 17:
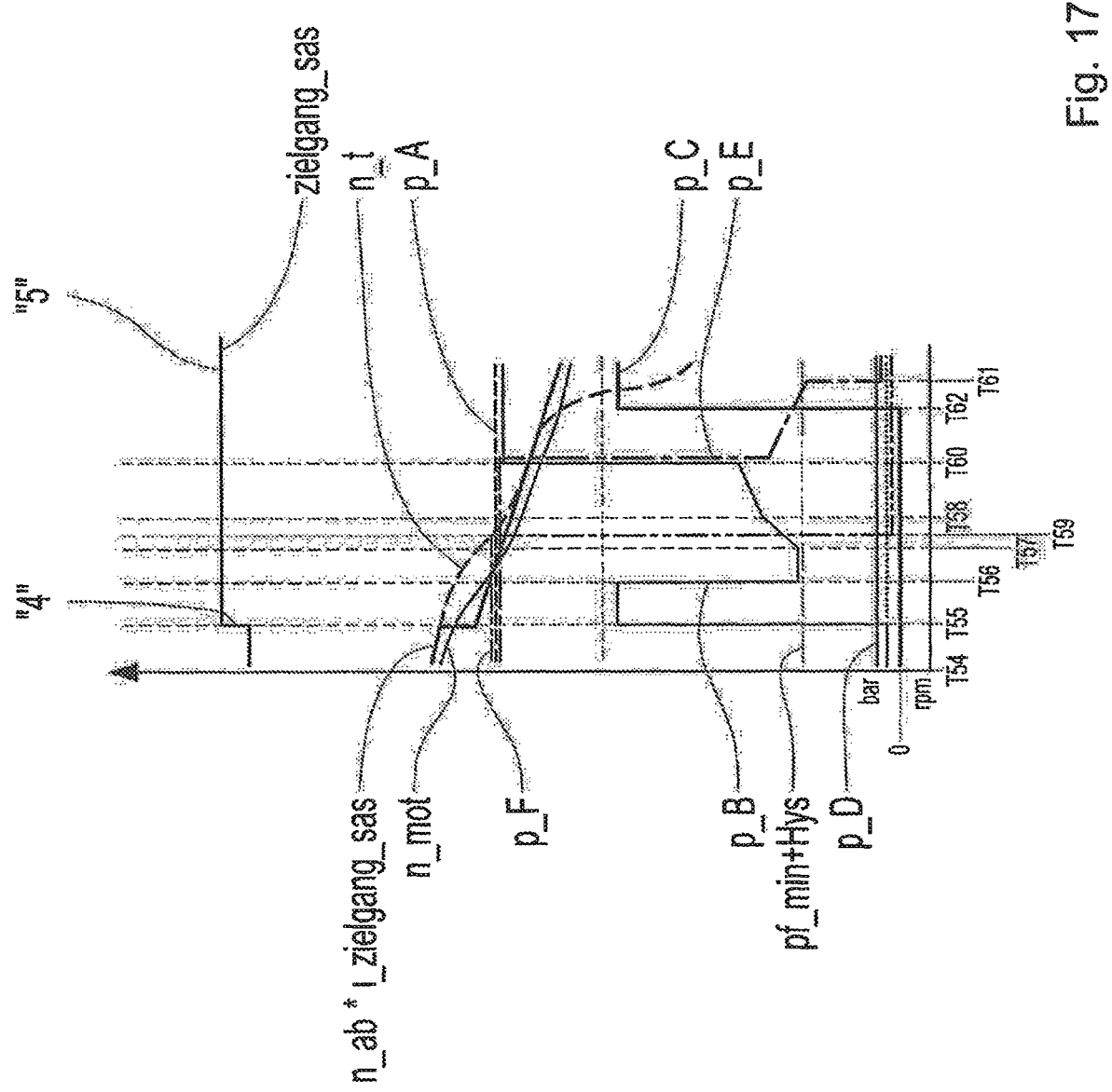
FIG. 17 shows multiple profiles of several operating variables of the vehicle drivetrain as per FIG. 1 which set with time t during the implementation of a further variant of the method according to the invention.

FIG. 17 shows the profiles of the operating variables of the vehicle drivetrain 1 illustrated in FIG. 16, proceeding from an operating state at a time point T54 at which the power flow between the drive machine 2 and the drive output 3 is enabled in the region of the gearbox 4 and the fourth transmission ratio "4" for forward travel is engaged in the gearbox 4. As can be seen from the shift table as per FIG. 2, to realize the fourth transmission ratio "4" for forward travel, not only the two positively engaging shift elements A and F but also the frictionally engaging shift element E have to be closed in the gearbox 4. The rotational speed n_mot of the drive machine 2 and the value of the product n_ab*i_zielgang_sas lie above the idle rotational speed n_motLL. Up to a time point T55, the profile of the product n_ab*i_zielgang_sas is equal to the profile of the turbine rotational speed n_t.

Owing to the operating state profile present at the time point T54, a demand for activation of the sailing operating function of the vehicle drivetrain 1 is triggered by the superordinate driving strategy. To realize the sailing operation, the positively engaging shift element F has to be deactivated. Since a torque prevails at the positively engaging shift element F which counteracts the opening process of the positively engaging shift element F, the actuation pressure p_B of the frictionally engaging shift element B is increased abruptly from zero to the fast-charging pressure level at the time point T55 and is held constant at said pressure level until a time point T56.

At the time point T56, the actuation pressure p_B is reduced to the charging compensation pressure level and, in turn, is held at said pressure level until a time point T57. Proceeding from the time point T57, the actuation pressure p_B is increased from the charging compensation pressure level with a defined gradient along a first pressure ramp which, in the present case, ends at a time point T58. At the time point T57, the frictionally engaging shift element B to be activated is in an operating state in which the torque transfer capacity of the frictionally engaging shift element B is equal to zero and an increase of the actuation pressure p_B which acts in the closing direction of the frictionally engaging shift element B results in an immediate increase of the torque transfer capacity of the frictionally engaging shift element B. Owing to the latter change in operating state of the frictionally engaging shift element B, the positively engaging shift element F to be deactivated is progressively relieved of load proceeding from the time point T57. At a time point T59 which lies between the time points T57 and T58, the positively engaging shift element F to be deactivated is in an operating state relieved of load, such that, as a result of an abrupt reduction, from the closing pressure level to zero, of the actuation pressure p_F which acts in the closing direction on the positively engaging shift element F to be deactivated, the positively engaging shift element F transitions into its open operating state at the time point T59 in accordance with the demand.

Proceeding from the time point T58, the pressure ramp of the actuation pressure p_B of the frictionally engaging shift element B to be activated is followed by a further pressure ramp, the gradient of said further pressure ramp is shallower than the gradient of the first pressure ramp which ends at the time point T58. The second pressure ramp ends at a time point T60, at which the frictionally engaging shift element B to be activated is present substantially in the closed operating state. For this reason, at the time point T60 the actuation pressure p_B is increased abruptly to the closing pressure level, and the frictionally engaging shift element B is transferred into its fully closed operating state. At the time point T60, the actuation pressure p_E of the frictionally engaging shift element E is reduced abruptly from the closing pressure level to an intermediate pressure level above the pressure threshold pf_min+HYS. Subsequently, the actuation pressure p_E is adjusted along a pressure ramp, which in the present case ends at a time point T61, to an intermediate pressure level below the pressure threshold pf_min+HYS, and at the time T61, said actuation pressure is reduced abruptly to zero, whereby the frictionally engaging shift element E transitions into its fully open operating state.

Using the approach implemented between the time points T54 and T61, the positively engaging shift element F which is activated over a period up to the time point T59 is firstly transferred into an at least approximately load-free operating state by an at least partial engagement of the fifth transmission ratio "5" in the gearbox 4, for the realization of which the positively engaging shift element F has to be transferred into the open operating state and the torque transfer capacity of the frictionally engaging shift element B has to be varied. When the at least approximately load-free operating state is achieved at the time point T59, the positively engaging shift element F is opened as described above, whereby the demand for realizing the sailing operating state can be implemented with high spontaneity.

In a manner dependent on the present operating state profile of the vehicle drivetrain 1, it is identified in the region of the superordinate driving strategy, at a time point T62, which in the present case lies between the time points T60 and T61, that the third transmission ratio "3" for forward travel has to be engaged in the gearbox 4 in the event of a departure from sailing. For this reason, at the time point T62, the actuation pressure p_C of the frictionally engaging shift element C is increased abruptly to the pressure level of the fast-charging pressure and is held constant at said pressure level until the end of the fast-charging phase. Subsequently, the actuation pressure p_C of the frictionally engaging shift element C is, in a manner not illustrated in any more detail, first increased to the pressure level of the charging compensation pressure and subsequently to the intermediate pressure level during two successive pressure ramps with different gradients, at which the frictionally engaging shift element C is present in the slippage-free operating state. When said operating state of the frictionally engaging shift element C is attained, the actuation pressure p_C is increased to the closing pressure level and the frictionally engaging shift element C is fully closed.

Modifications and variations can be made to the embodiments illustrated or described herein without departing from the scope and spirit of the invention as set forth in the appended claims.

REFERENCE DESIGNATIONS

1 Vehicle drivetrain
2 Drive machine

3 Drive output
4 Gearbox
5 Gear set
6 Gearbox input shaft
7 Hydrodynamic torque converter
8 Converter lock-up clutch
9 Gearbox output shaft
10 Component fixed with respect to a housing
"1" to "9" Transmission ratio for forward travel
"R" Transmission ratio for reverse travel
A to F Shift element
HR1 to HR4 Internal gear
zielgang_sas Transmission ratio presently to be engaged in the gearbox
i_zielgang_sas Transmission ratio
kfl Threshold value
MSF Profile
n_ab Rotational speed of the drive output
n_mot, n_mot1 Rotational speed of the drive machine
n_motEGS Profile of the EGS engine target rotational speed setpoint
n_motLL Idle rotational speed
n_t Turbine rotational speed
p_A Actuation pressure of the shift element A
p_B Actuation pressure of the shift element B
p_C Actuation pressure of the shift element C
p_D Actuation pressure of the shift element D
p_E Actuation pressure of the shift element E
p_F Actuation pressure of the shift element F
P1 to P4 Planetary gear set
pf_min+Hys Pressure threshold
PR1 to PR4 Planet gear
S1 to S4 Sun gear
ST1 to ST4 Planetary carrier
t Time
T0 to T199 Discrete time point

The invention claimed is:

1. A method for operating a vehicle drivetrain (1), the vehicle drivetrain (1) having a drive machine (2), a drive output (3) and a gearbox (4), the gearbox (4) arranged in power flow between the drive machine (2) and the drive output (3), the gearbox (4) having at least one positively engaging shift element (A, F) and a plurality of frictionally engaging shift elements (B, C, D, E), the at least one positively engaging shift element (A, F) and the plurality of frictionally engaging shift elements (B, C, D, E) selectively closable in order to engage different transmission ratios ("1" to "R") of the gearbox (4), only some of the transmission ratios ("1" to "R") engageable with the at least one positively engaging shift element (A, F), the vehicle drivetrain (1) configured such that, during a demand for activation of an engine start-stop function of the vehicle drivetrain (1), the drive machine (2) is decoupled from the drive output (3), the drive machine (2) is shut down, and the at least one positively engaging shift element (A, F) is transferred into or kept in a closed operating state of the at least one positively engaging shift element (A, F), the method comprising:

when there is the demand for activation of the engine start-stop function of the vehicle drivetrain (1) and a simultaneously shut-down drive machine (2), operating the vehicle drivetrain (1) with a sailing operating function of the vehicle drivetrain (1) active, with the drive machine (2) decoupled from the drive output (3), with the positively engaging shift element (F) open, and with a rotational speed (n_ab) of the drive output (3) greater than a defined rotational speed at which a rotational speed difference between shift element halves of the positively engaging shift element (F) lies within a rotational speed range within which the positively engaging shift element (F) is transferrable into the closed operating state; and actuating the positively engaging shift element (F) in a closing direction no later than when the defined rotational speed is reached.

2. The method of claim 1, further comprising ending actuation of the positively engaging shift element (F) in the closing direction when, in a standstill state of the vehicle, an open operating state of the positively engaging shift element (F) is identified.

3. The method of claim 1, further comprising:
identifying, when the sailing operating function is active, a present operating state of the vehicle drivetrain (1) and the transmission ratio ("1" to "9") that has to be engaged in the gearbox (4) during a restart of the drive machine (2) as a result of activation of the engine start-stop function; and
holding at least those shift elements (B, C, D) of the plurality of frictionally engaging shift elements (B, C, D, E) which have to be closed in order to engage the transmission ratio ("1" to "9") that has to be engaged in the gearbox (4) for a departure from the sailing operating function in an operating state prepared for an activation of the shift elements (B, C, D) of the plurality of frictionally engaging shift elements (B, C, D, E).

4. The method of claim 1, further comprising transferring, when the sailing operating function is active, a gear set (5) of the gearbox (4) into an at least partially blocked operating state by actuation of multiple frictionally engaging shift elements (B, C, D) of the plurality of frictionally engaging shift elements (B, C, D, E), a gearbox input shaft (6) held rotationally fixed and a gearbox output shaft (9) connected to the drive output (3) being rotatable in the at least partially blocked operating state.

5. The method of claim 4, further comprising selecting, depending on the present operating state profile of the vehicle drivetrain (1), a sequence of the shift elements (B, C, D) of the plurality of frictionally engaging shift elements (B, C, D, E) that have to be actuated in succession for the partial blocking of the gear set (5).

6. The method of claim 4, further comprising lowering, when the sailing operating state of the vehicle drivetrain (1) is active, actuation forces of the frictionally engaging shift elements (B, C, D) of the plurality of frictionally engaging shift elements (B, C, D, E) to a level at which the frictionally engaging shift elements (B, C, D) of the plurality of frictionally engaging shift elements (B, C, D, E) are still in a slippage-free operating state and proceeding from which the shift elements (B, C, D) of the plurality of frictionally engaging shift elements (B, C, D, E) are activatable or deactivatable within short operating times.

7. The method of claim 6, further comprising:
activating the engine start-stop function to depart from the sailing operating function of the vehicle drivetrain (1);
raising the actuation forces of the shift elements (B, C, D, E) of the plurality of frictionally engaging shift elements (B, C, D, E) that have to be held in or transferred into the closed operating state in order to depart from the sailing operating function of the vehicle drivetrain (1); and
opening the shift elements (B, C, D, E) of the plurality of frictionally engaging shift elements (B, C, D, E) that are not required to depart from the sailing operating function of the vehicle drivetrain (1).

8. The method of claim 7, further comprising varying a torque transfer capacity of at least one of the shift elements (B, C, D) of the plurality of frictionally engaging shift elements (B, C, D, E) that is actuated for the at least partial blocking of the gear set (5) so that a rotational speed difference required for the closure of a further positively engaging shift element (A) is generated between shift element halves of the further positively engaging shift element (A) in the open operating state of the further positively engaging shift element (A).

9. The method of claim 1, further comprising, during the demand for activation of the engine start-stop function and an associated demand for engaging a transmission ratio ("1" to "3") engageable in the gearbox (4) by closing of the positively engaging shift element (F) and in response to identification of the open operating state of the positively engaging shift element (F) in a vehicle standstill state:

engaging a synchronization transmission ratio ("5" to "7") in the gearbox (4), the positively engaging shift element (F) being in the open operating state in the synchronization transmission ratio ("5" to "7"); and then deactivating a frictionally engaging shift element (B, C or E) of the plurality of frictionally engaging shift elements (B, C, D, E) and closing the positively engaging shift element (F) in order to implement a subsequent change in transmission ratio proceeding from the synchronization transmission ratio ("5" to "7") in the direction of the demanded transmission ratio ("1" to "3").

10. The method of claim 1, further comprising triggering, when the engine start-stop function is active, a demand for activation of the sailing operating function in response to an exceedance of a defined threshold value of the rotational speed (n_ab) of the drive output (3).

11. The method of claim 1, further comprising triggering, when the engine start-stop function is active, a demand for activation of the sailing operating function in response to an exceedance of a defined threshold value of the rotational speed (n_ab) of the drive output (3) for longer than a predefined time period or after a driving distance longer than a defined driving distance has been traveled.

12. The method of claim 1, further comprising:

transferring the positively engaging shift element (F) into an at least approximately load-free operating state by at least partial engagement of a transmission ratio ("5") in the gearbox (4) for the engagement of which the positively engaging shift element (F) has to be transferred into the open operating state and at least a torque transfer capacity of one of the frictionally engaging shift elements (B, E) of the plurality of frictionally engaging shift elements (B, C, D, E) has to be varied; and opening the positively engaging shift element (F) when the at least approximately load-free operating state is attained.

13. The method of claim 12, further comprising raising, when the sailing operating function is active, the torque transfer capacity of that frictionally engaging shift element (B, E) which has to be actuated in order to engage the transmission ratio ("5") which relieves the positively engaging shift element (F) of load from a value of zero to a level which relieves the positively engaging shift element (F) of load.

14. The method of claim 1, further comprising transferring, when the open operating state of the positively engaging shift element (F) is detected, the frictionally engaging shift element (E) of the plurality of frictionally engaging shift elements (B, C, D, E) into the open operating state in order to interrupt the power flow between the drive machine (2) and the drive output (3) in the gearbox (4).

* * * * *